(12) United States Patent
Mauldin et al.

(10) Patent No.: US 10,689,955 B1
(45) Date of Patent: Jun. 23, 2020

(54) INTELLIGENT DOWNHOLE PERFORATING GUN TUBE AND COMPONENTS

(71) Applicant: SWM International Inc., Pampa, TX (US)

(72) Inventors: Dawna Mauldin, Pampa, TX (US); Ronald Haasl, Pampa, TX (US); Keith Roper, Phoenix, AZ (US)

(73) Assignee: SWM International Inc., Pampa, TX (US)

( * ) Notice: Subject to any disclaimer, the term of this patent is extended or adjusted under 35 U.S.C. 154(b) by 0 days.

(21) Appl. No.: 16/293,532

(22) Filed: Mar. 5, 2019

(51) Int. Cl.
| | | |
|---|---|---|
| *E21B 43/117* | (2006.01) | |
| *F16C 19/06* | (2006.01) | |
| *H01R 13/15* | (2006.01) | |
| *F16C 35/06* | (2006.01) | |

(52) U.S. Cl.
CPC ............ *E21B 43/117* (2013.01); *F16C 19/06* (2013.01); *F16C 35/06* (2013.01); *H01R 13/15* (2013.01); *F16C 2380/00* (2013.01)

(58) Field of Classification Search
CPC ..... E21B 43/116; E21B 43/117; E21B 43/119
USPC .......................................................... 89/1.15
See application file for complete search history.

(56) References Cited

U.S. PATENT DOCUMENTS

| | | | | |
|---|---|---|---|---|
| 2,909,120 A | * | 10/1959 | Lebourg | E21B 43/117 |
| | | | | 175/4.56 |
| 3,307,626 A | * | 3/1967 | Bielstein | E21B 43/119 |
| | | | | 166/297 |
| 3,307,642 A | * | 3/1967 | Smith | E21B 43/119 |
| | | | | 175/4.51 |
| 3,704,749 A | * | 12/1972 | Estes | E21B 43/119 |
| | | | | 166/255.2 |
| 4,703,459 A | * | 10/1987 | Bower | E21B 43/119 |
| | | | | 181/104 |
| RE32,755 E | | 9/1988 | Vann | |
| 4,815,540 A | | 3/1989 | Wallbillich, III | |
| 4,829,901 A | | 5/1989 | Yates, Jr. | |
| 4,830,120 A | | 5/1989 | Stout | |
| 4,886,126 A | | 12/1989 | Yates, Jr. | |
| 4,917,187 A | | 4/1990 | Burns et al. | |
| 4,949,793 A | | 8/1990 | Rubbo et al. | |
| 4,979,567 A | | 12/1990 | Rubbo | |
| 5,016,716 A | | 5/1991 | Donovan et al. | |
| 5,025,861 A | | 6/1991 | Huber et al. | |
| 5,044,441 A | | 9/1991 | Rubbo et al. | |
| 5,067,568 A | | 11/1991 | Yates, Jr. et al. | |
| 5,076,355 A | | 12/1991 | Donovan et al. | |
| 5,131,472 A | | 7/1992 | Dees et al. | |
| 5,156,213 A | | 10/1992 | George et al. | |
| 5,226,494 A | | 7/1993 | Rubbo et al. | |

(Continued)

FOREIGN PATENT DOCUMENTS

WO       2016186611       11/2016

*Primary Examiner* — Bret Hayes
(74) *Attorney, Agent, or Firm* — Patterson + Sheridan, LLP

(57) ABSTRACT

A gun tube for a downhole perforating gun assembly includes a body, a first end, and a second end. A motor is directly or indirectly attached to one or both of the ends and is configured to rotate the gun tube around its longitudinal axis in order to position shape charges in the gun tube in a desired position before firing the shape charges. A sensor may be on the gun tube, a sub-assembly, or an outer casing to detect the relative position of the shape charges and a signal including the position of the shape charges could be sent to a human or machine operator.

30 Claims, 47 Drawing Sheets

(56) References Cited

U.S. PATENT DOCUMENTS

| | | | |
|---|---|---|---|
| RE34,451 E | 11/1993 | Donovan et al. | |
| 5,303,772 A | 4/1994 | George et al. | |
| 5,318,123 A * | 6/1994 | Venditto | E21B 43/26 |
| | | | 166/250.1 |
| 5,320,176 A | 6/1994 | Naquin et al. | |
| 5,327,974 A | 7/1994 | Donovan et al. | |
| 5,346,014 A | 9/1994 | Ross | |
| 5,370,186 A | 12/1994 | Ireland | |
| 5,398,760 A | 3/1995 | George et al. | |
| 5,462,117 A | 10/1995 | Green et al. | |
| 5,526,880 A | 6/1996 | Jordan et al. | |
| 5,611,401 A | 3/1997 | Myers et al. | |
| 5,662,170 A | 9/1997 | Donovan et al. | |
| 5,680,905 A | 10/1997 | Green et al. | |
| 6,055,213 A | 4/2000 | Rubbo et al. | |
| 6,142,231 A | 11/2000 | Myers et al. | |
| 6,148,916 A | 11/2000 | Sampson et al. | |
| 6,173,773 B1 * | 1/2001 | Almaguer | E21B 43/119 |
| | | | 166/241.1 |
| 6,246,962 B1 | 6/2001 | Schultz et al. | |
| 6,283,156 B1 | 9/2001 | Motley | |
| 6,286,598 B1 | 9/2001 | van Petegern et al. | |
| 6,295,912 B1 | 10/2001 | Burleson et al. | |
| 6,296,066 B1 | 10/2001 | Terry et al. | |
| 6,298,915 B1 | 10/2001 | George | |
| 6,310,829 B1 | 10/2001 | Green et al. | |
| 6,321,838 B1 | 11/2001 | Skinner | |
| 6,325,146 B1 | 12/2001 | Ringgenberg et al. | |
| 6,329,407 B1 | 12/2001 | Jähne et al. | |
| 6,333,784 B1 | 12/2001 | Blasi et al. | |
| 6,371,219 B1 | 4/2002 | Collins et al. | |
| 6,378,438 B1 | 4/2002 | Lussier et al. | |
| 6,378,607 B1 * | 4/2002 | Ryan | E21B 43/119 |
| | | | 166/255.1 |
| 6,414,905 B1 | 7/2002 | Owens et al. | |
| 6,435,278 B1 | 8/2002 | Barlow et al. | |
| 6,439,121 B1 | 8/2002 | Gillingham | |
| 6,446,720 B1 | 9/2002 | Ringgenberg et al. | |
| 6,450,258 B2 | 9/2002 | Green et al. | |
| 6,487,973 B1 | 12/2002 | Gilbert, Jr. et al. | |
| 6,494,260 B2 | 12/2002 | van Petegern et al. | |
| 6,497,284 B2 | 12/2002 | van Petegern et al. | |
| 6,536,350 B2 | 3/2003 | Cartland et al. | |
| 6,564,866 B2 | 5/2003 | Clark et al. | |
| 6,566,635 B1 | 5/2003 | Matsen et al. | |
| 6,591,912 B2 | 7/2003 | Ross et al. | |
| 6,595,290 B2 | 7/2003 | George et al. | |
| 6,626,241 B2 | 9/2003 | Nguyen | |
| 6,630,668 B1 | 10/2003 | Cramer et al. | |
| 6,653,608 B1 | 11/2003 | Matsen et al. | |
| 6,658,981 B2 | 12/2003 | Rochen et al. | |
| 6,679,323 B2 | 1/2004 | Vargervik et al. | |
| 6,679,327 B2 | 1/2004 | Sloan et al. | |
| 6,684,954 B2 | 2/2004 | George | |
| 6,708,761 B2 | 3/2004 | George et al. | |
| 6,723,709 B1 | 4/2004 | Pressato et al. | |
| 6,729,398 B2 | 5/2004 | Ringgenberg et al. | |
| 6,736,984 B2 | 5/2004 | Golecki | |
| 6,748,843 B1 | 6/2004 | Barker et al. | |
| 6,758,124 B2 | 7/2004 | Barker et al. | |
| 6,793,017 B2 | 9/2004 | Nguyen et al. | |
| 6,820,693 B2 | 11/2004 | Hales et al. | |
| 6,823,902 B2 | 11/2004 | Rudesill et al. | |
| 6,843,318 B2 | 1/2005 | Yarbro | |
| 6,843,320 B2 | 1/2005 | Yarbro | |
| 6,851,471 B2 | 2/2005 | Barlow et al. | |
| 6,877,561 B2 | 4/2005 | Richard et al. | |
| 6,880,637 B2 | 4/2005 | Myers et al. | |
| 6,920,933 B2 | 7/2005 | Watson et al. | |
| 6,941,627 B2 | 9/2005 | Fritsche et al. | |
| 6,944,095 B2 | 9/2005 | Thomas | |
| 6,955,217 B2 | 10/2005 | Clark et al. | |
| 7,000,699 B2 | 2/2006 | Yang et al. | |
| 7,013,977 B2 | 3/2006 | Nordaas | |
| 7,016,261 B2 | 3/2006 | Quinn et al. | |
| 7,021,375 B2 | 4/2006 | Ringgenberg et al. | |
| 7,044,236 B2 | 5/2006 | Iversen et al. | |
| 7,066,261 B2 | 6/2006 | Vicente et al. | |
| 7,073,579 B2 | 7/2006 | Ringgenberg et al. | |
| 7,086,463 B2 | 8/2006 | Ringgenberg et al. | |
| 7,172,023 B2 | 2/2007 | Barker et al. | |
| 7,178,213 B2 | 2/2007 | Haas et al. | |
| 7,210,524 B2 | 5/2007 | Sloan et al. | |
| 7,229,701 B2 | 6/2007 | Madhava et al. | |
| 7,231,982 B2 | 6/2007 | Sloan et al. | |
| 7,237,486 B2 | 7/2007 | Myers, Jr. et al. | |
| 7,237,487 B2 | 7/2007 | Myers, Jr. et al. | |
| 7,243,725 B2 | 7/2007 | George et al. | |
| 7,246,659 B2 | 7/2007 | Fripp et al. | |
| 7,266,917 B2 | 9/2007 | Ryan et al. | |
| 7,295,491 B2 | 11/2007 | Carstensen | |
| 7,299,961 B2 | 11/2007 | Stavig, Jr. et al. | |
| 7,303,017 B2 | 12/2007 | Barker et al. | |
| 7,308,461 B2 | 12/2007 | Iwatsu | |
| 7,322,416 B2 | 1/2008 | Burris et al. | |
| 7,339,852 B2 | 3/2008 | Gordy et al. | |
| 7,342,230 B2 | 3/2008 | Adamski | |
| 7,360,487 B2 | 4/2008 | Myers, Jr. et al. | |
| 7,387,156 B2 | 6/2008 | Drummond et al. | |
| 7,395,987 B2 | 7/2008 | Lindquist et al. | |
| 7,428,922 B2 | 9/2008 | Fripp et al. | |
| 7,431,080 B2 | 10/2008 | Wright et al. | |
| 7,526,850 B2 | 5/2009 | Haas et al. | |
| 7,540,326 B2 | 6/2009 | Rytlewski | |
| 7,556,695 B2 | 7/2009 | Strangman et al. | |
| 7,575,702 B2 | 8/2009 | Obrachta | |
| 7,581,498 B2 | 9/2009 | Hetz et al. | |
| 7,591,212 B2 | 9/2009 | Myers, Jr. et al. | |
| 7,595,633 B2 | 9/2009 | Martin et al. | |
| 7,600,568 B2 | 10/2009 | Ross et al. | |
| 7,602,827 B2 | 10/2009 | Okuda | |
| 7,607,379 B2 | 10/2009 | Rospek et al. | |
| 7,610,969 B2 | 11/2009 | LaGrange et al. | |
| 7,624,807 B2 | 12/2009 | Vick, Jr. | |
| 7,648,740 B2 | 1/2010 | Slaughter | |
| 7,650,947 B2 | 1/2010 | Henke et al. | |
| 7,665,529 B2 | 2/2010 | Farquhar et al. | |
| 7,686,082 B2 | 3/2010 | Marsh | |
| 7,710,545 B2 | 5/2010 | Cramblitt et al. | |
| 7,721,649 B2 | 5/2010 | Hetz et al. | |
| 7,721,820 B2 | 5/2010 | Hill et al. | |
| 7,730,951 B2 | 6/2010 | Surjaatmadja et al. | |
| 7,735,578 B2 | 6/2010 | Loehr et al. | |
| 7,752,971 B2 | 7/2010 | Loehr | |
| 7,757,767 B2 | 7/2010 | Hill et al. | |
| 7,762,172 B2 | 7/2010 | Li et al. | |
| 7,762,247 B2 | 7/2010 | Evans | |
| 7,770,662 B2 | 8/2010 | Harvey et al. | |
| 7,806,035 B2 | 10/2010 | Kaiser et al. | |
| 7,810,552 B2 | 10/2010 | Slaughter | |
| 7,828,051 B2 | 11/2010 | Walker | |
| 7,829,011 B2 | 11/2010 | Slaughter | |
| 7,857,066 B2 | 12/2010 | DiFoggio et al. | |
| 7,861,609 B2 | 1/2011 | Haggerty et al. | |
| 7,861,784 B2 | 1/2011 | Burleson et al. | |
| 7,866,372 B2 | 1/2011 | Slaughter | |
| 7,866,377 B2 | 1/2011 | Slaughter | |
| 7,934,558 B2 | 5/2011 | Hales et al. | |
| 7,942,098 B2 | 5/2011 | Han et al. | |
| 7,946,344 B2 | 5/2011 | Braithwaite et al. | |
| 7,955,568 B2 | 6/2011 | Ullman et al. | |
| 7,980,308 B2 | 7/2011 | Myers, Jr. et al. | |
| 7,980,309 B2 | 7/2011 | Crawford | |
| 8,002,035 B2 | 8/2011 | Hales et al. | |
| 8,006,427 B2 | 8/2011 | Blevins et al. | |
| 8,006,762 B2 | 8/2011 | Burleson et al. | |
| 8,035,370 B2 | 10/2011 | Jackson et al. | |
| 8,061,425 B2 | 11/2011 | Hales et al. | |
| 8,061,426 B2 | 11/2011 | Surjaatmadja | |
| 8,061,431 B2 | 11/2011 | Moore et al. | |
| 8,066,083 B2 | 11/2011 | Hales et al. | |
| 8,074,737 B2 | 12/2011 | Hill et al. | |
| 8,091,638 B2 | 1/2012 | Dusterhoft et al. | |
| 8,127,846 B2 | 3/2012 | Hill et al. | |

(56) References Cited

U.S. PATENT DOCUMENTS

| | | |
|---|---|---|
| 8,136,608 B2 | 3/2012 | Goodman |
| 8,143,119 B2 | 3/2012 | Sakoh et al. |
| 8,152,107 B1 | 4/2012 | Toombs |
| 8,181,718 B2 | 5/2012 | Burleson et al. |
| 8,186,259 B2 | 5/2012 | Burleson et al. |
| 8,223,591 B2 | 7/2012 | Chelminski |
| 8,230,946 B2 | 7/2012 | Crawford et al. |
| 8,256,337 B2 | 9/2012 | Hill et al. |
| 8,264,814 B2 | 9/2012 | Love et al. |
| 8,267,172 B2 | 9/2012 | Stujaatmadja et al. |
| 8,276,656 B2 | 10/2012 | Goodman |
| 8,286,697 B2 | 10/2012 | Evans et al. |
| 8,286,706 B2 | 10/2012 | McCann et al. |
| 8,307,743 B2 | 11/2012 | Hsu |
| 8,307,904 B2 | 11/2012 | Surjaatmadja |
| 8,336,437 B2 | 12/2012 | Barlow et al. |
| 8,347,962 B2 | 1/2013 | Sampson et al. |
| 8,365,376 B2 | 2/2013 | Reid et al. |
| 8,365,814 B2 | 2/2013 | Hill et al. |
| 8,369,063 B2 | 2/2013 | Vicente |
| 8,381,822 B2 | 2/2013 | Hales et al. |
| 8,387,226 B2 | 3/2013 | Weigel, Jr. et al. |
| 8,387,814 B2 | 3/2013 | Zheng |
| 8,393,392 B2 | 3/2013 | Mytopher et al. |
| 8,393,393 B2 | 3/2013 | Rodgers et al. |
| 8,408,285 B2 | 4/2013 | Lian et al. |
| 8,418,764 B2 | 4/2013 | Dusterhoft et al. |
| 8,424,606 B2 | 4/2013 | Zhan et al. |
| 8,439,114 B2 | 5/2013 | Parrott et al. |
| 8,490,686 B2 | 7/2013 | Rodgers et al. |
| 8,540,021 B2 | 9/2013 | McCarter et al. |
| 8,544,563 B2 | 10/2013 | Bourne et al. |
| 8,549,905 B2 | 10/2013 | Brooks et al. |
| 8,555,764 B2 | 10/2013 | Van Le et al. |
| 8,576,090 B2 | 11/2013 | Lerche et al. |
| 8,584,763 B2 | 11/2013 | Hales et al. |
| 8,596,378 B2 | 12/2013 | Mason et al. |
| 8,597,076 B2 | 12/2013 | Krienke et al. |
| 8,607,863 B2 | 12/2013 | Fripp et al. |
| 8,672,031 B2 | 3/2014 | Vaynshteyn |
| 8,678,261 B2 | 3/2014 | Lee |
| 8,689,868 B2 | 4/2014 | Lerche et al. |
| 8,695,506 B2 | 4/2014 | Lanclos |
| 8,714,251 B2 | 5/2014 | Glenn et al. |
| 8,714,252 B2 | 5/2014 | Glenn et al. |
| 8,716,627 B2 | 5/2014 | Saunders et al. |
| 8,728,245 B2 | 5/2014 | Dufresne et al. |
| 8,739,673 B2 | 6/2014 | Van Le et al. |
| 8,740,071 B1 | 6/2014 | Higgs et al. |
| 8,746,331 B2 | 6/2014 | Kash et al. |
| 8,790,587 B2 | 7/2014 | Singh et al. |
| 8,794,326 B2 | 8/2014 | Le et al. |
| 8,794,335 B2 | 8/2014 | Fadul et al. |
| 8,807,003 B2 | 8/2014 | Van Le et al. |
| 8,807,206 B2 | 8/2014 | Walker |
| 8,807,210 B2 | 8/2014 | Smith et al. |
| 8,807,213 B2 | 8/2014 | Walket et al. |
| 8,831,739 B2 | 9/2014 | McCreery et al. |
| 8,839,863 B2 | 9/2014 | Hetz et al. |
| 8,839,873 B2 | 9/2014 | Johnson et al. |
| 8,844,625 B2 | 9/2014 | Mhaskar et al. |
| 8,851,160 B2 | 10/2014 | Stolboushkin |
| 8,875,796 B2 | 11/2014 | Hales et al. |
| 8,881,816 B2 | 11/2014 | Glenn et al. |
| 8,884,778 B2 | 11/2014 | Lerche et al. |
| 8,893,605 B1 | 11/2014 | Hester, Jr. et al. |
| 8,893,785 B2 | 11/2014 | Skinner et al. |
| 8,899,322 B2 | 12/2014 | Cresswell et al. |
| 8,899,346 B2 | 12/2014 | Dagenais et al. |
| 8,910,556 B2 | 12/2014 | Umphries et al. |
| 8,910,713 B2 | 12/2014 | Zuklic et al. |
| 8,910,716 B2 | 12/2014 | Newton et al. |
| 8,919,236 B2 | 12/2014 | Bell et al. |
| 8,919,253 B2 | 12/2014 | Sampson et al. |
| 8,919,443 B2 | 12/2014 | Parker et al. |
| 8,931,389 B2 | 1/2015 | Brooks et al. |
| 8,943,943 B2 | 2/2015 | Tassaroli |
| 8,960,288 B2 | 2/2015 | Sampson |
| 8,960,289 B2 | 2/2015 | Zhang et al. |
| 8,963,827 B2 | 2/2015 | Kim et al. |
| 8,965,044 B1 | 2/2015 | Owechko |
| 8,967,257 B2 | 3/2015 | Fadul et al. |
| 8,971,152 B2 | 3/2015 | Chelminski |
| 8,978,749 B2 | 3/2015 | Rodgers et al. |
| 8,985,023 B2 | 3/2015 | Mason |
| 8,985,200 B2 | 3/2015 | Rodgers et al. |
| 8,991,496 B2 | 3/2015 | Bishop |
| 9,004,185 B2 | 4/2015 | Madero et al. |
| 9,027,456 B2 | 5/2015 | Mhaskar |
| 9,062,534 B2 | 6/2015 | Evans et al. |
| 9,068,411 B2 | 6/2015 | O'Connor et al. |
| 9,068,449 B2 | 6/2015 | Surjaatmadja |
| 9,080,431 B2 | 7/2015 | Bell et al. |
| 9,080,433 B2 | 7/2015 | Lanclos et al. |
| 9,086,085 B2 | 7/2015 | Lubchansky et al. |
| 9,091,152 B2 | 7/2015 | Rodgers et al. |
| 9,115,572 B1 | 8/2015 | Hardesty et al. |
| 9,121,265 B2 | 9/2015 | Myers et al. |
| 9,133,695 B2 | 9/2015 | Xu |
| 9,134,170 B2 | 9/2015 | Mefford et al. |
| 9,145,763 B1 | 9/2015 | Sites, Jr. |
| 9,146,295 B2 | 9/2015 | Jiang et al. |
| 9,157,718 B2 | 10/2015 | Ross |
| 9,174,381 B1 | 11/2015 | Morales |
| 9,175,553 B2 | 11/2015 | McCann et al. |
| 9,187,990 B2 | 11/2015 | Xu |
| 9,200,487 B2 | 12/2015 | Draper et al. |
| 9,206,675 B2 | 12/2015 | Hales et al. |
| 9,217,305 B2 | 12/2015 | Coles et al. |
| 9,222,339 B2 | 12/2015 | Mason et al. |
| 9,238,956 B2 | 1/2016 | Martinez |
| 9,272,337 B2 | 3/2016 | Steppan et al. |
| 9,284,819 B2 | 3/2016 | Tolman et al. |
| 9,284,824 B2 | 3/2016 | Fadul et al. |
| 9,297,228 B2 | 3/2016 | Martinez et al. |
| 9,310,284 B2 | 4/2016 | Grahma et al. |
| 9,366,372 B2 | 6/2016 | Nakazono et al. |
| 9,382,783 B2 | 7/2016 | Langford et al. |
| 9,394,767 B2 | 7/2016 | Brooks et al. |
| 9,428,988 B2 | 8/2016 | Frazier |
| 9,441,438 B2 | 9/2016 | Allison et al. |
| 9,446,444 B2 | 9/2016 | Christensen et al. |
| 9,447,678 B2 | 9/2016 | Walter et al. |
| 9,476,289 B2 | 10/2016 | Wells |
| 9,476,290 B2 | 10/2016 | Umphries et al. |
| 9,488,024 B2 | 11/2016 | Hoffman et al. |
| 9,506,317 B2 | 11/2016 | Craig et al. |
| 9,506,333 B2 | 11/2016 | Castillo et al. |
| 9,518,454 B2 | 12/2016 | Current et al. |
| 9,520,219 B2 | 12/2016 | LaGrange et al. |
| 9,520,249 B2 | 12/2016 | Bonavides |
| 9,523,271 B2 | 12/2016 | Bonavides et al. |
| 9,528,360 B2 | 12/2016 | Castillo et al. |
| 9,530,581 B2 | 12/2016 | Bonavides et al. |
| 9,534,484 B2 | 1/2017 | Wright et al. |
| 9,535,015 B2 | 1/2017 | Isomura |
| 9,540,913 B2 | 1/2017 | Moore |
| 9,540,919 B2 | 1/2017 | Castillo et al. |
| 9,545,697 B2 | 1/2017 | Whinnem et al. |
| 9,557,212 B2 | 1/2017 | Xia et al. |
| 9,562,364 B1 | 2/2017 | Lehr |
| 9,562,421 B2 | 2/2017 | Hardesty et al. |
| 9,562,736 B2 | 2/2017 | Grossnickle et al. |
| 9,581,422 B2 | 2/2017 | Preiss et al. |
| 9,593,548 B2 | 3/2017 | Hill et al. |
| 9,593,560 B2 | 3/2017 | Mailand et al. |
| 9,598,940 B2 | 3/2017 | Rodgers et al. |
| 9,598,941 B1 | 3/2017 | Upchurch et al. |
| 9,605,937 B2 | 3/2017 | Eitschberger et al. |
| 9,606,214 B2 | 3/2017 | Kelchner et al. |
| 9,611,709 B2 | 4/2017 | O'Malley |
| 9,617,814 B2 | 4/2017 | Seals et al. |
| 9,625,226 B2 | 4/2017 | Lee et al. |
| 9,631,462 B2 | 4/2017 | Tirado et al. |

(56) References Cited

U.S. PATENT DOCUMENTS

| | | |
|---|---|---|
| 9,649,682 B2 | 5/2017 | Keener |
| 9,650,857 B2 | 5/2017 | Mailand et al. |
| 9,677,363 B2 | 6/2017 | Schacherer et al. |
| 9,689,223 B2 | 6/2017 | Schacherer et al. |
| 9,689,237 B2 | 6/2017 | Johnson et al. |
| 9,689,238 B2 | 6/2017 | Hardesty et al. |
| 9,689,239 B2 | 6/2017 | Hardesty |
| 9,695,646 B2 | 7/2017 | Grice |
| 9,702,029 B2 | 7/2017 | Fripp et al. |
| 9,708,894 B2 | 7/2017 | Ditzler et al. |
| 9,719,339 B2 | 8/2017 | Richard et al. |
| 9,725,993 B1 | 8/2017 | Yang et al. |
| 9,745,836 B2 | 8/2017 | Zevenbergen et al. |
| 9,745,847 B2 | 8/2017 | Ditzler |
| 9,750,162 B2 | 8/2017 | Szarek |
| 9,752,423 B2 | 9/2017 | Lynk |
| 9,759,049 B2 | 9/2017 | Hardesty et al. |
| 9,759,356 B2 | 9/2017 | Ott et al. |
| 9,765,601 B1 | 9/2017 | Yang et al. |
| 9,776,767 B2 | 10/2017 | DeJesus et al. |
| 9,789,506 B2 | 10/2017 | Kosta |
| 9,803,455 B1 | 10/2017 | Yang et al. |
| 9,810,036 B2 | 11/2017 | Mailand et al. |
| 9,810,047 B2 | 11/2017 | Filyukov et al. |
| 9,816,791 B2 | 11/2017 | Erickson et al. |
| 9,822,618 B2 | 11/2017 | Eitschberger |
| 9,823,053 B1 | 11/2017 | Fink |
| 9,833,838 B2 | 12/2017 | Mazyar et al. |
| 9,839,889 B2 | 12/2017 | Quinto |
| 9,841,253 B2 | 12/2017 | Anthony |
| 9,845,666 B2 | 12/2017 | Hardesty et al. |
| 9,851,191 B2 | 12/2017 | Lerche et al. |
| 9,855,229 B2 | 1/2018 | Khairatkar-Joshi et al. |
| 9,856,411 B2 | 1/2018 | Sadana et al. |
| 9,869,160 B2 | 1/2018 | Onuoha |
| 9,870,048 B2 | 1/2018 | Yamazaki |
| 9,874,062 B2 | 1/2018 | Lajesic et al. |
| 9,879,492 B2 | 1/2018 | Kitzman |
| 9,896,915 B2 | 2/2018 | Balun et al. |
| 9,914,165 B2 | 3/2018 | Erickson |
| 9,925,628 B2 | 3/2018 | Drexler |
| 9,926,777 B2 | 3/2018 | Rodgers et al. |
| 9,938,789 B2 | 4/2018 | Silva et al. |
| 9,951,589 B2 | 4/2018 | Wilson |
| 9,963,231 B2 | 5/2018 | Chattopadhyay |
| 9,988,898 B2 | 6/2018 | McColphin |
| 9,989,512 B2 | 6/2018 | Haggerty |
| 10,035,287 B2 | 7/2018 | Song |
| 2003/0047358 A1 | 12/2003 | Bonkowski |
| 2011/0132607 A1* | 6/2011 | Lahitette ............... E21B 47/122 166/297 |
| 2014/0020896 A1* | 1/2014 | Al-Gouhi ............... E21B 43/117 166/297 |
| 2017/0211363 A1 | 7/2017 | Bradley |
| 2018/0112524 A1* | 4/2018 | Huang ............... E21B 43/119 |
| 2018/0119529 A1 | 5/2018 | Goyeneche |

\* cited by examiner

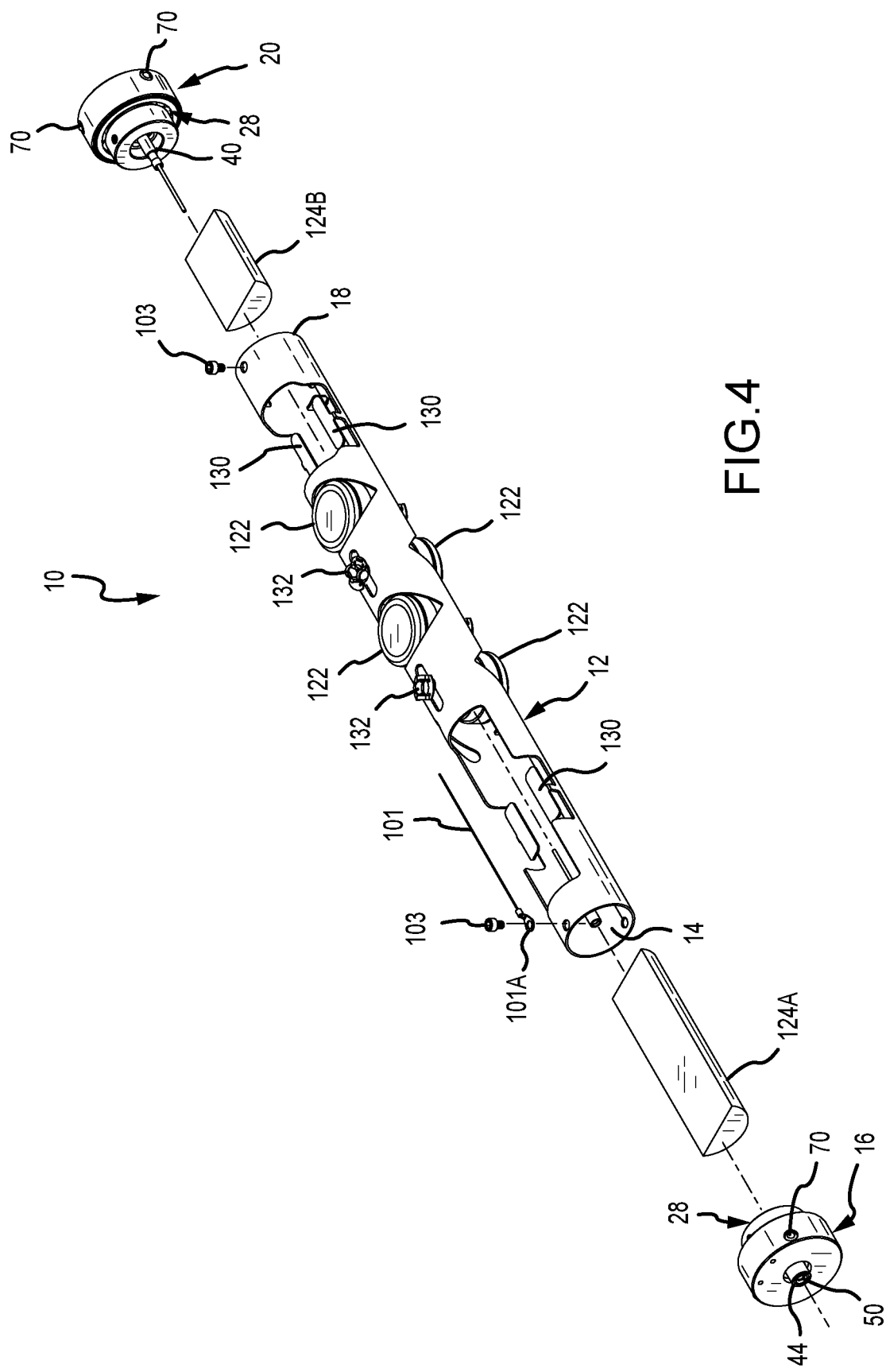

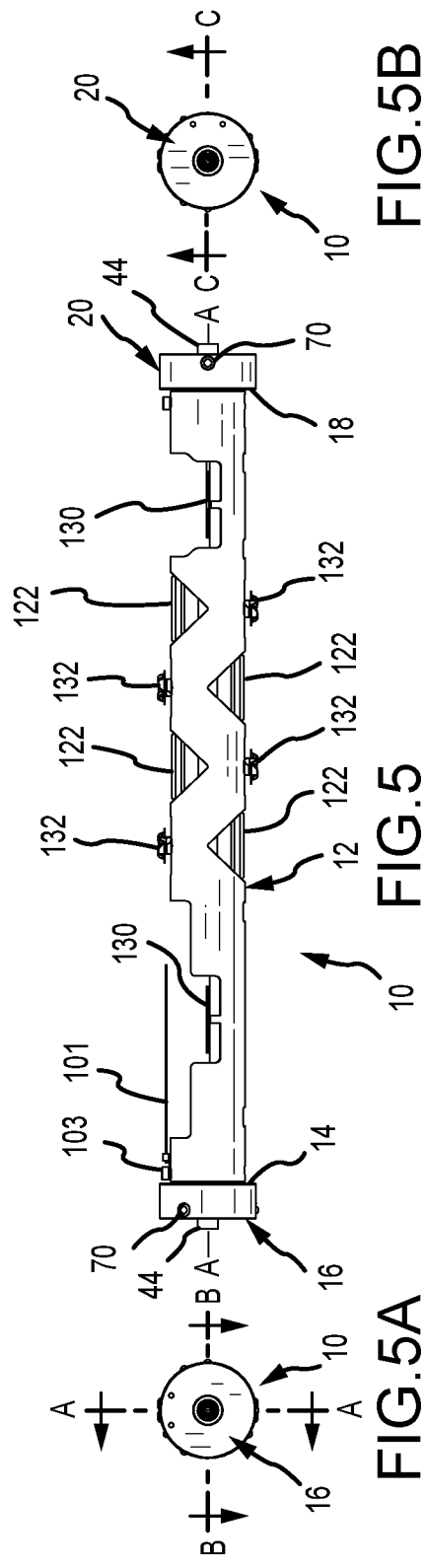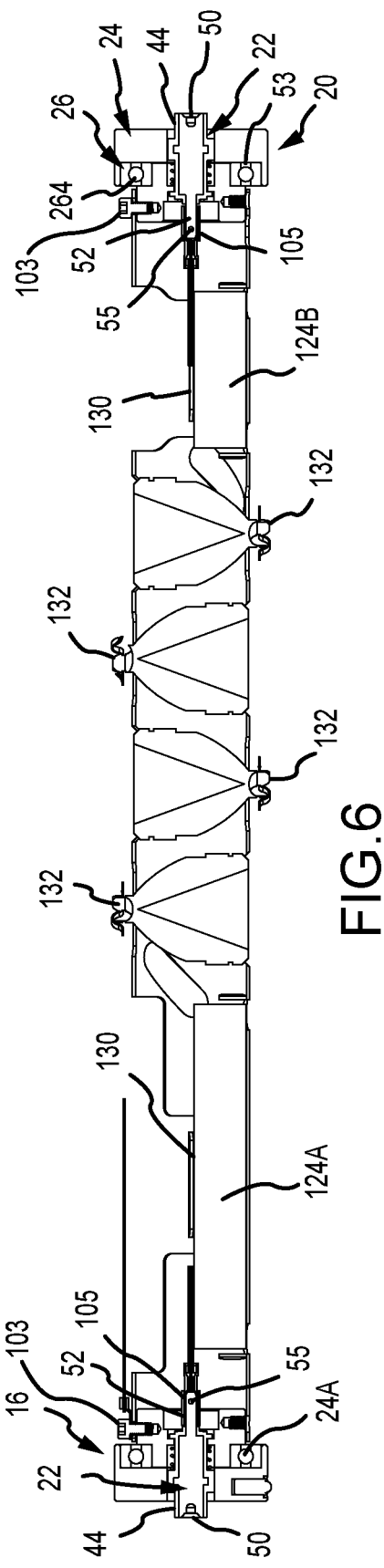

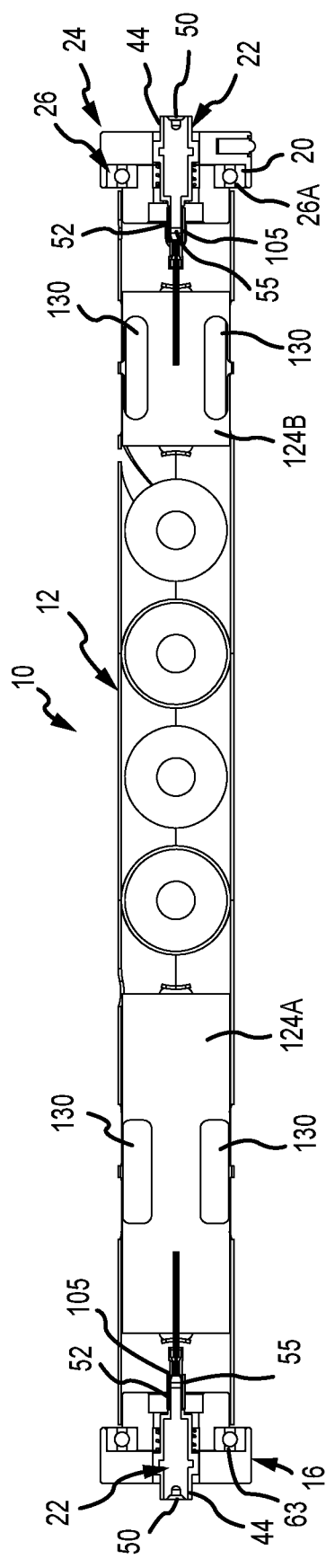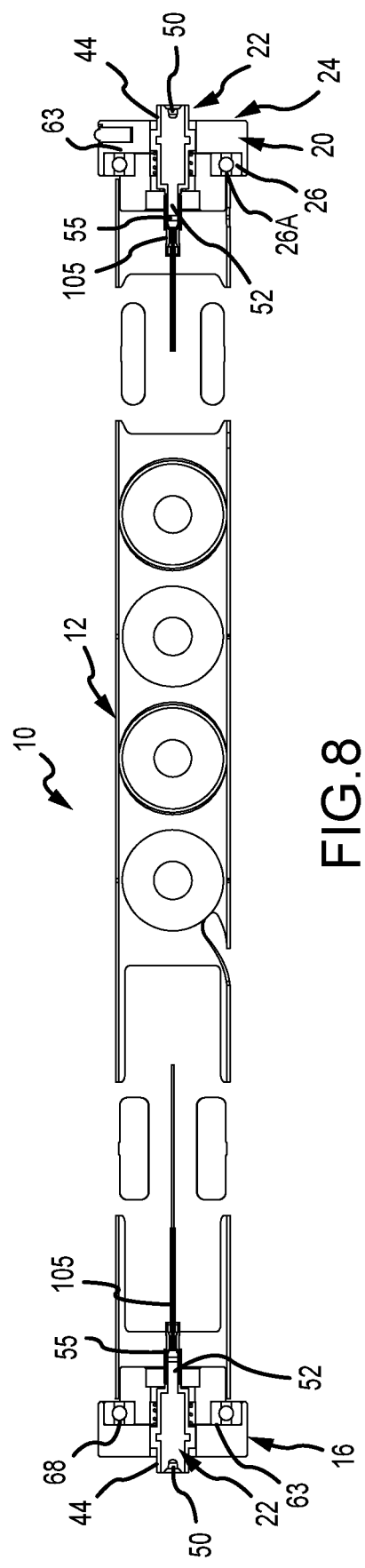

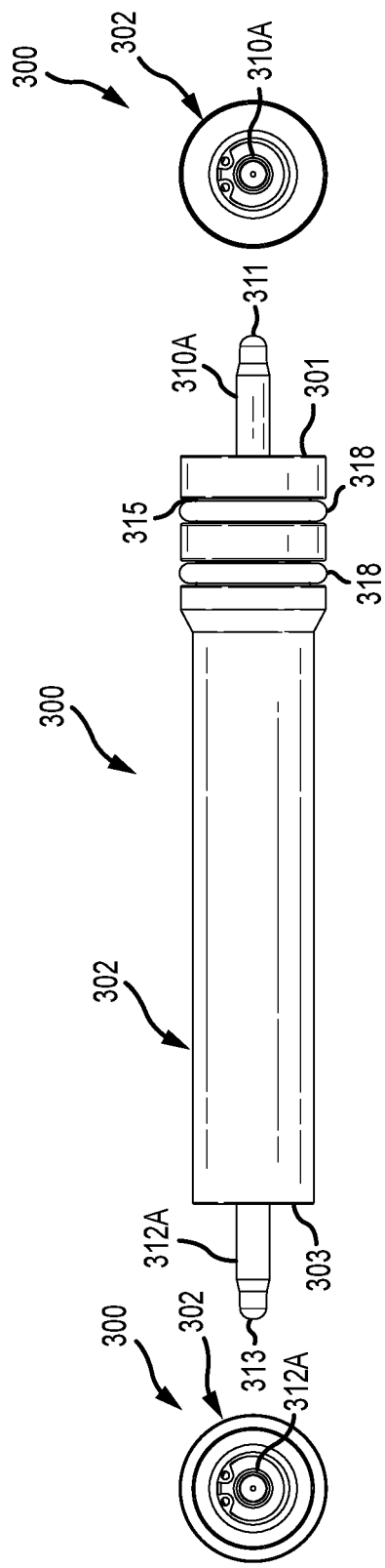
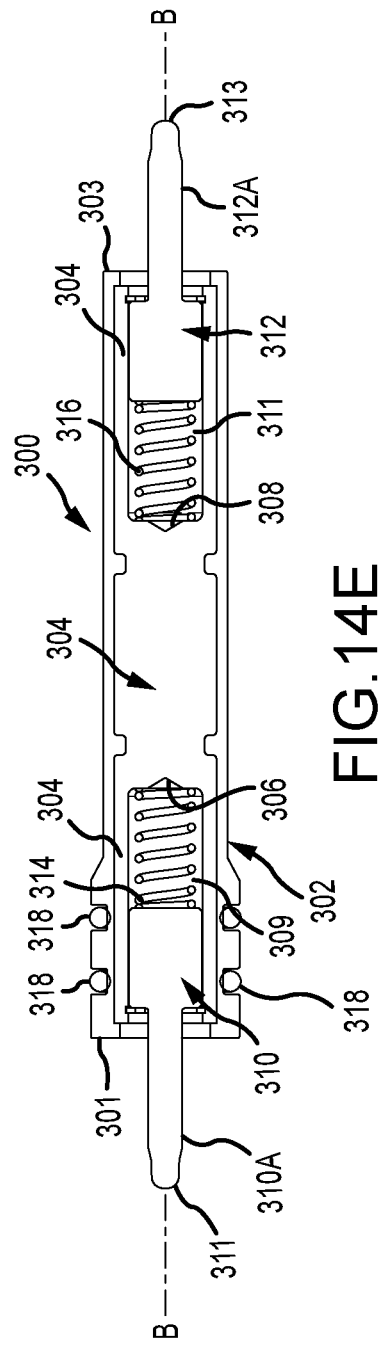
FIG.14B
FIG.14C
FIG.14D
FIG.14E

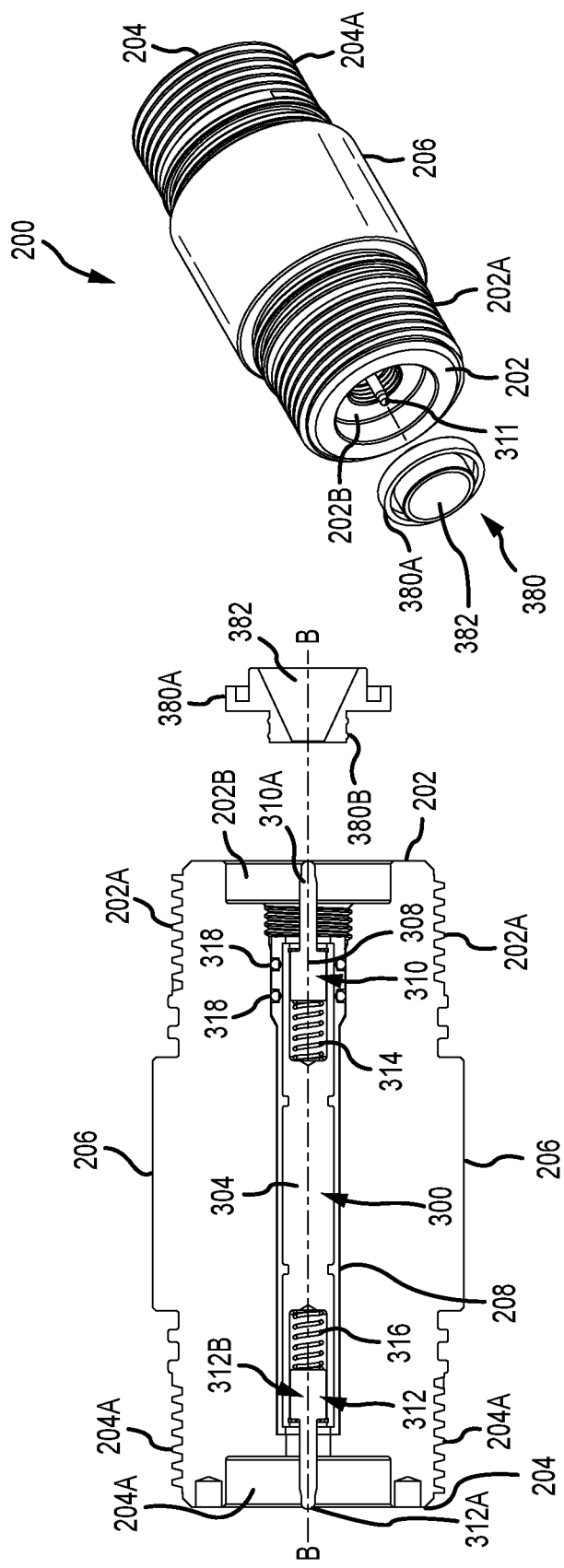

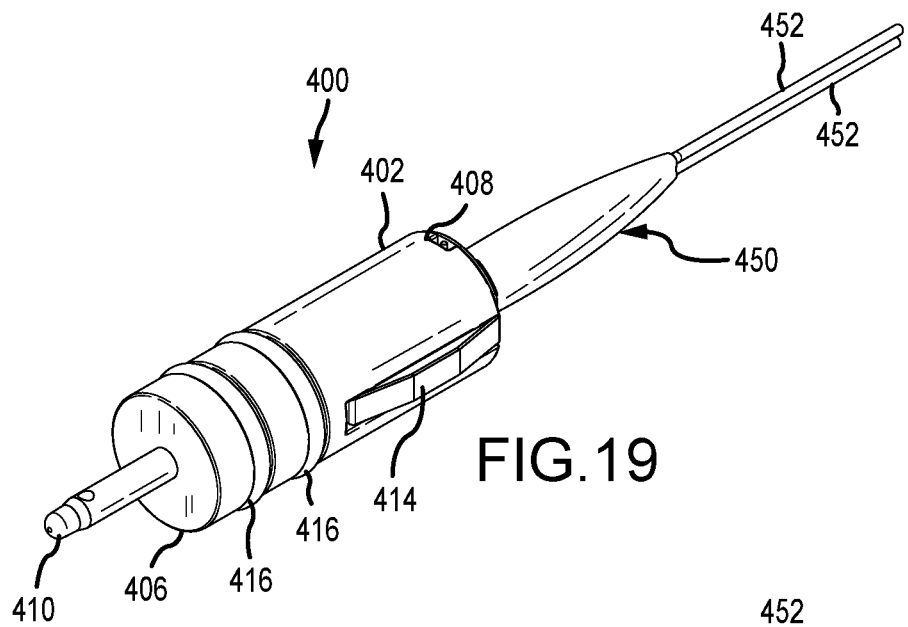
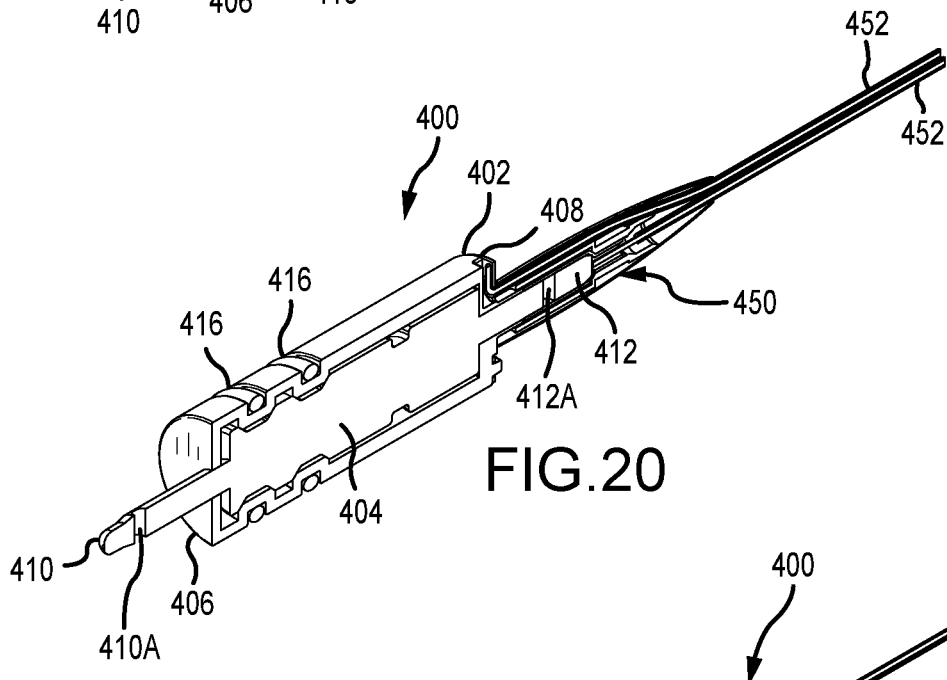
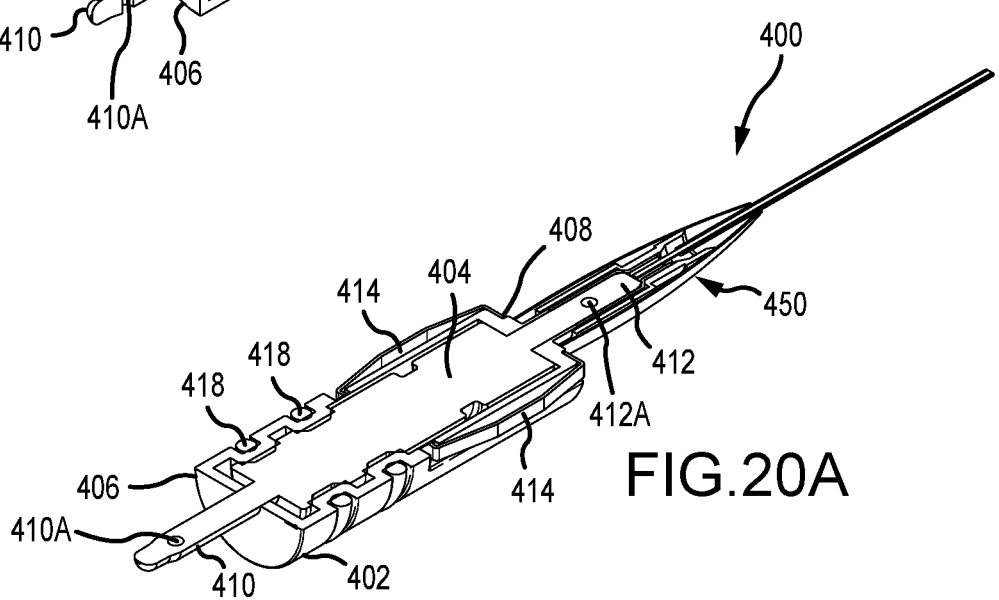

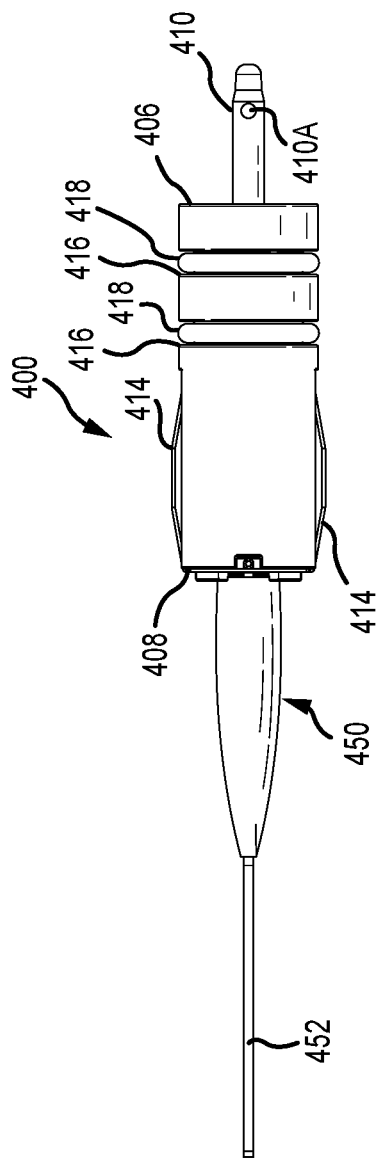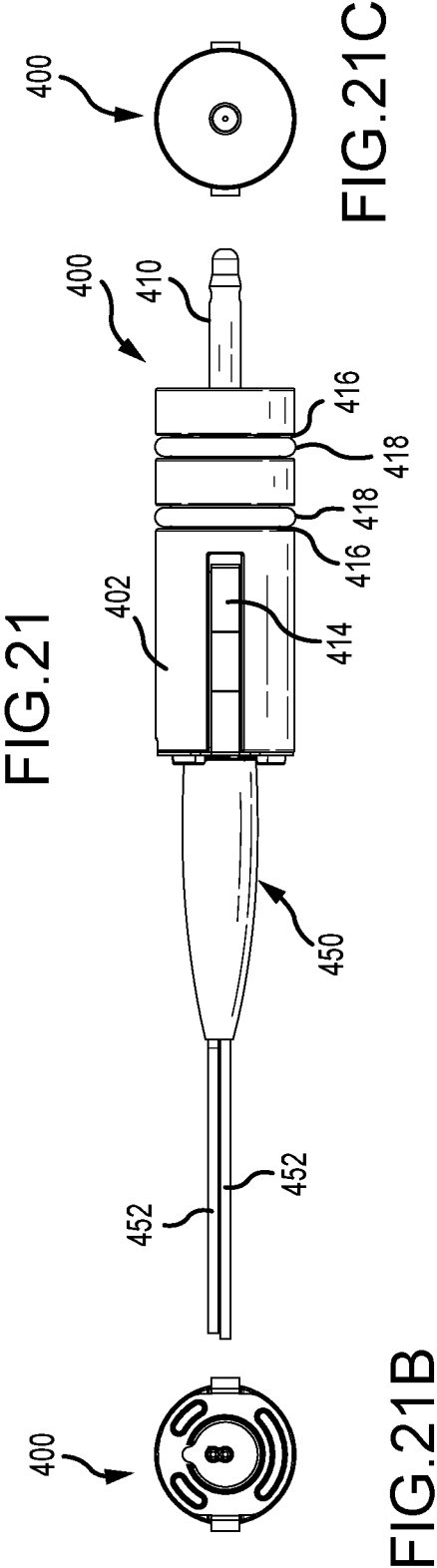

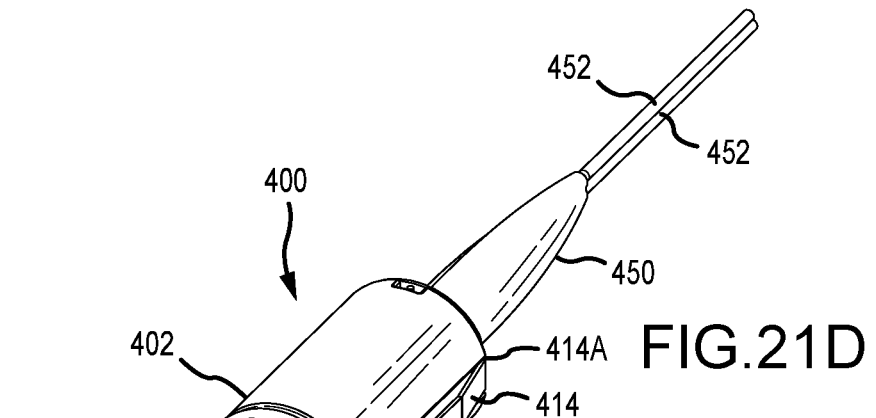
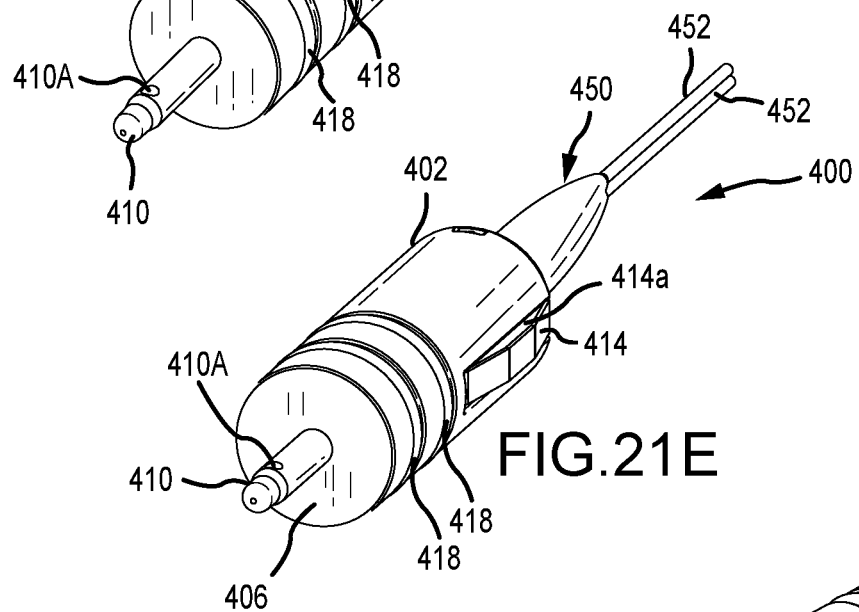
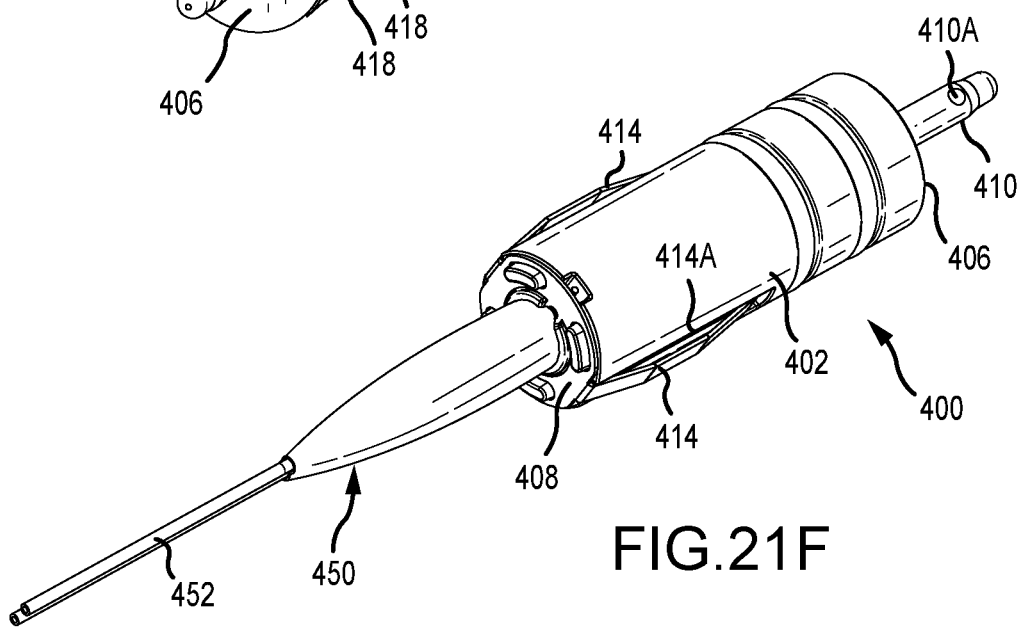

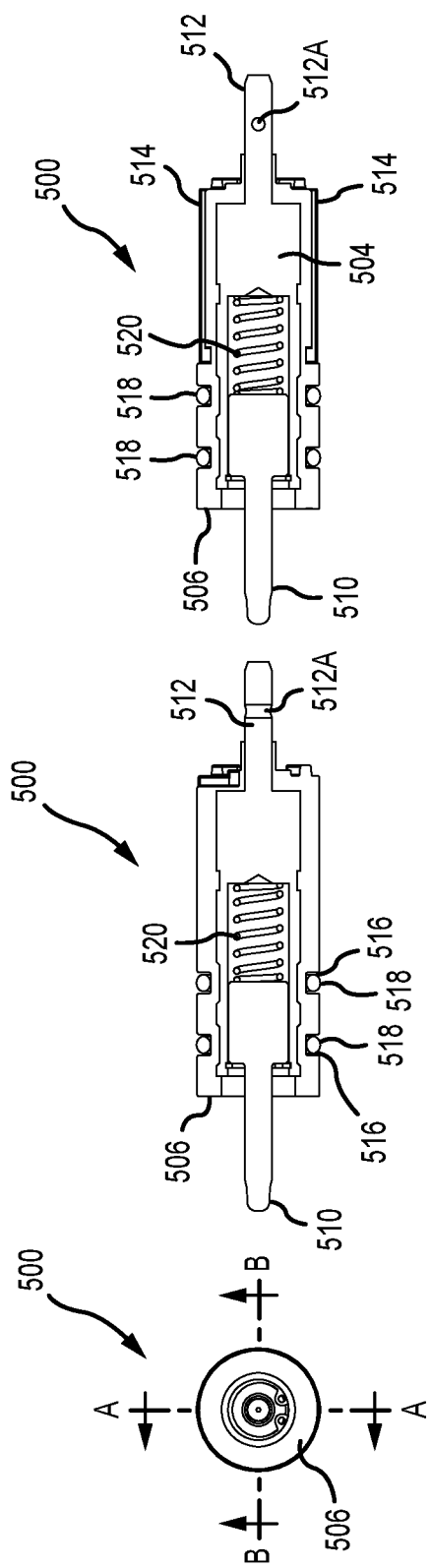

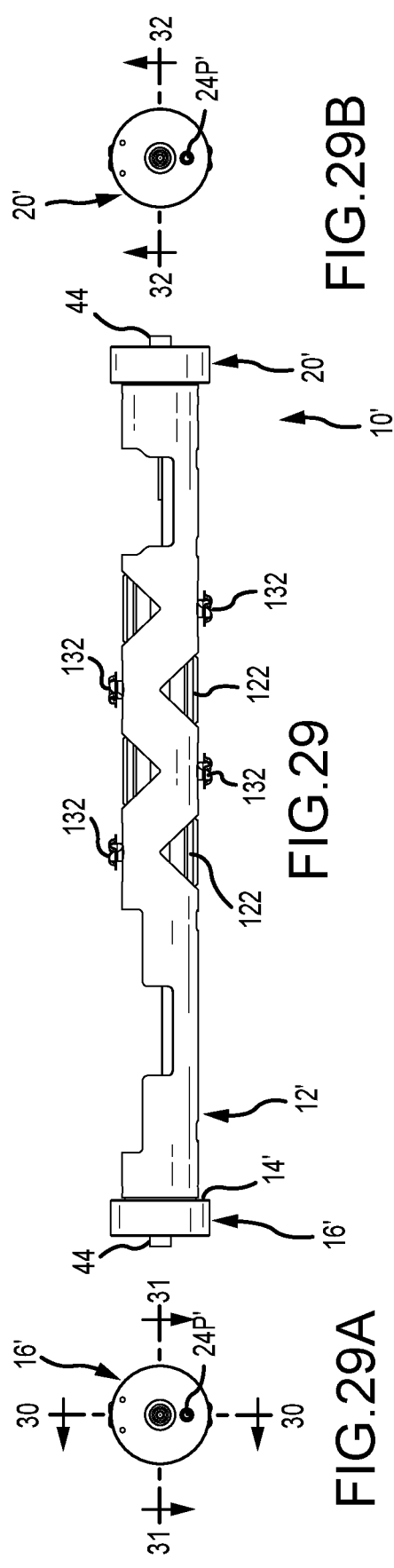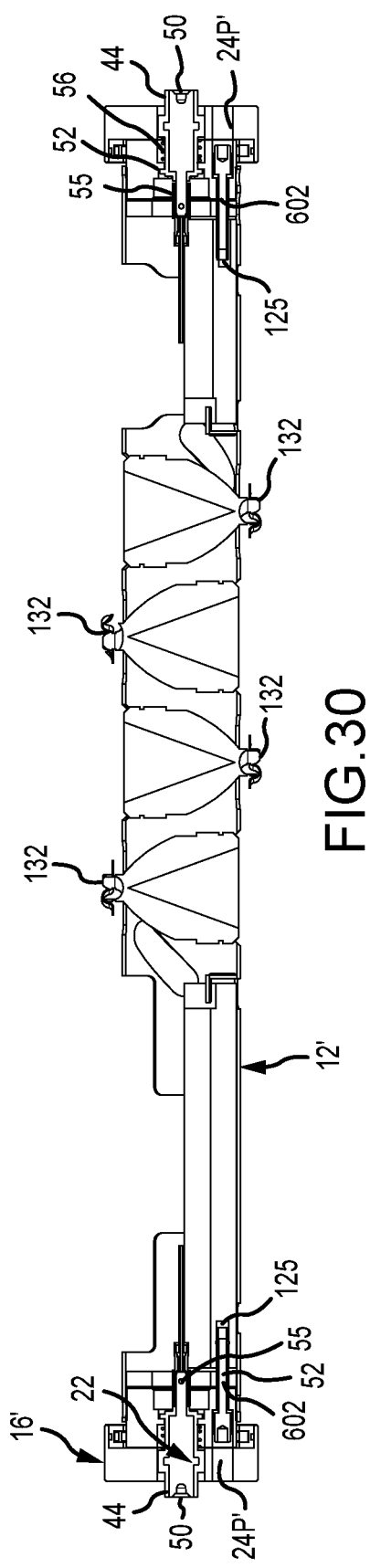

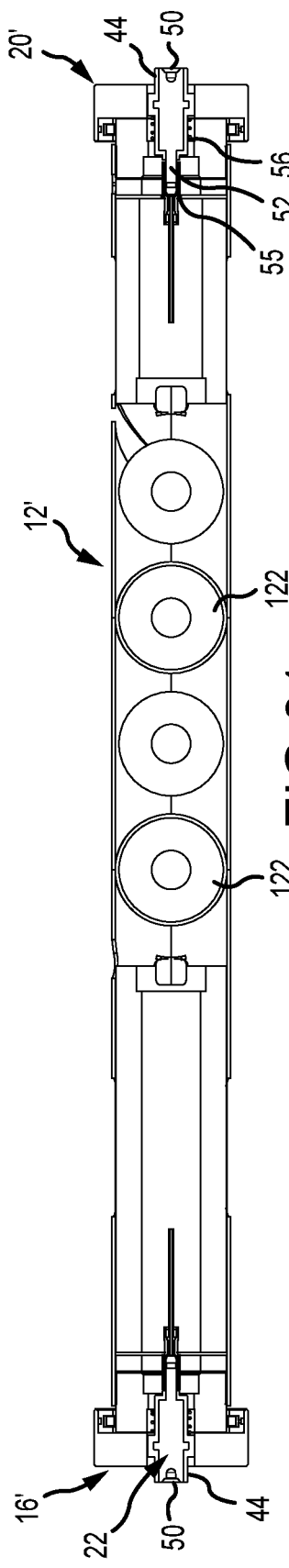
FIG. 31
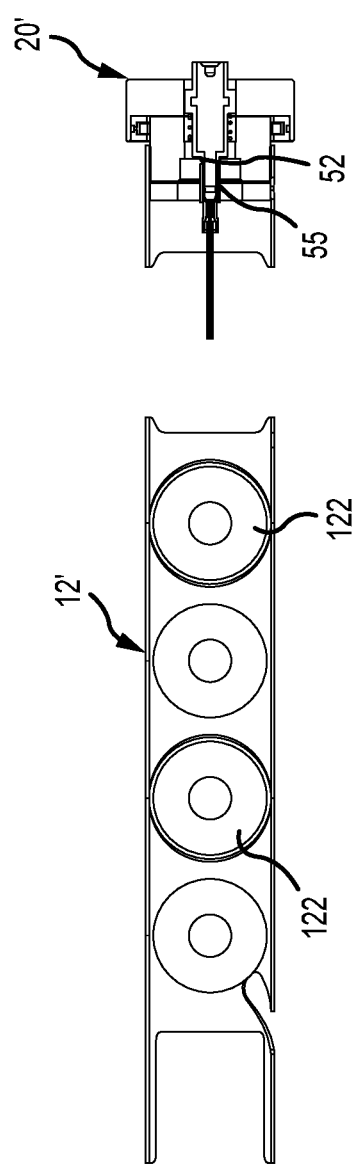
FIG. 32
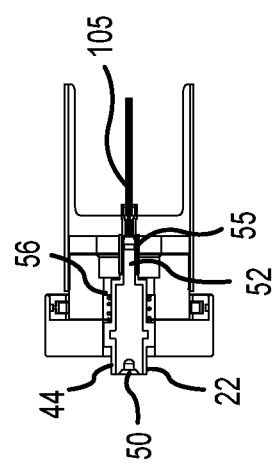

INTELLIGENT DOWNHOLE PERFORATING GUN TUBE AND COMPONENTS

FIELD OF THE INVENTION

The present invention relates to components for perforating wellbores.

BACKGROUND

When drilling oil or gas wells, a wellbore is formed. After drilling, the drill string and bit are removed and the remaining wellbore is lined with a metal casing. A generally annular area is formed between the outside surface of the metal casing and the surrounding formations.

A cementing operation is typically conducted to fill the area between the metal casing and the surrounding formation with concrete. The combination of concrete and metal casing strengthens the wellbore.

Later, perforations are usually made in the metal casing and concrete using a perforating gun assembly that is generally comprised of a steel carrier, and a charge tube inside of the carrier with shaped charges positioned in the charge tube. The perforating gun is lowered into the wellbore and is typically connected to an electric wireline or other conveyance device until it is at a predetermined position. Then a signal actuates a firing head of the gun, which detonates the shaped charges in the gun. The explosion of the shaped charges perforates the metal casing and concrete to allow fluids to flow from the formation into the wellbore.

SUMMARY

The present disclosure includes for perforating gun tubes (also referred to herein as "gun tubes," "tubes," "guns," or "charge tubes") and related structures and components. In one embodiment, a gun tube may include a body, one or more weights in a cavity of the body, and one or more end fittings. Gravity acts on the weights, which causes the gun tube to rotate around its longitudinal axis when the gun is horizontally oriented so the one or more weights are adjacent the bottom of the wellbore. The explosive charges (also called "shape charges"), which are in the gun tube, then point upwards and/or downwards, or in any direction dictated by the position of the one or more weights. The gun tube may include one or more end fittings that include a bearing housing that permit the gun tube body to rotate relative to the end fittings. The gun tube may include tabs that retain the one or more weights in the cavity. There may be multiple sets of tabs so the weights can be positioned and retained at different locations in the cavity in order to position the explosive charges at a desired location relative the one or more weights.

Alternatively, the gun could be rotated by a motor in accordance with a signal generated by a human or machine operator. A sensor could be on the gun, or on a carrier that positions the gun in the wellbore. The sensor would detect the position of the gun and of shape charges in the gun tube relative the wellbore and transmit a signal, or cause a signal to be transmitted, that includes the gun tube's rotational position in the wellbore. An operator could then signal the motor to rotate the gun until the shape charges are at a desired position before the shape charges are fired.

In another embodiment, the one or more weights in the cavity are connected to a rotatable plate at one or both ends of the gun tube. For example, if there are two weights, one would be inside the cavity and attached to a first rotatable plate at a first end of the gun tube. The other weight could be attached to a second rotatable plate at the second end of the gun tube. In this embodiment, the weights are not fixed in the cavity, and as the plates rotate, the weights rotate inside of the cavity. When the plates are fixed in position, such as with fixation pins, the weights are fixed in position in the cavity. The position of the weights in the cavity determines the firing direction of the explosive charges when the gun tube is in a horizontal position in a wellbore.

A gun tube according to this disclosure could also include one or two end fittings that include end connectors. Each end connector has an electrical contact that is biased to a first, extended position, and that can be moved to a second, compressed position when compressive axial force is applied to the electrical contact.

The end connectors may also be configured to attach to the end fitting without tools. An end connector may be inserted into a support of the end fitting by hand and then rotated and released to be retained in the support. Disassembly, if desired, is also done by hand. The end connector would be pressed inward relative the support, and rotated to a position at which it would be released and then separate from the support.

A dual plunger may be utilized as an electrical connection through a sub-assembly used with one or two gun tubes. The dual plunger has at least a first conductive stem, which is preferably biased to a first, extended position, and preferably also has a second conductive stem, which is preferably biased to a first, extended position. Each stem may be moved to a second, compressed position when compressive axial force is applied to the end of the stem. The first conductive stem and second conductive stem can move independently of each other. The plunger could have one end formed to be rotated by a tool in order to be threaded into a sub-assembly. For example, an end of the plunger may have a hexagonal shape.

Because the plungers are removable, and thereby interchangeable, the conductive stems can be designed or configured for any form of electrical contact required.

A double wire through with ground connector ("DWG") could be used instead of a dual plunger in a sub-assembly to transmit electricity to fire the shape charges in a gun tube. If a DWG is used end connectors are not required in the end fittings of the gun tube because electricity could be transferred from wires connected to the DWG directly to the shape charges. Alternatively, end connectors could still be used.

A DWG includes a first conductive stem that may or may not have a first, extended position and a second, compressed position, in the same manner as a conductive stem of the plunger. The DWG also preferably has one or more exterior grounding arms to securely ground to an inner bore of a sub-assembly when the DWG is positioned in the central bore of the sub-assembly. An insulative, protective sheath, which could be wire harness assembly, can be positioned on a second stem of the DWG for the secure connection of wires.

A rubber or plastic (such as silicone rubber) dart retainer may be used with a dual plunger or DWG in place of a metal retainer where a grounding connection or secure method of constraining the dual plunger or DWG is not required. The dart retainer helps to insulate the sub-assembly to prevent shorts, by preventing loose wires from contacting the sub-assembly.

BRIEF DESCRIPTION OF THE DRAWINGS

FIG. 4 is a partially exploded, perspective side view of the gun tube of FIG. 1.

FIG. 5 is a side view of the gun tube of FIG. 1.

FIG. 5A is an end view of the gun tube of FIG. 4.

FIG. 5B is an opposite end view of the gun tube of FIG. 4.

FIG. 6 is a cross-sectional side view of the gun tube of FIG. 4 taken along line A-A of FIG. 5A.

FIG. 7 is a cross-sectional top view of the gun tube of FIG. 4 taken along line B-B of FIG. 5A.

FIG. 8 is a cross-sectional top view of the gun tube of FIG. 4 taken along line C-C of FIG. 5B.

FIG. 14B is a side view of the plunger of FIG. 14.

FIG. 14C is an end view of the plunger of FIG. 14.

FIG. 14D is an alternate end view of the plunger of FIG. 14.

FIG. 14E is a perspective, side view of the plunger of FIG. 14.

FIG. 18B is a side, perspective view of the sub-assembly of FIG. 18.

FIG. 18C is a side, cross-sectional view of the sub-assembly of FIG. 18.

FIG. 19 is a perspective, side view of a double wire feed through with ground.

FIG. 20 is a side, perspective, cross-sectional view of the double wire feed through with ground of FIG. 19.

FIG. 20A is a top, perspective, cross-sectional view of the double wire feed through with ground of FIG. 19.

FIG. 21 is a side view of the double wire feed through with ground of FIG. 18.

FIG. 21A is an alternate side view of the double wire feed through with ground of FIG. 18.

FIG. 21B is an end view of the double wire feed through with ground of FIG. 21A.

FIG. 21C is an alternate view of the double wire feed through with ground of FIG. 21A.

FIG. 21D is a side, perspective view of the double wire feed through with ground of FIG. 21.

FIG. 21E is an alternate view of the double wire feed through with ground of FIG. 21.

FIG. 21F is a perspective, side view of the double wire feed through with ground of FIG. 21.

FIG. 22 is an end view of an alternate double wire feed through with ground.

FIG. 22A is a cross-sectional side view of the double wire feed through with ground of FIG. 22 taken through line A-A.

FIG. 22B is a bottom view of the double wire feed through with ground of FIG. 22 taken through line B-B.

FIG. 29 is a side view of the gun tube of FIG. 28.

FIG. 29A is an end view of the gun tube of FIG. 29.

FIG. 29B is an opposite end view of the gun tube of FIG. 29.

FIG. 30 is a cross-sectional side view of the gun tube of FIG. 29 taken along line A-A of FIG. 29A.

FIG. 31 is a cross-sectional top view of the gun tube of FIG. 29 taken along line B-B of FIG. 29A.

FIG. 32 is a cross-sectional top view of the gun tube of FIG. 29 taken along line C-C of FIG. 29B.

DETAILED DESCRIPTION OF PREFERRED EMBODIMENTS

Figure 1:
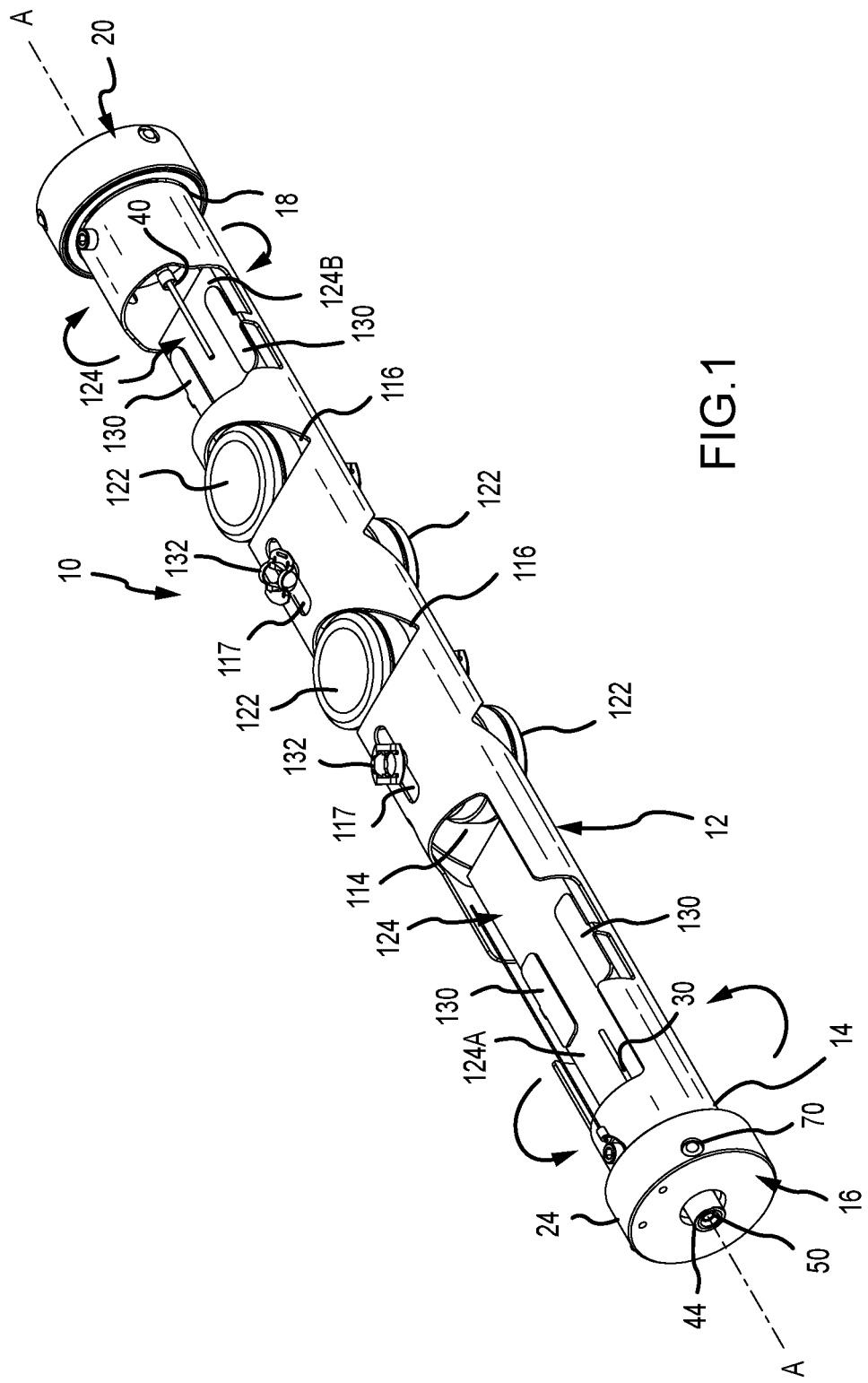
FIG. 1 is a perspective, side view of a gun tube in accordance with aspects of the invention.
Figure 2:
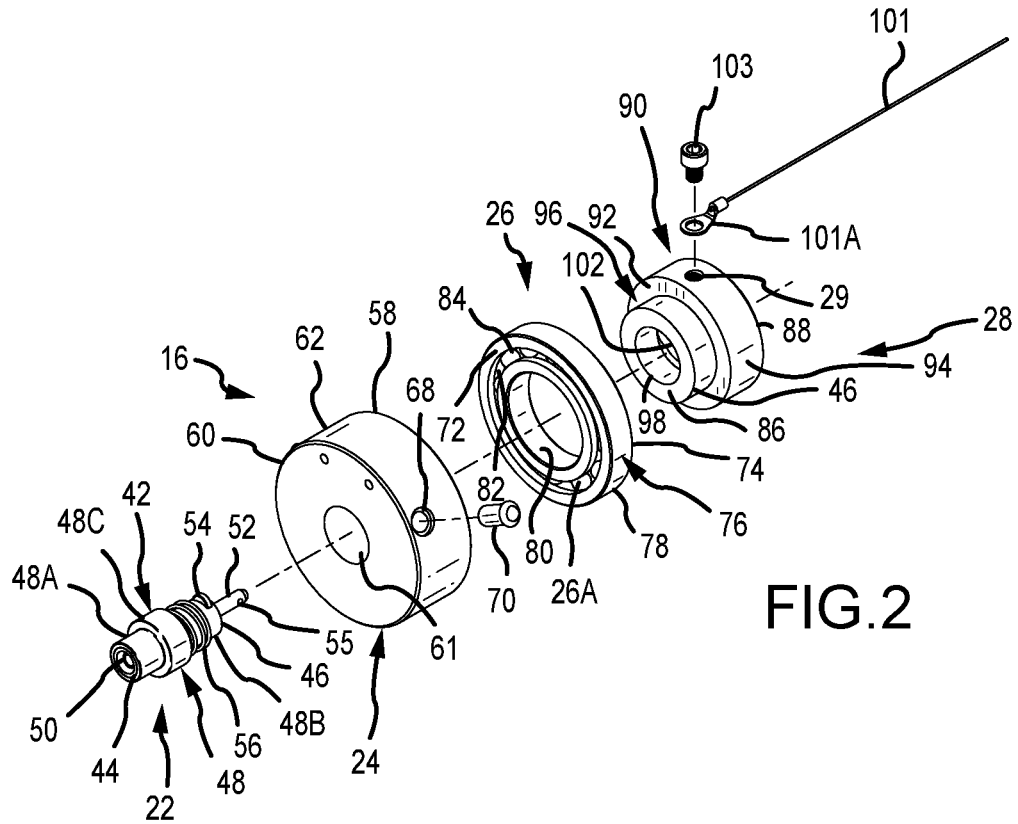
FIG. 2 is an exploded, perspective side view of a first end cap of the gun tube of FIG. 1.
Figure 3:
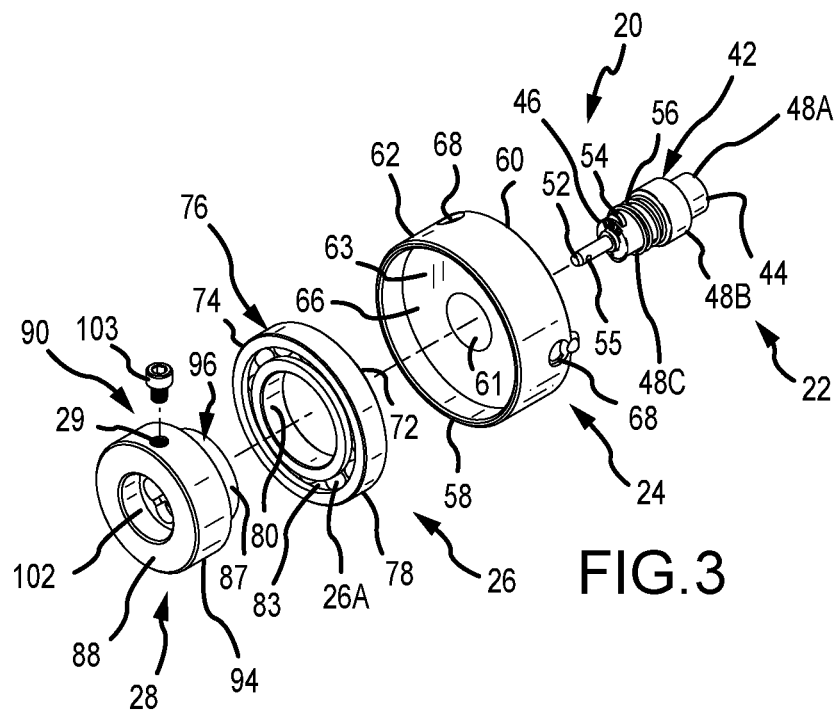
FIG. 3 is an exploded, perspective side view of a second end cap of the gun tube of FIG. 1.
Figure 9:
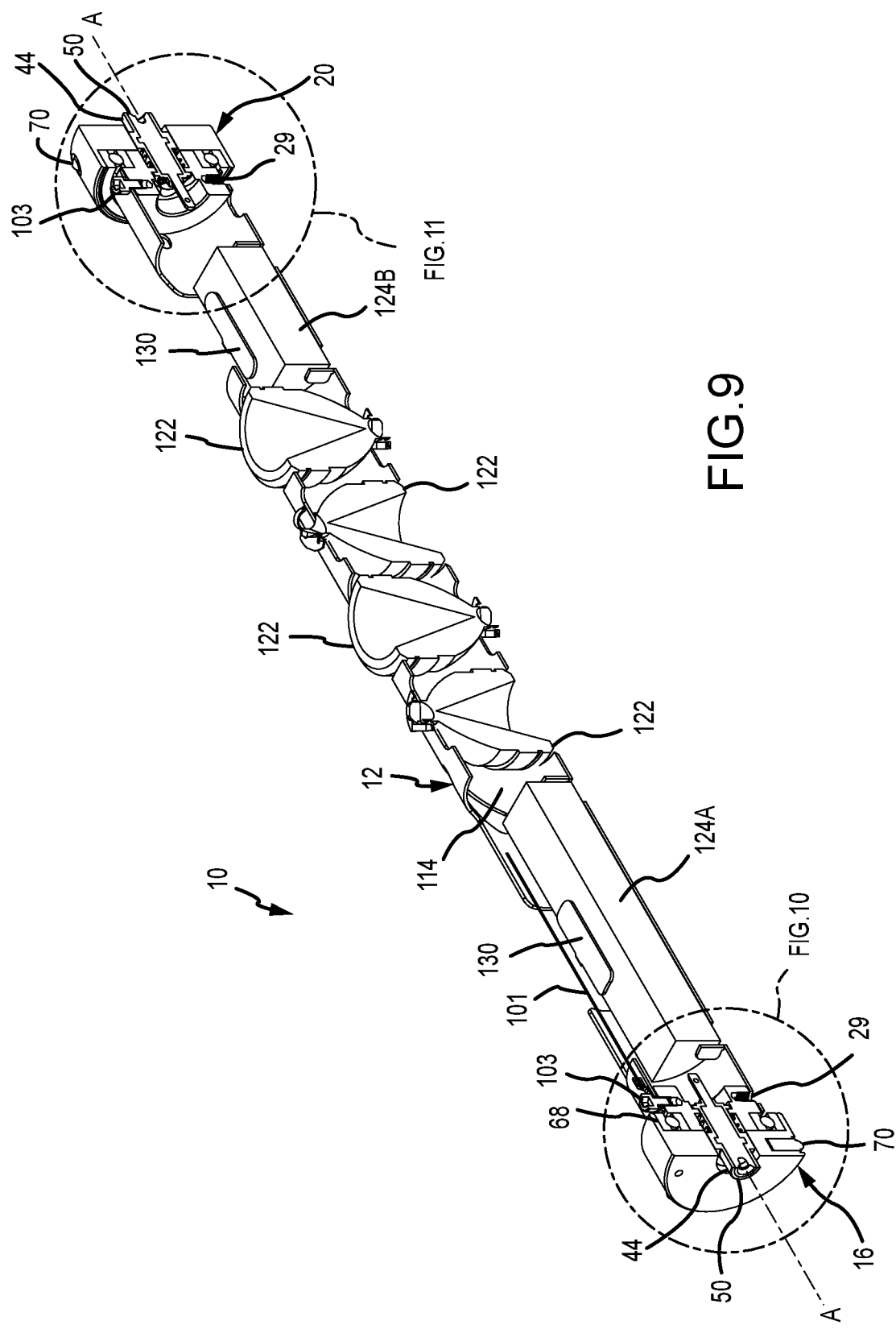
FIG. 9 is a break-away, side perspective view of the gun tube of FIG. 1.
Figure 10:
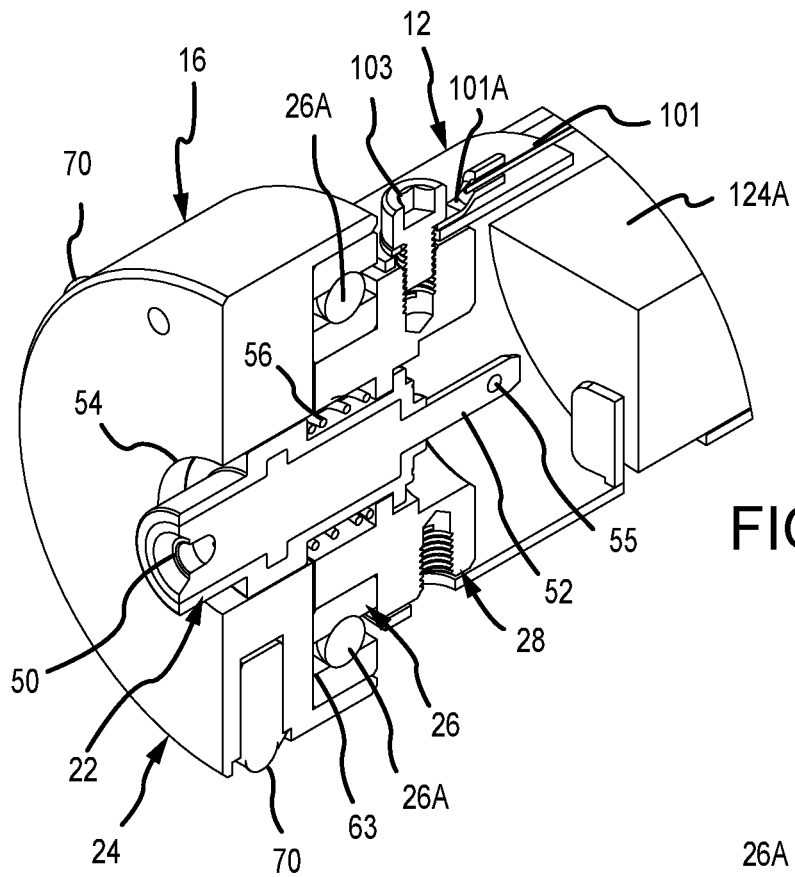
FIG. 10 is a close-up, side, perspective view showing detail D of FIG. 9.
Figure 11:
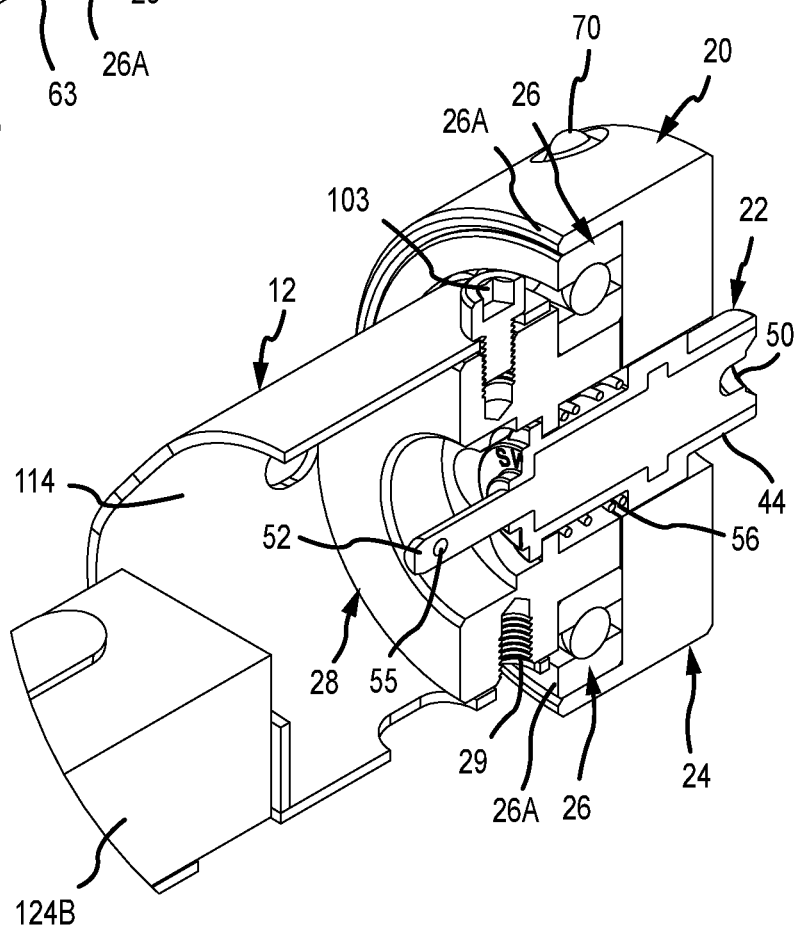
FIG. 11 is a close-up, side, perspective view showing detail E of FIG. 9.

Turning now to the drawings, where the purpose is to describe embodiments of this disclosure and not to limit the claims, FIGS. 1-13A show a gun tube 10.

Gun Tube

Gun tube 10 has a body 12, a first end 14 with a first end fitting 16, and a second end 18 with a second end fitting 20. Gun tube 10 further includes a cavity 114, charge openings 116, charge clip openings 117, and tabs 130. Tube 10 is preferably cylindrical and formed of steel.

Openings 116 are configured to retain shape (or explosive) charges 122, best seen in FIGS. 1-8. Openings 116 can be of a suitable shape, size, and position to hold a specific type or size of shape charge 122, and point the shape charge 122 outward in a specific direction. Openings 117 are configured so that clips 132 can be positioned on the outer wall of tube body 12. Clips 132 are attached to wires that connect to the shape charges 122 in a manner known to those skilled in the art.

One or more weights 124 are positioned in cavity 114. As shown, there are two weights 124A, 124B, although only one, or more than two, weights may be used. One or more weights 124 can be of any size, shape or weight suitable to move tube 10 so that the one or more weights 124 cause tube 10 to rotate relative baring housings 26 so the portion of tube 10 that retains one or more weights 124 is at the bottom of the wellbore (i.e., closest to the Earth's center) when tube 10 is positioned horizontally in a wellbore. Bearing housings 26 allow tube 10 to rotate around axis A in either direction relative the first end fitting 16 and the second end fitting 20.

Weight 124A as shown is semi-circular, comprised of steel, fills about half of the volume of cavity 114, in which it is positioned, is juxtaposed end 14 of tube 10 and extends about ⅓ of the length of tube 10. Weight 124A preferably weighs about 1¾ lbs. at sea level in this embodiment. Weight 124B as shown is semi-circular, comprised of steel, fills about half the volume of cavity 114, in which it is positioned, is juxtaposed end 18 and extends about ⅕ of the length of tube 10. Weight 124B most preferably weighs about 0.8 lbs. at sea level in this embodiment. The size, weight, and configuration of one or more weights 124 can be varied to any suitable amount depending upon the application and diameter or length of gun tube 10.

Tube 10 also includes tabs 130 that are used to retain the one or more weights 124 in cavity 114. In the embodiment shown weight 124A and weight 124B are positioned in cavity 114. Then tabs 130 are pressed down against the flat surface of weight 124A to retain weight 124 in cavity 114, and pressed down against the flat surface of weight 124B to retain weight 124B in cavity 114. Thus, the tabs 130 in the Figures are shown in their pressed down position.

Alternatively, one or more weights 124 may be positioned differently relative to shape charges 122 in tube 10 than as shown. When positioned as shown, shape charges 122 will basically face straight upwards and straight downwards when tube 10 is positioned horizontally in a wellbore, because gravity pulls the one or more weights 124 to the bottom of the wellbore. If an operator instead wanted the shape charges 122 to be positioned and fired outward at an angle, such as 45°, 60°, or 90°, from straight up or straight down, the one or more weights 124 could be positioned differently in the cavity 114. Then, when gravity pulls and orients the one or more weights 124 to the bottom of the horizontal wellbore, the shape charges 122 would be oriented to fire in the desired direction. So, tube 10 can have a plurality of tabs 130 sufficient to position the one or more weights 124 at multiple locations within cavity 114. An operator can then select the desired location for the one or more weights within cavity 114 depending on the direction the operator would like shape charges 122 to fire.

End Fittings and End Contacts

First end fitting 16 includes an end contact 22, an outer collar 24, a bearing housing 26, and a support 28. Second end fitting 20 has the same structure and components as first end fitting 16. Second end fitting 20 includes an end contact 22, an outer collar 24, a bearing housing 26, and a support 28. Because the respective components of each end fitting 16 and 20 have the same structure, only the components of first end fitting 16 will be described in detail. The same components or structures on second end fitting 20 are designated by the same reference numerals as those for first end fitting 16.

End contact 22 has a body 42 with a first end 44, second end 46, and an annular center 48. First end 44 has an electrical contact 50. A stem 52 extends from second end 46.

Stem 52 has an opening 55 to which a wire can be connected. End contact 22 has an internal structure, known to those in the art, that enables electricity to be transmitted from contact 50 to stem 52, at which point electricity is transferred to one or more wires in electrical communication with stem 52.

Body 42 is preferably comprised of an insulating material, such as plastic. One or more frangible elements, which are shown, are two tabs, 54 extend outward from second end 46. As shown, the tabs are rounded and extend outward a maximum of about 1/8" to 5/16", or about 1/8" to 1/4", or about 1/8" to 3/16", or about 3/16" to 1/4" from body 42. Another structure, such as a continuous or discontinuous annular ridge, or different shaped structures, could be used as the one or more frangible elements. The tabs are about 0.080" to 0.150", or about 0.10" or about 0.110", or about 0.120" thick. Body 42 has a first annular portion 48A, a second annular portion 48B, and a central annular position 48C. A spring 56 is positioned on first annular portion 48A between central annular portion 48C and tabs 54.

The spring 56 used for each end contact 22 can be selected by an operator to be, for example, a high-tension spring, medium-tension spring, low-tension spring, or a spring of any suitable tension for the given application. The spring is selected in a manner known to those in the art, so that it ensures electrical connectivity to a device that contact 50 touches in order to transmit electricity from the device to contact 50. In one embodiment, contact 50 touches the stem of a plunger, which is described below. In another embodiment, the contact 50 touches a mechanical switch (not shown), which is known to those skilled in the art. The spring pressure exerted by spring 56 must be firm enough to bias contact 50 outward to ensure electrical conductivity, but not so firm that it could prematurely begin setting a mechanical switch due to wellbore vibrations or concussive blasts in adjacent guns.

For example, a spring could be selected to have a compression force of any suitable amount between about 2 lbs. and 10 lbs., or about 3 lbs. to 8 lbs., or about 4 lbs. to 7 lbs., or about 4 lbs. to 6 lbs., or about 5 lbs., or any amount from about 2 lbs. to about 15 lbs., or about 5 lbs. to about 15 lbs.

One or more frangible elements, which as shown are two tabs, 54 are breakable (or frangible) from body 42 upon the application of an outward force along longitudinal axis A generated by an explosion of shape charges 122. One or more frangible elements 54 could break, for example, upon the application of an explosive outward force of: about 30 lbs. or more, about 40 lbs. or more, about 50 lbs. or more, about 60 lbs. or more, about 70 lbs. or more, about 80 lbs. or more, about 90 lbs. or more, about 100 lbs. or more, or any explosive, outward force from about 30-200 lbs. or more, along axis A. The purpose of one or more frangible elements 54 breaking is so the electrical connection to gun tube 10 is broken when the shape charges 122 are exploded. Any suitable structure on end contact 22 could be used for this purpose.

Outer collar 24 is preferably comprised of metal, such as aluminum. Collar 24 has a first end 58, a second end 60 having an opening 61 and an inner surface 63, an annular side wall 62, an opening 64 in first end 58, a cavity 66, and one or more openings 68 in side wall 62. Openings 68 are configured to receive grounding hardware (such as ball plungers, or a spring and electrically conductive ball staked in place) 70, or hardware, such as fastener 103, attaching a ground lead 101.

Bearing assembly 26 is preferably circular in shape and has a first end 72, a second end 74, a body 76 with an outer wall 78 and an inner wall 80, an opening 82 at first end 72, and opening 83 at second end 74, and a cavity 84 that retains ball bearings 26A. Assembly 26 could instead be what persons skilled in the art refer to as a thrust bearing. Any suitable structure to allow the rotation of tube body 12 around axis A may be utilized.

Support 28 is preferably comprised of metal, such as aluminum, and has a first end 86, a second end 88, a first body portion 90 that has a top surface 92 and an annular outer wall 94, a second body portion 96 that has a top surface 98, and an annular outer wall 100, and an opening 102 therethrough. Opening 102 has two wing sections 102A and 102B sized and shaped so frangible elements (shown here as tabs) 54 of end contact 22 can pass therethrough. Top surface 100 has two wing recesses 103A, 103B that are positioned approximately 90° relative wing sections 102A, 102B, wherein the recesses 103A, 103B are configured to receive and retain one or more frangible elements 54 after they pass through openings 102A, 102B and end contact 22 is rotated, as described further below. A rib 107 is formed in opening 102, preferably adjacent recesses 103A, 103B.

Figure 13:
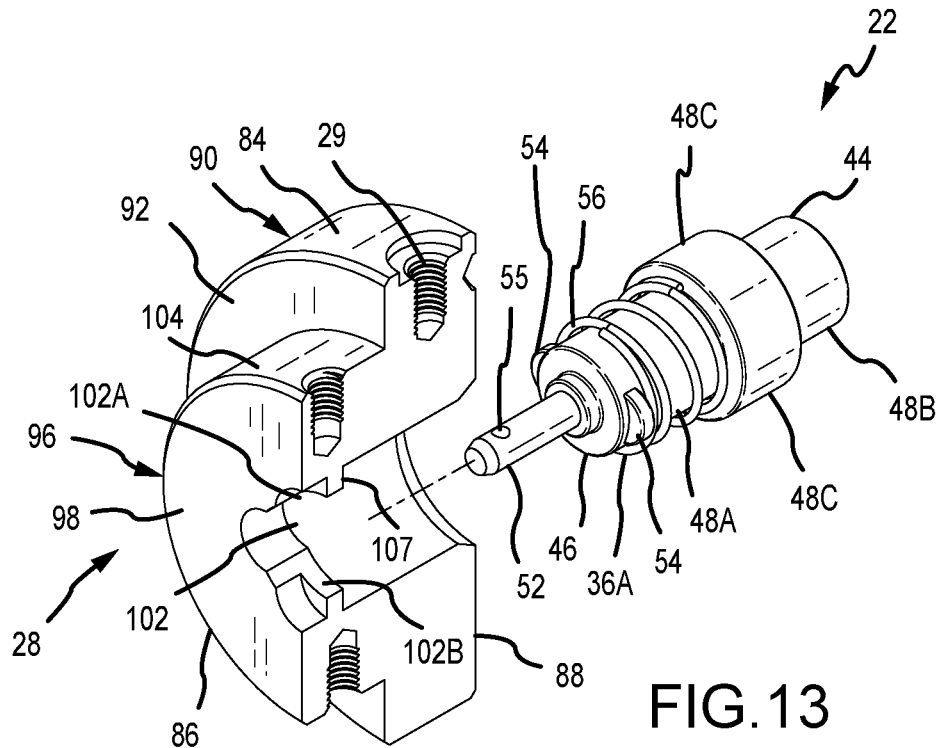
FIG. 13 is a partial, cut-away, perspective view of a support and a side, perspective view of an end connector.
Figure 13A:
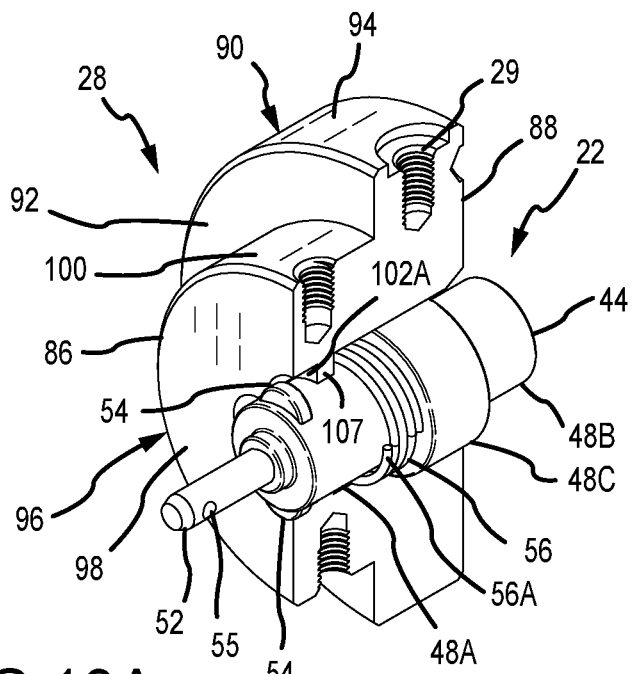
FIG. 13A is a partial, cut-away, perspective view of a support with the end connector of FIG. 13.
Figure 13B:
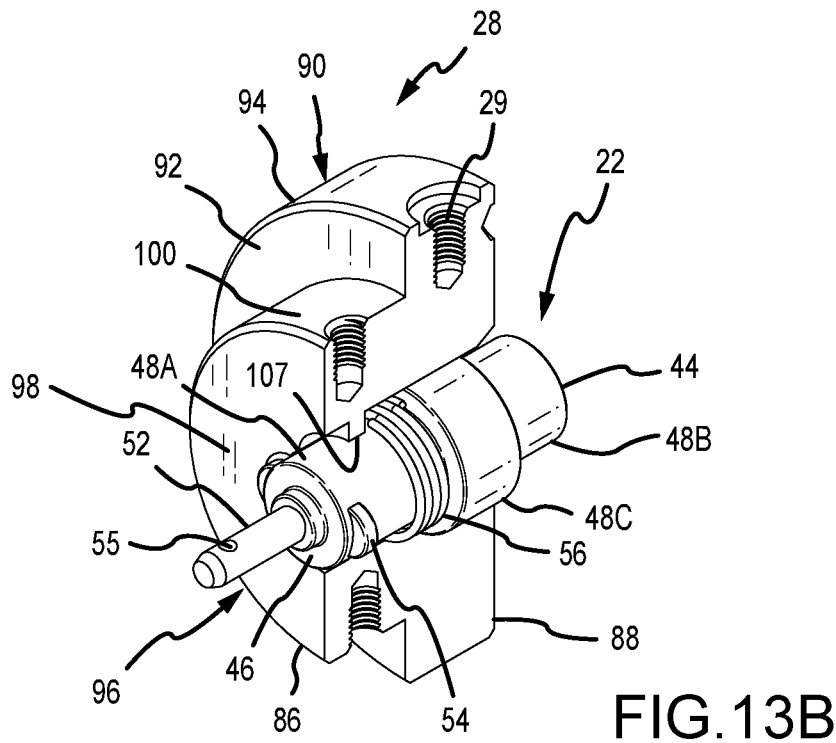
FIG. 13B is an alternate, cut-away, perspective view of a support with the end connector of FIG. 132.
Figure 13C:
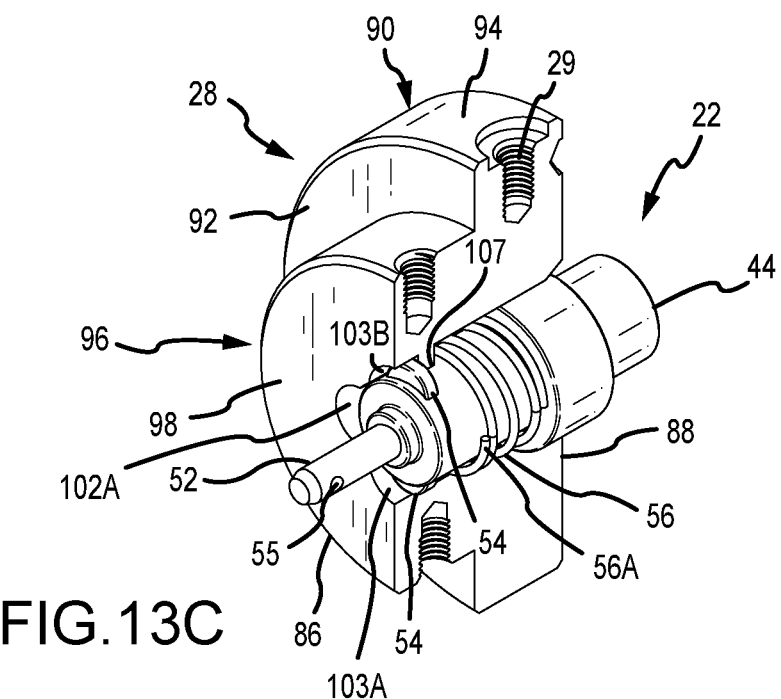
FIG. 13C is an alternate, cut-away, perspective view of a support with the end connector of FIG. 13.
Figure 13D:
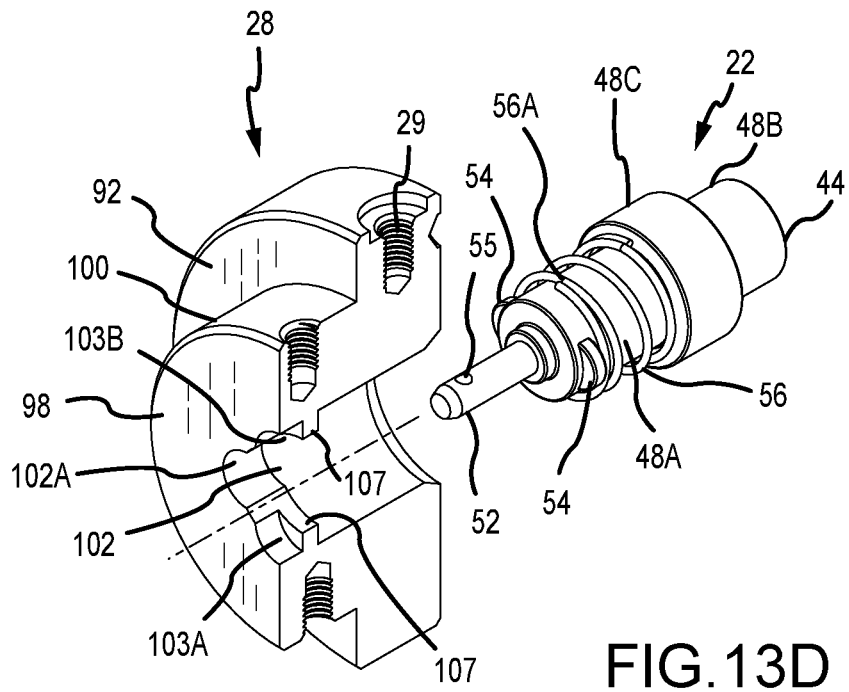
FIG. 13D is a partial, cut-away, side perspective view of a support and a side, perspective view of an end contact.

First end fitting 16 is assembled by placing spring 56 onto portion 48A of end contact 22 between one or more frangible elements 54 and central portion 48C. Then end contact 22 is pressed through opening 102 of support 28 from second end 88, as best seen in FIGS. 13-13J. The one or more frangible elements 54 are aligned with and pushed through wing sections 102A, 102B and end contact 22 is then rotated (preferably about 90°) so the one or more frangible elements 54 align with wing recesses 103A, 103B. Pressure is released by the assembler and the one or more frangible elements 54 are then received and retained in recesses 103A, 103B, and end contact 22 is thus connected to support 28 without the use of tools or fasteners.

When tabs 54 are pressed through wing sections 102A, 102B, first end 56A (adjacent one or more frangible elements 54) of spring 56 presses against rib 107 inside opening 102 of support 28. When the one or more frangible elements 54 are retained in recesses 103A, 103B, spring 56 is retained between rib 107 and central portion 48C. Outward pressure (i.e., towards end 88 and towards end 14 of gun assembly 10) is applied by spring 56 to end contact 22, which biases end contact 22 and electrical contact 50 to the first, extended position.

Bearing housing 26 is positioned over second body portion 96 so that second end 74 and opening 83 are juxtaposed top surface 92 of first body portion 90.

Outer collar 24 is positioned over end contact 22, bearing housing 26 and support 28, so that electrical contact 50 extends through opening 61 of outer collar 24, most preferably by any amount from about 1/16" to about 5/16". First end 72 and opening 82 of bearing housing 26 are then juxtaposed inner bearing surface 63 of outer collar 24.

One or more grounding hardware items 70 are positioned in one or more openings 68 and are preferably press fit into place and staked. The hardware items 70 are preferably either a ball plunger unit, or a combination of spring and electrically conductive ball bearing staked in place.

A ground wire 101 is connected to support 28 by a screw 103 being passed through lead 101A and being threaded into opening 29. An electrical lead 105 may then be positioned over stem 52 by pressing it on where it remains because of a pressure fit lead 105 is preferably comprised of a flexible material such as elastomer. Lead 105 is attached to one or more wires to receive electricity passing through end contact 22. An advantage of lead 105, which is an insulative protective sheath with wires already attached, is ease and speed of use, and creating a reliable connection. Presently, wires are placed by hand through opening 55 of stem 52 and then wrapped around stem 52, and have a silicone tubing sleeve manually placed over the wire wrapping to provide electrical insulation and to keep stem 52 electrically isolated from the gun tube body 12.

End contact 22 has a first position at which spring 56 biases it away from end 88 of support 28, and outward from end connector 16, as shown, e.g., in FIGS. 1-8. End contact 22 has a second, contracted position at which spring 56 is fully compressed. The distance between the first position and the second position is at least 0.150", or at least ⅜", or at least ½", or at least ⅝", or at least ¾" or at least 1", or any amount from 0.150" to 1", or from 0.150" to 1.250". Known end caps do not compress, or may compress only slightly (e.g., about ⅛" or less). The advantage of the outward biasing and travel of the end contact 22 and electrical contact 50 is better reliability in maintaining an electrical connection. When a string of gun tubes 10 are placed in a wellbore as part of an assembly including sub-assemblies 200 (discussed below), stresses on the assembly can create gaps between gun tubes 10 and sub-assemblies 200. Further, stresses, including downstream shape charges exploding, can cause upstream contacts to press against one another, which can lead to breakage and a gap where there is no electrical contact, or broken components that will no longer function. The outward bias and compressibility of the end contacts 22 help alleviate these problems.

Gun Tube with Indexing Weights

In an alternate embodiment shown in FIGS. 28-35, a plate 600 or similar structure may be used to index one or more weights 124' to different positions in cavity 114' of tube 10'. This allows an operator the flexibility to move one or more weights to a desired location, and when gravity acts upon the weights they are moved to be juxtaposed the bottom of the wellbore in which the tube 10' is positioned. The end fittings 16' and 20' in this embodiment again have a rotable portion that enables the tube 10' to rotate around its longitudinal axis A' so that charges 122 are oriented properly.

In this embodiment, tube 10' is in all respects the same as tube 10 except as described herein and as shown in the figures. Pins 602 and indexing apertures 125, 125A retain weights 124A', 124B' in position, as explained below. Tube 10' preferably does not include tabs, such as tabs 130 in tube 10. Optionally, tabs 130 could be utilized to help retain weights 124A' and 124B' in position in the manner previously described.

As shown, each weight 124A' and 124B' in this embodiment have a semi-cylindrical, concave center portion 1241', although each may be of any suitable size, material, and configuration. Each weight 124A and 124B has a first end 126 having a plurality of apertures 125A. Weight 124A' as shown has a semi-circular outer surface, is comprised of steel, fills about half of the volume of cavity 114', in which it is positioned, is juxtaposed end 14' of tube 10' and extends about ⅓ of the length of tube 10'. Weight 124A' preferably weighs about 1¾ lbs. at sea level in this embodiment. Weight 124B' as shown has a semi-circular outer surface, is comprised of steel, fills about half the volume of cavity 114', in which it is positioned, is juxtaposed end 18' and extends about ⅕ of the length of tube 10'. Weight 124B' most preferably weighs about 0.8 lbs. at sea level in this embodiment. The size, weight, and configuration of one or more weights 124' can be varied to any suitable amount depending upon the application and diameter or length of gun tube 10'.

Each of one or more plates 600 is preferably comprised of steel about ¼" to ½" thick, preferably circular, and has a diameter slightly less than the inner diameter of tube body 12'. Plate 600 is connected to the wall of cavity 114 (i.e., the inner wall of tube body 12') by any suitable means, such as soldering or mechanical fastening. If, for example, weights 124A', 124B' were utilized, one of the plates 600 would be juxtaposed weight 124A at first end 14' of tube body 12' and another end plate 600 would be juxtaposed weight 124B at end 18' of tube body 12'. An operator could then rotate each of the weights 124A', 124B' to a desired location in cavity 114 depending on the direction the operator would like the shape charges 122 to fire, and retain the one or more weights 124' in the desired location using a pin 602.

In this example, utilizing two weights, the weights 124A', 124B' would be moved by rotating each to the same relative position in cavity 114' and then using a pin 602 to fit through openings 24P' in each end cap 16' and 20', through an indexing aperture 125 of each end plate 600, and into an aligned aperture 125A in weight 124A' and 124B'. This retains each weight 124A', 124B' at the desired position in cavity 114' of side gun tube 10'.

If two plates are used, each plate 600 preferably has the same number of apertures 125 at the same relative locations as the other plate 600. The apertures 125 preferably include indicia visible on the inner surface 601 (i.e., the surface facing away from an end 14' or 18' of tube 10' and towards its center) to identify each indexed aperture 125, so the same indexed position for each plate 600 could be readily identified by an operator using the indicia. For example, each plate 600 may have eight apertures 125 equally, radially spaced about all or part of the outer portion of the plate 600 (although a plate 600 may include any suitable number of apertures at any suitable locations). To make sure weights 124A', 124B' are the same relative positions in cavity 114', the respective apertures on each plate 600 would have the same indicia to designate apertures 125 at the same relative position in cavity 114'.

For example, if each plate 600 had eight apertures, the apertures could be designated by numerals 1-8. In this example, each weight 124A', 124B' would be at the same radial position in cavity 114' if a pin 602 was positioned in an opening 125 designated by the same indicia (such as numeral "4") on each plate 600. The apertures 125A in each weight 124A', 124B', could also include indicia. For example, if each weight 124' has eight apertures 125A, these apertures could also be designated by numerals 1-8. Using that example, an operator would know that weights 124A', 124B' would be the same relative position in cavity 114' if the aperture 125A designated by the same indicia (such as numeral "4") for each weight 124A', 124B' was aligned with the aperture 125 designated the same indicia (such as numeral "3") in each plate 600. A pin 602 would then be positioned through opening 24P' in each end fitting 16' and 20', through the aperture 125 designated as "3" in each plate 600, and into the aperture 125A designated as "4" in each weight 124A' and 124B'.

End fitting 16' is the same as end fitting 16 except as described here and shown in the figures. End fitting 20' is the same as end fitting 20 except as described here and shown in the drawings.

Bearing assembly 26' is preferably circular in shape and has a first end 72', a second end 74', a body 76' with an outer wall 78' and an inner wall 80', an opening 82' and a cavity 84' that retains ball bearings 26A. Assembly 26' could instead be what persons skilled in the art refer to as a thrust bearing. Any suitable structure to allow the rotation of tube body 12 around axis A' may be utilized. Bearing assembly 26' has a smaller diameter than previously described bearing assembly 26 in order to provide space for pin 602.

Support 28' is preferably comprised of metal, such as aluminum, and has a first end 86', a second end 88', a body portion 90' that has a front surface 92', an annular outer wall 94', and an opening 102' therethrough. Part of aperture 24P' is formed through support 28'. Opening 102' has two wing sections that are the same as previously described wing sections 102A and 102B. The wing sections are sized and shaped so frangible elements (shown here as tabs) 54 of end contact 22 can pass therethrough. Support 28' fits inside of bearing assembly 26' and rotates inside of cap 24.

An aperture 24P' is formed in the various components of end cap 16' and/or 20' to permit insertion of a pin 602 through the end cap 16' and/or 20', through an indexing aperture 125 in a plate 600, and into an aperture 125A of a weight 124'.

Sub-Assembly and Plunger

Figure 12:
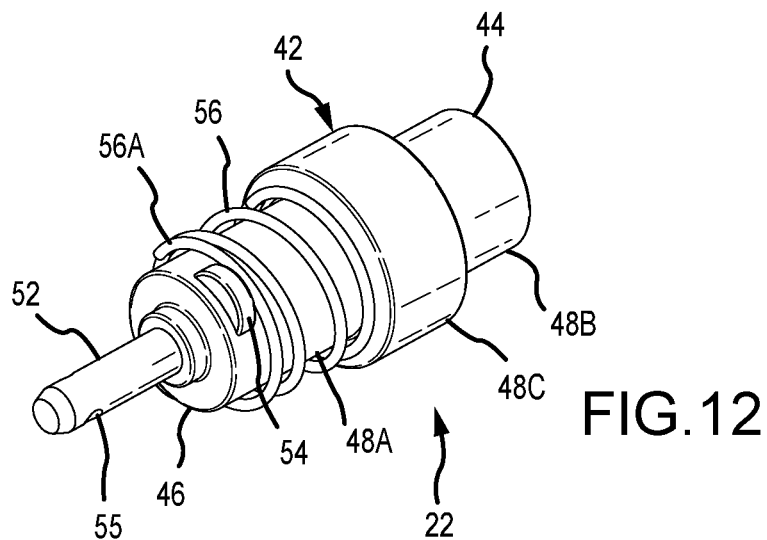
FIG. 12 is a side, perspective view of an end connector in accordance with an embodiment of the invention.
Figure 12A:
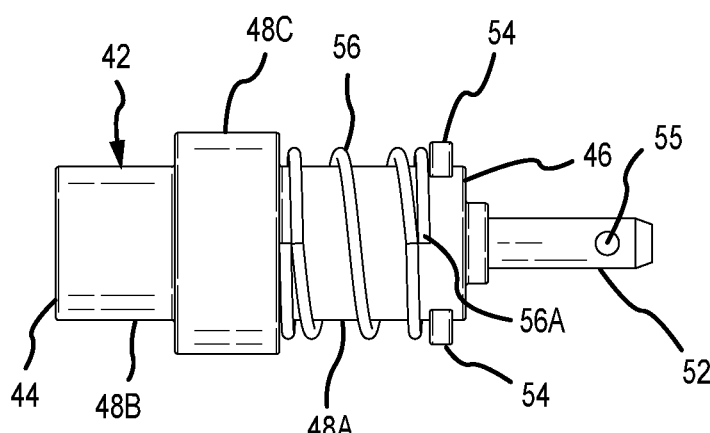
FIG. 12A is a side view of the end connector of FIG. 12.
Figure 12B:
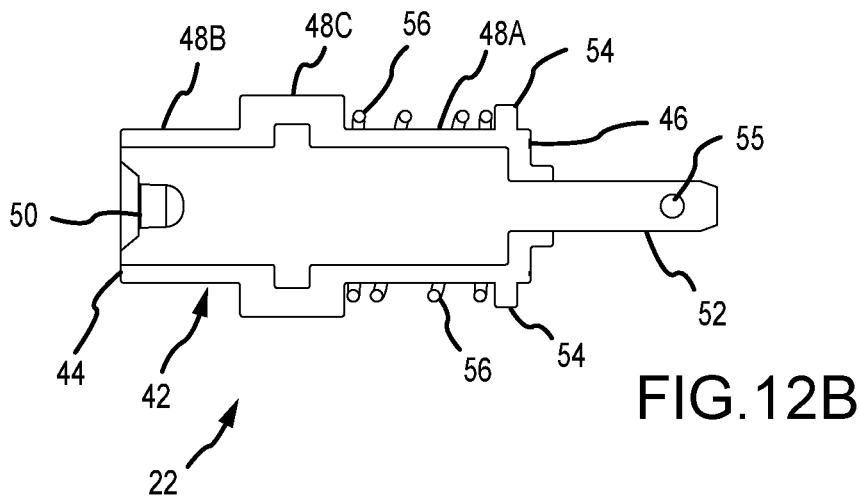
FIG. 12B is a cross-sectional, side view of the end connector of FIG. 12A.
Figure 12D:
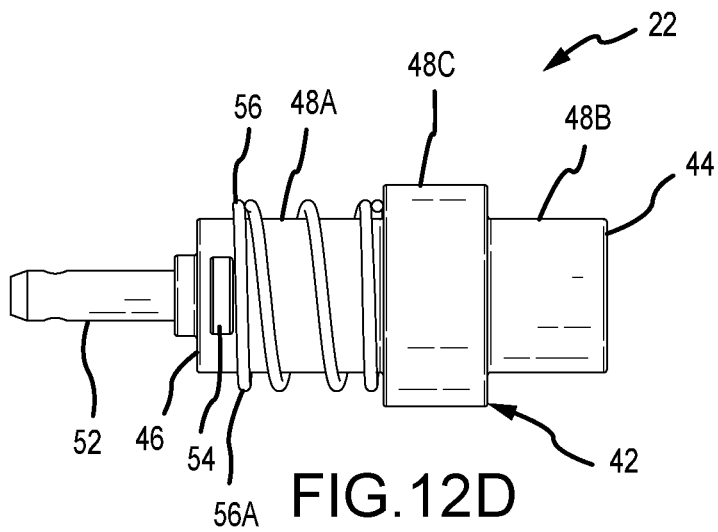
FIG. 12D is an alternate, side view of the end connector of FIG. 12.
Figure 12E:
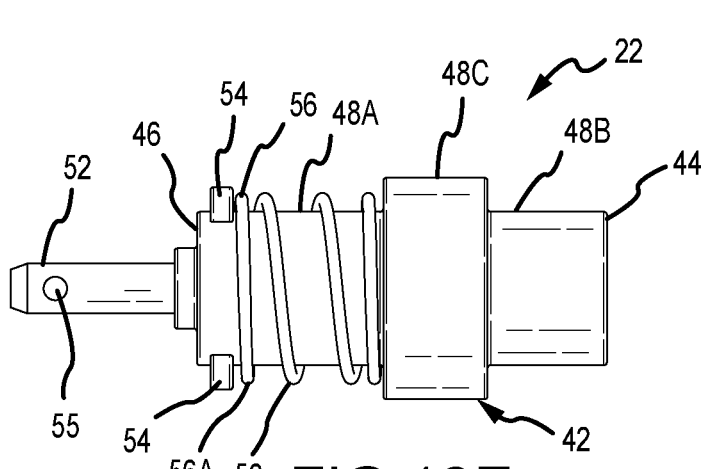
FIG. 12E is a rotated, alternate side view of end connector of FIGS. 12 and 12D.
Figure 12C:
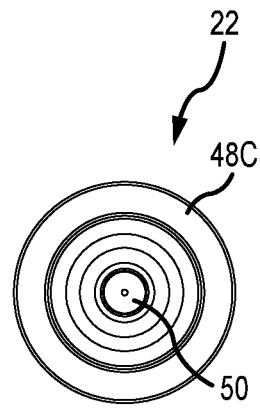
FIG. 12C is an end view of the end connector of FIG. 12A.
Figure 12F:
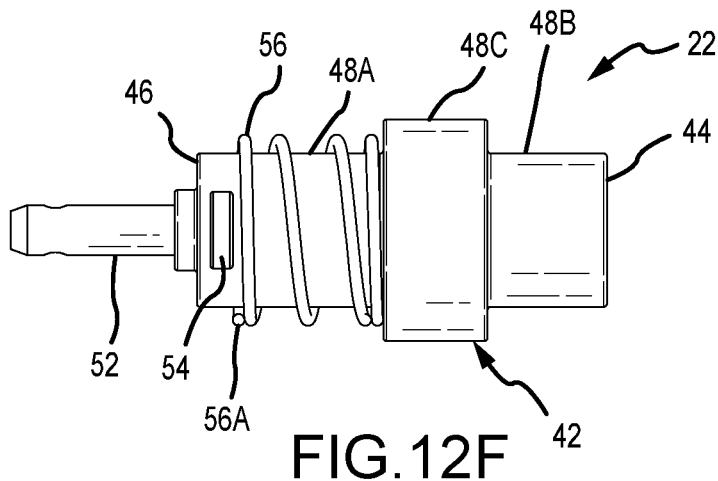
FIG. 12F is a rotated, alternate side view of end connector of FIGS. 12 and 12D.
Figure 12G:
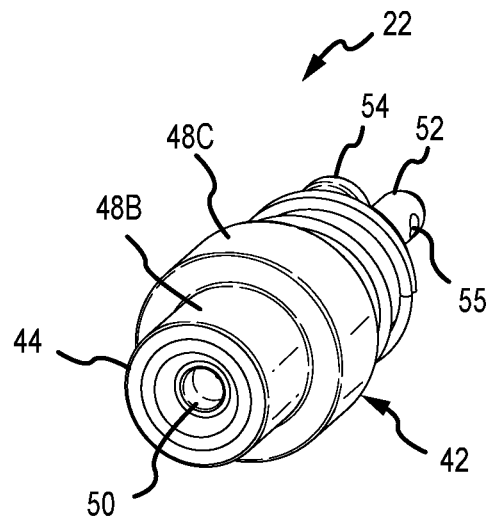
FIG. 12G is a perspective, front end connector view of FIG. 12.
Figure 12H:
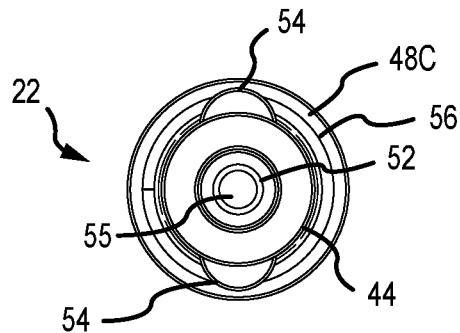
FIG. 12H is an end view of the end connector of FIG. 12E.
Figure 12I:
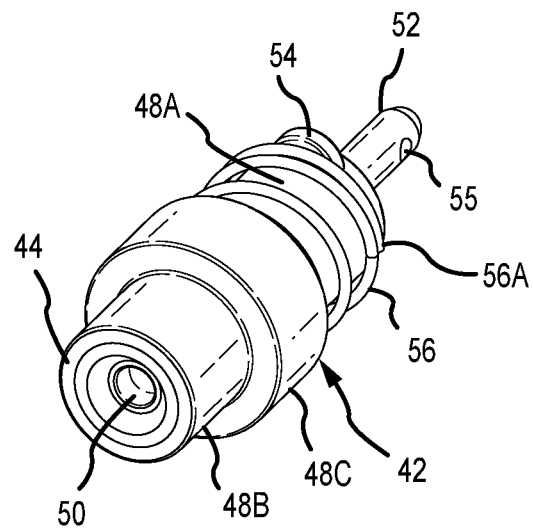
FIG. 12I is an alternate, side perspective view of the end connector of FIG. 11.
Figure 13E:
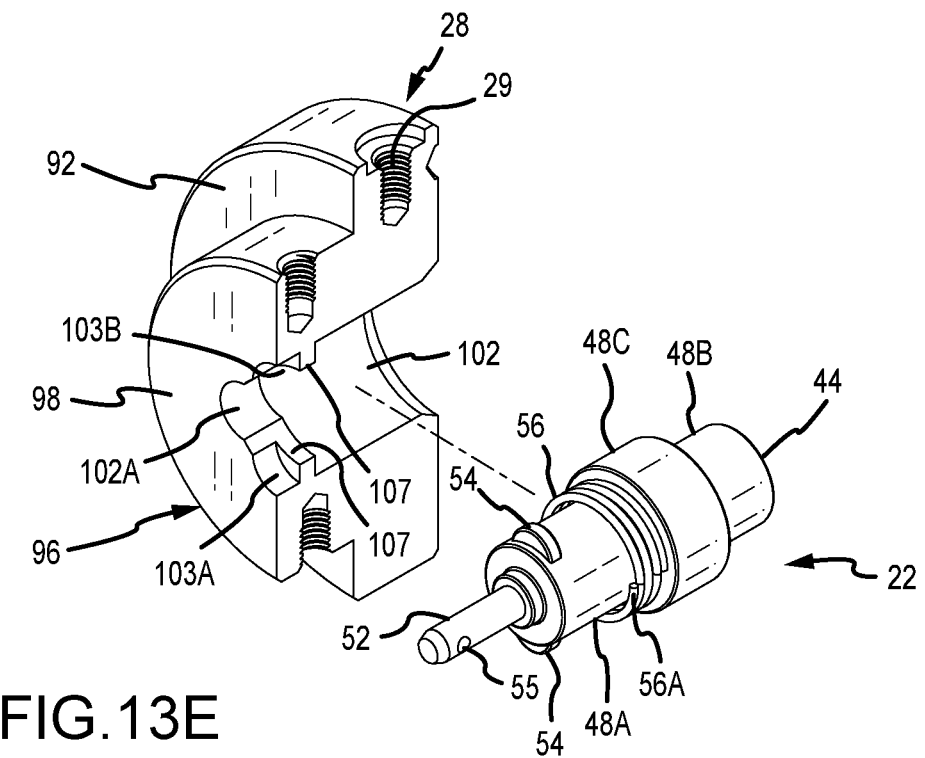
FIG. 13E is an alternate, cut-away, side perspective view of a support and a side, perspective view of an end contact.
Figure 13F:
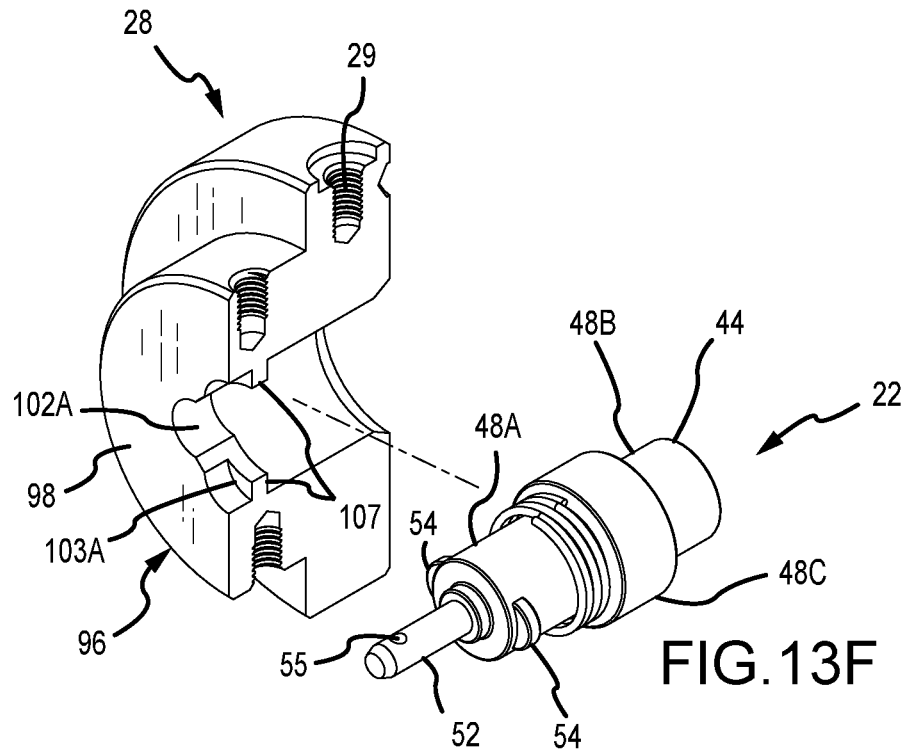
FIG. 13F is an alternate, cut-away, side perspective view of a support and a side, perspective view of an end contact.
Figure 13G:
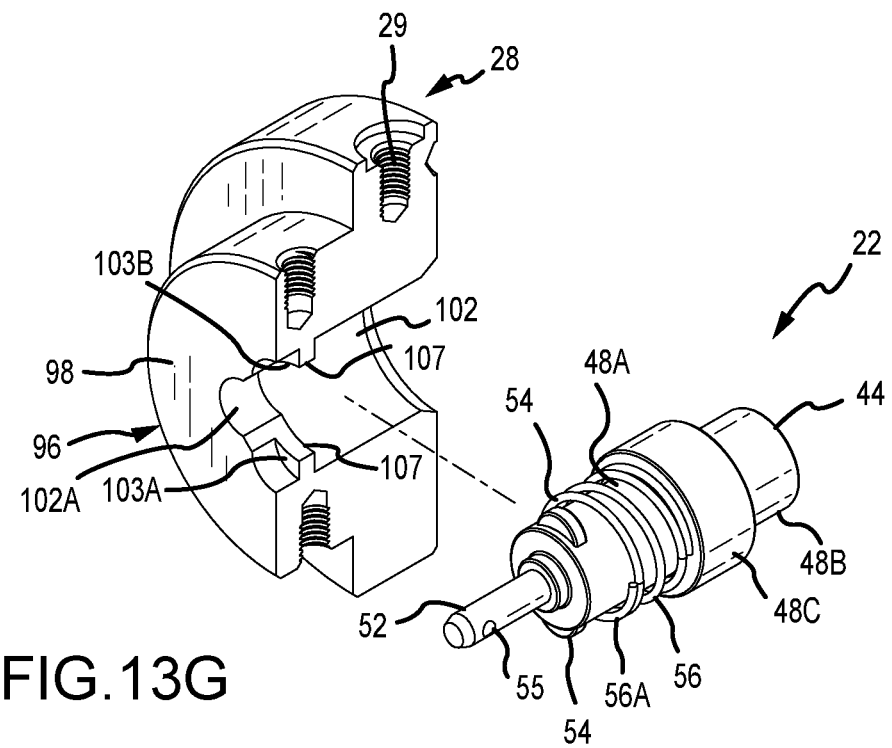
FIG. 13G is an alternate, cut-away, side perspective view of a support and a side, perspective view of an end contact.
Figure 13H:
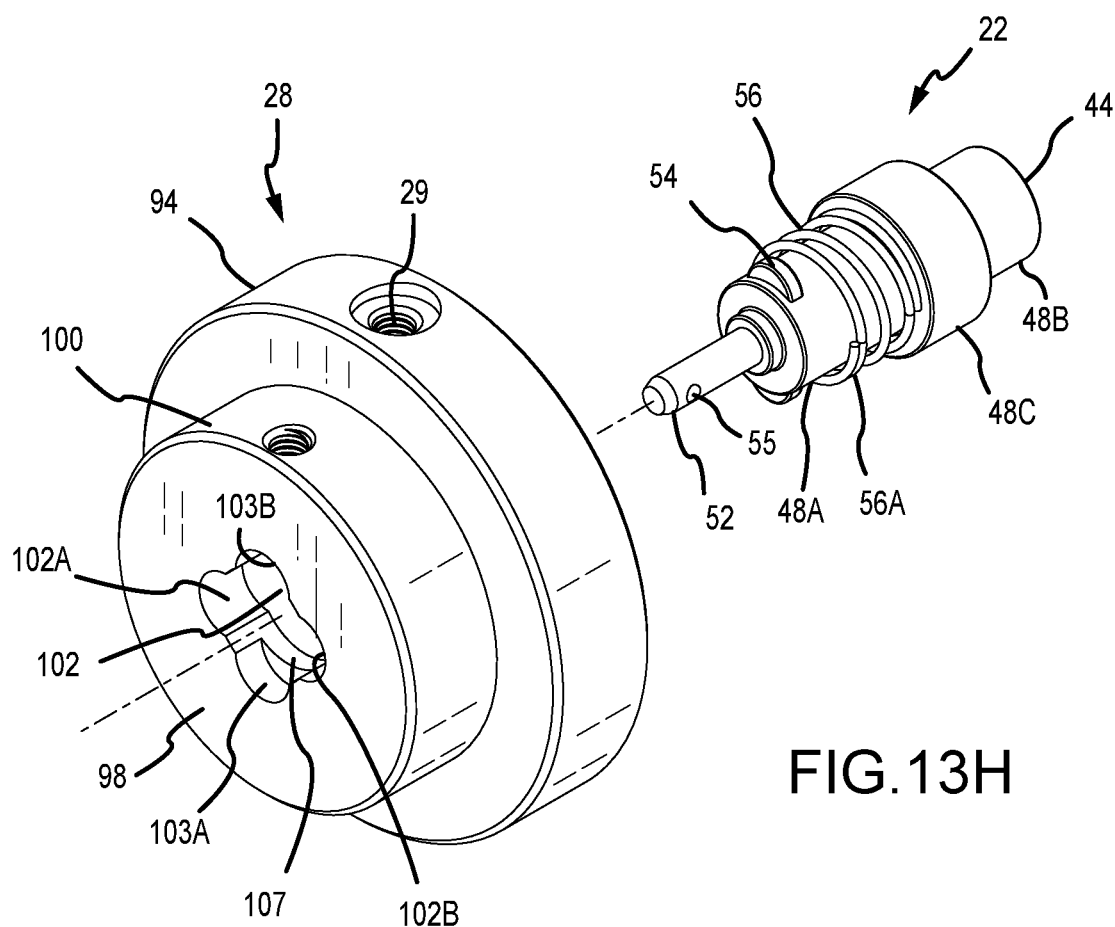
FIG. 13H is a side, perspective view of a support and end connector.
Figure 13I:
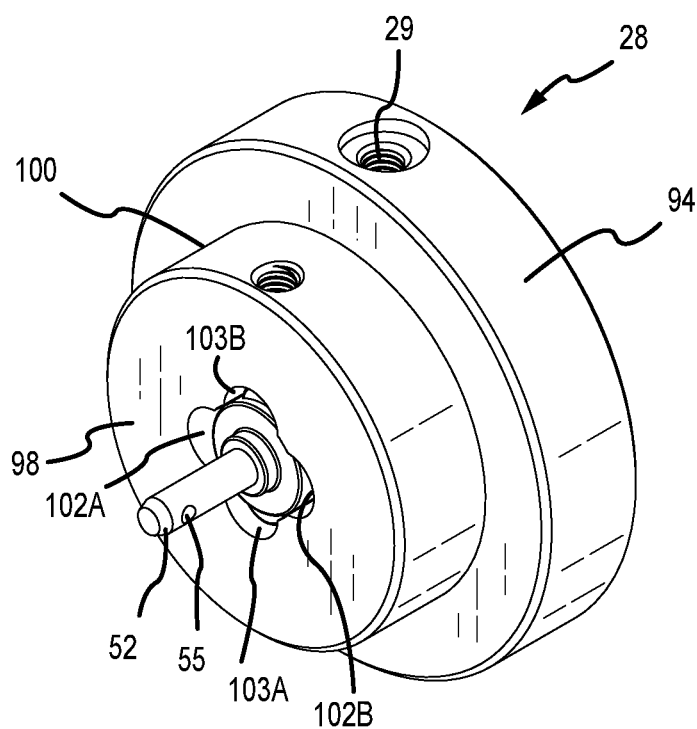
FIG. 13I is a side, perspective view of a support and end connector assembled.
Figure 13J:
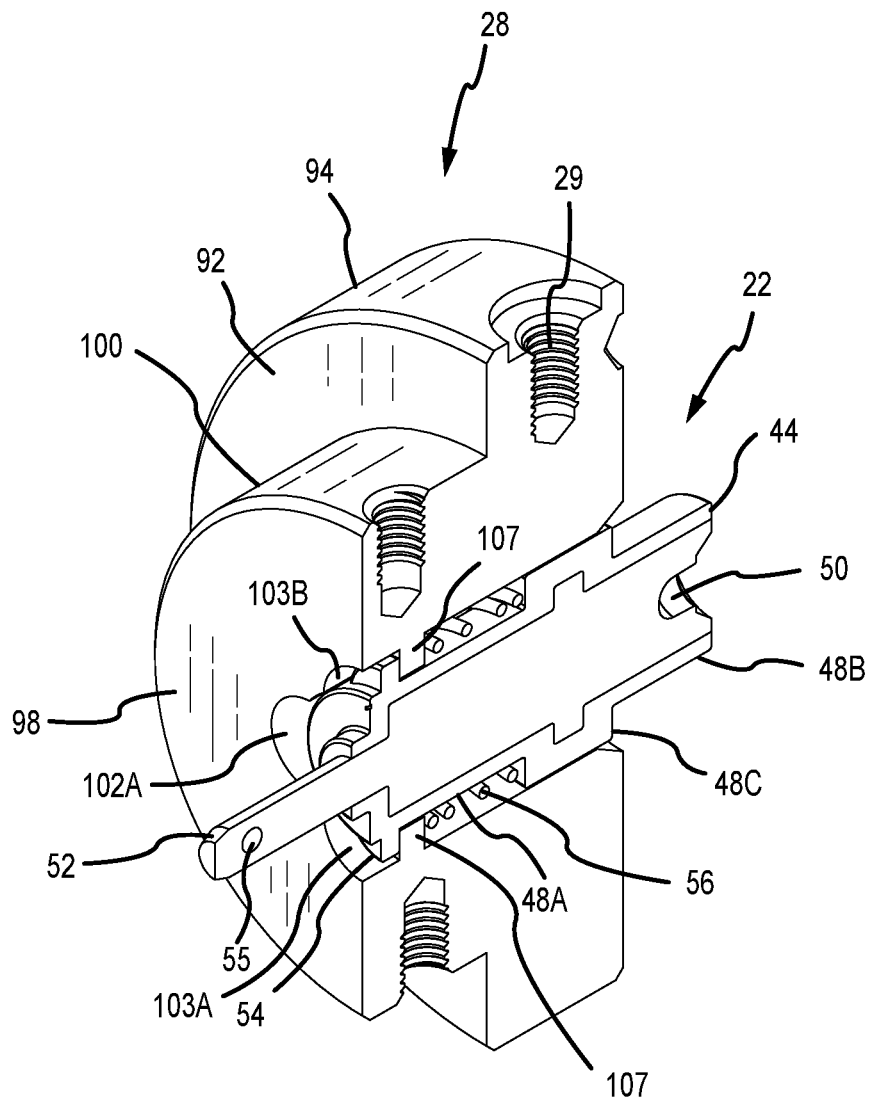
FIG. 13J is a cross-sectional, side perspective view of the support and end connector of FIG. 13I.

FIGS. 12-13E show a sub-assembly 200 having a first end 202 with outer threads 202A and opening 202B, a second end 204 with outer threads 204A and opening 204B, a central portion 206, and a central bore 208 with a first threaded end 208A, and a second end 210. Central bore 208 extends through sub-assembly 200 from opening 202B to opening 204B.

The sub-assembly 200 is known in the art and is used to connect two gun tubes 10, as generally shown in FIGS. 23-26. Also known in the art is outer casing 700, usually comprised of steel, that fits over each gun tube 10. An outer casing protects tube 10 as it is moved into and through a wellbore. Each outer casing 700 has a first end 702 with internal threads 702A, a second end 704 with internal threads 704A, and a bore 708 extending therethrough. Each of the ends 702, 704 threadingly connects to an outwardly-threaded end 202 or 204 of a respective sub-assembly 200, as generally shown in FIGS. 23-26. In this manner, a string of connected gun tubes 10 is produced.

Figure 14:
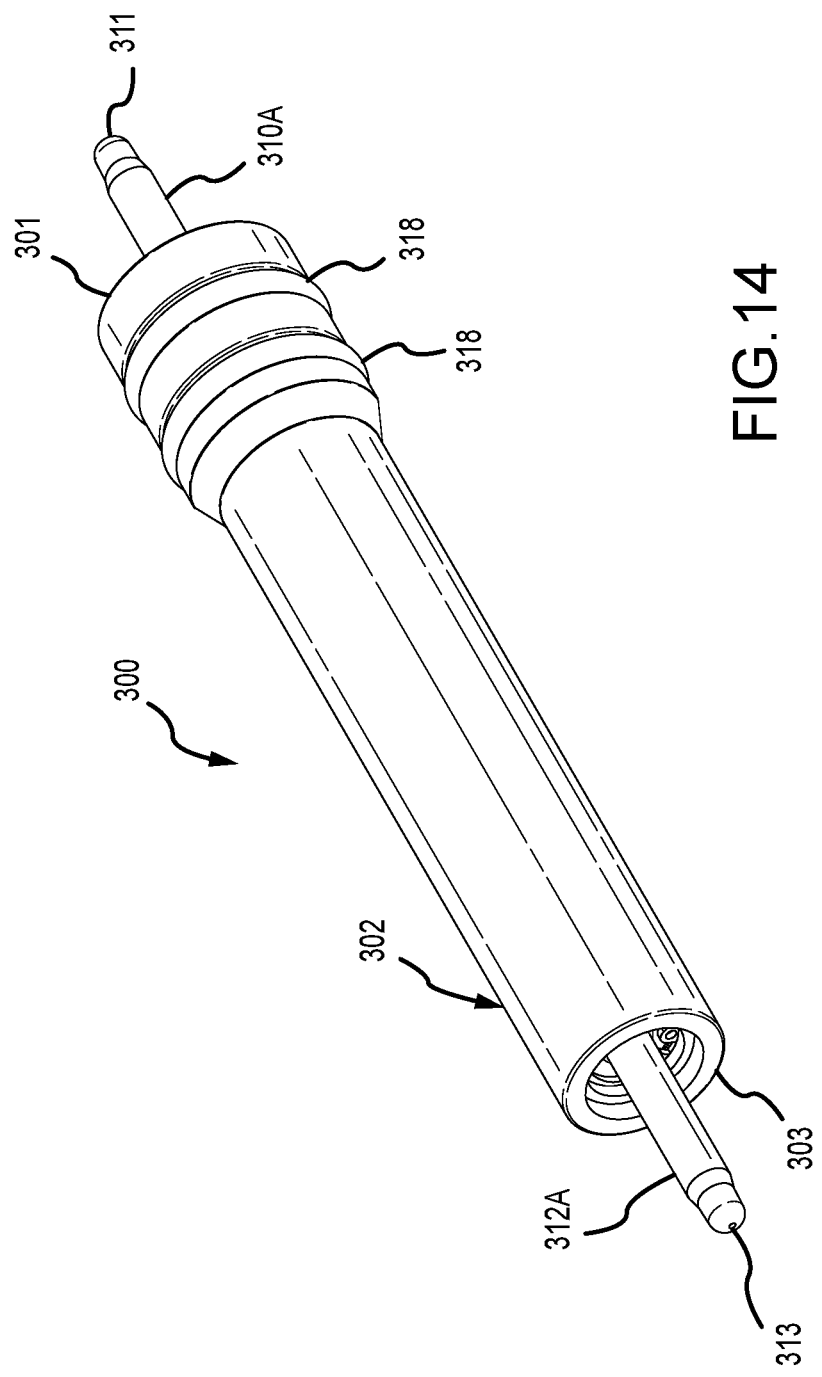
FIG. 14 is a side, perspective view of a plunger.
Figure 14A:
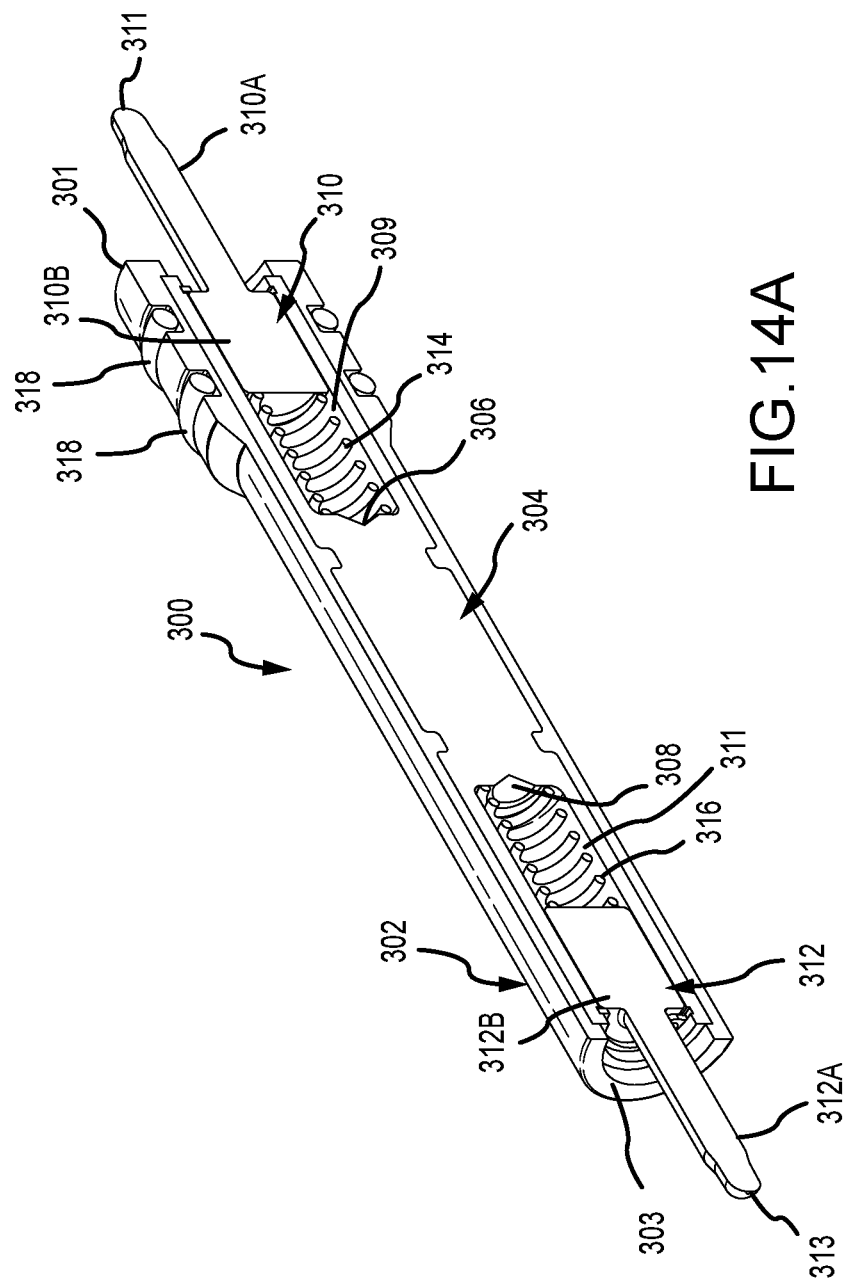
FIG. 14A is a side, perspective, cross-sectional view of the plunger of FIG. 14.
Figure 14F:
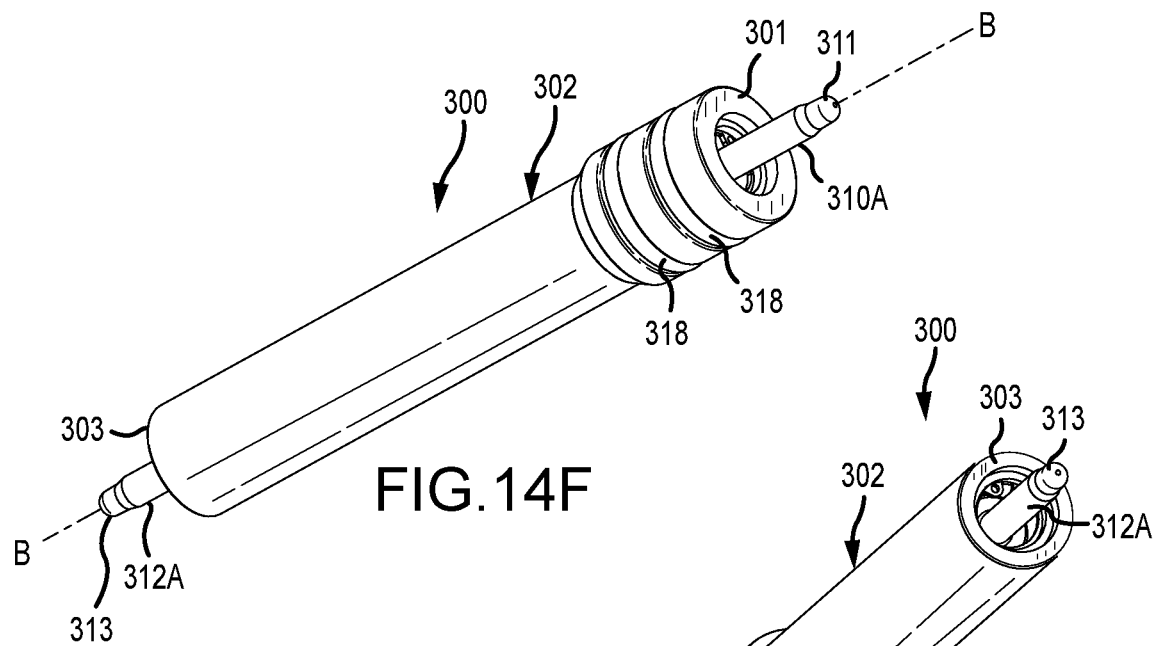
FIG. 14F is a perspective, end view of the plunger of FIG. 14.
Figure 14G:
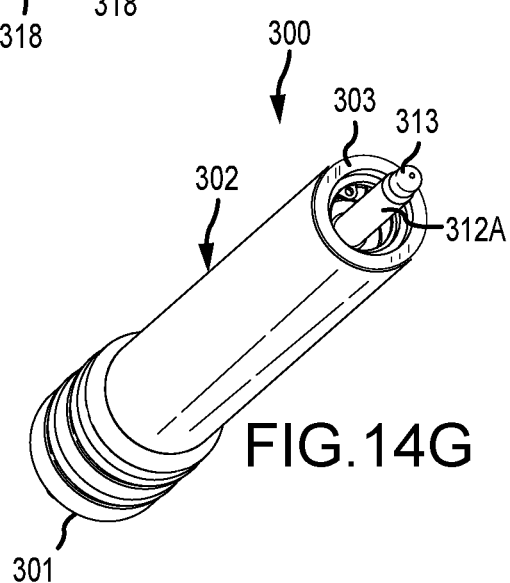
FIG. 14G is an opposite, perspective, end view of the plunger of FIG. 14.
Figure 14H:
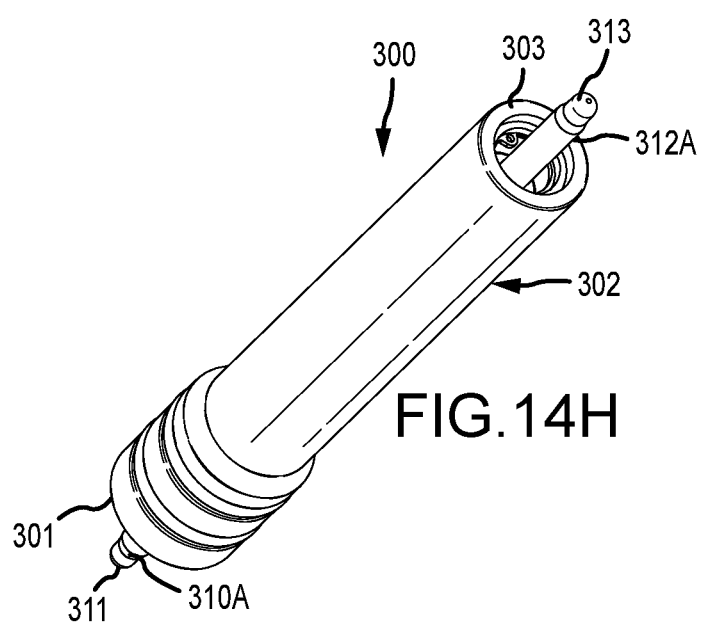
FIG. 14H is a perspective, end view of the plunger of FIG. 14.
Figure 15:
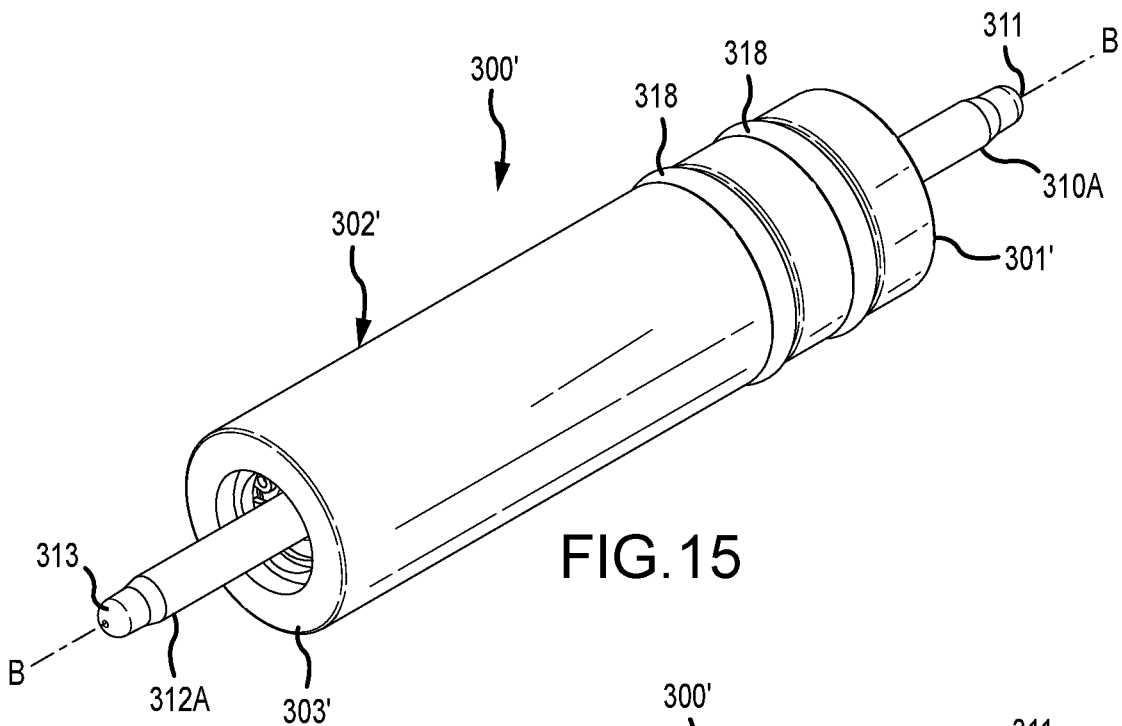
FIG. 15 is a side, perspective view of an alternate plunger.
Figure 15A:
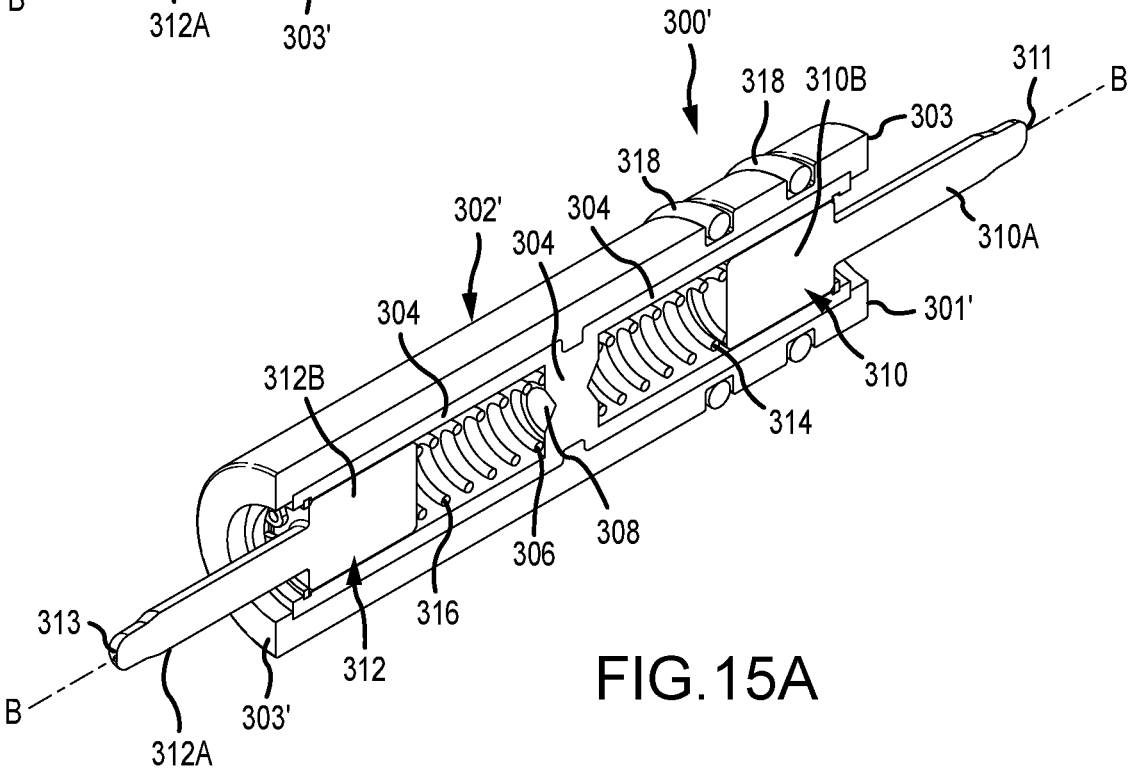
FIG. 15A is a side, cross-sectional view of the plunger of FIG. 15.

Sub-assembly 200 requires a device to provide an electrical connection through it from one gun tube 10 to another gun tube 10. One such device is referred to herein as a plunger. In FIGS. 14-14G a plunger 300 is shown. In use, plunger 300 is received in central bore 208 of sub-assembly 200 as shown in FIGS. 16-18E. Plunger 300 has an outer casing 302 preferably made of insulating material, the outer casing having a first end 301 and a second end 303, an electrically conductive core 304 with a first stop 306 and a second stop 308, a first conductive stem structure 310 with a first stem 310A and a first cylinder 310B that has a diameter greater than the diameter of the first stem 310A, a second conductive stem structure 312 with a second stem 312A and a second cylinder 312B that has a diameter greater than the diameter of the second stem 312A, preferably a first spring or other biasing structure 314 between first stem structure 310 and first stop 306, and a second spring or other biasing structure 316 between second stem structure 312 and second stop 308. First stem 310A has a first distal tip 311 and second stem 312A has a second distal tip 313. Electrically-conductive core 304 has a first cavity 309 in which spring 314 is positioned and a second cavity 311 in which spring 316 is positioned.

Outer casing 302 as shown has an annular outer surface with one or more (and as shown, two) annular grooves 316 juxtaposed first end 301. Each groove 316 includes an o-ring 318. O-rings 318 can be selected of varying durometers or materials for the environment in which they are used. O-rings 318 create an interference fit in bore 208 to prevent wellbore liquid from entering central bore 208. Outer casing at end 301 has a greater diameter that the rest of outer casing 302. The increased diameter is any amount from about 0.100" to 0.300", and the purpose is to create a snug fit in central bore 308.

As shown, plunger 300 has two stem structures 310, 312 that are moveable between a first, extended, position and a second, contracted position, but plunger 300 (or plunger 301') could have only one such structure and the other could stem structure could have just one position.

Springs 314, 316 each permit from about 0.150" to about 1.250" of travel along longitudinal axis B, of respectively, first stem structure 310 and second stem structure 312. As shown, each stem structure 310, 312 has a first, extended position (shown in the figures), and a second, compressed position in which respective springs 314, 316 are compressed. Each stem structure 310, 312 can move independently of the other. Springs 314, 316 can be selected by an operator to have a compressive force suitable for the particular condition to which plunger 300 will be subjected. For example, a spring 314, 316 may have any compressive force or spring rate between about 2 lbs. and about 40 lbs., such as about 2 lbs. to about 40 lbs., about 2 lbs. to about 15 lbs., about 2 lbs. to about 10 lbs., about 4 lbs. to about 15 lbs., or about 4 lbs. to about 10 lbs., or any force from about 10 lbs. to about 50 lbs., such as about 15 lbs., about 20 lbs., about 25 lbs., about 30 lbs., about 35 lbs., about 40 lbs., about 45 lbs., or about 50 lbs.

The purpose of biasing, moveable stem structures 310, 312 outward, and to permit their travel along axis B between a first, extended position and a second, compressed position, is to help ensure that an electrical connection is maintained when a string of gun assemblies 10 and sub-assemblies 200 are positioned in a wellbore. The string can be subject to stresses that push the respective components together, which can damage electrical connections if they cannot compress, and thus can move the respective electrical connections apart. The biasing of the stems outward to an extended position, and the ability of the stems to compress without breaking, helps to alleviate this problem. This structure permits play between the electrical connections, as opposed to a rigid connection that can more easily be damaged.

Plunger 300 could also include exterior grounding legs having the same configuration as legs 414 for DWG 400, which are shown in the Figures and described below.

Figure 16:
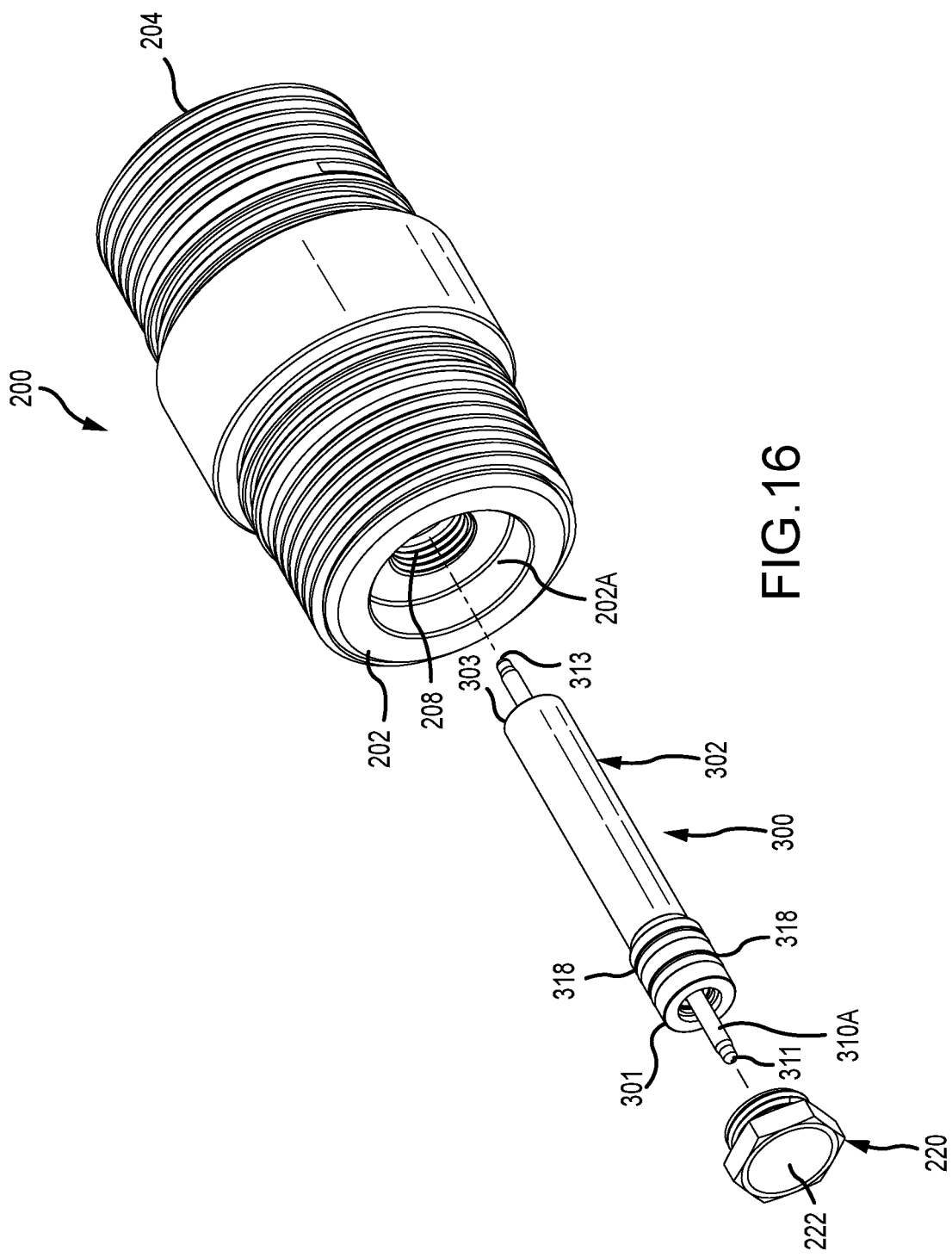
FIG. 16 is an exploded, perspective view of the plunger of FIG. 14 and a sub-assembly.
Figure 16A:
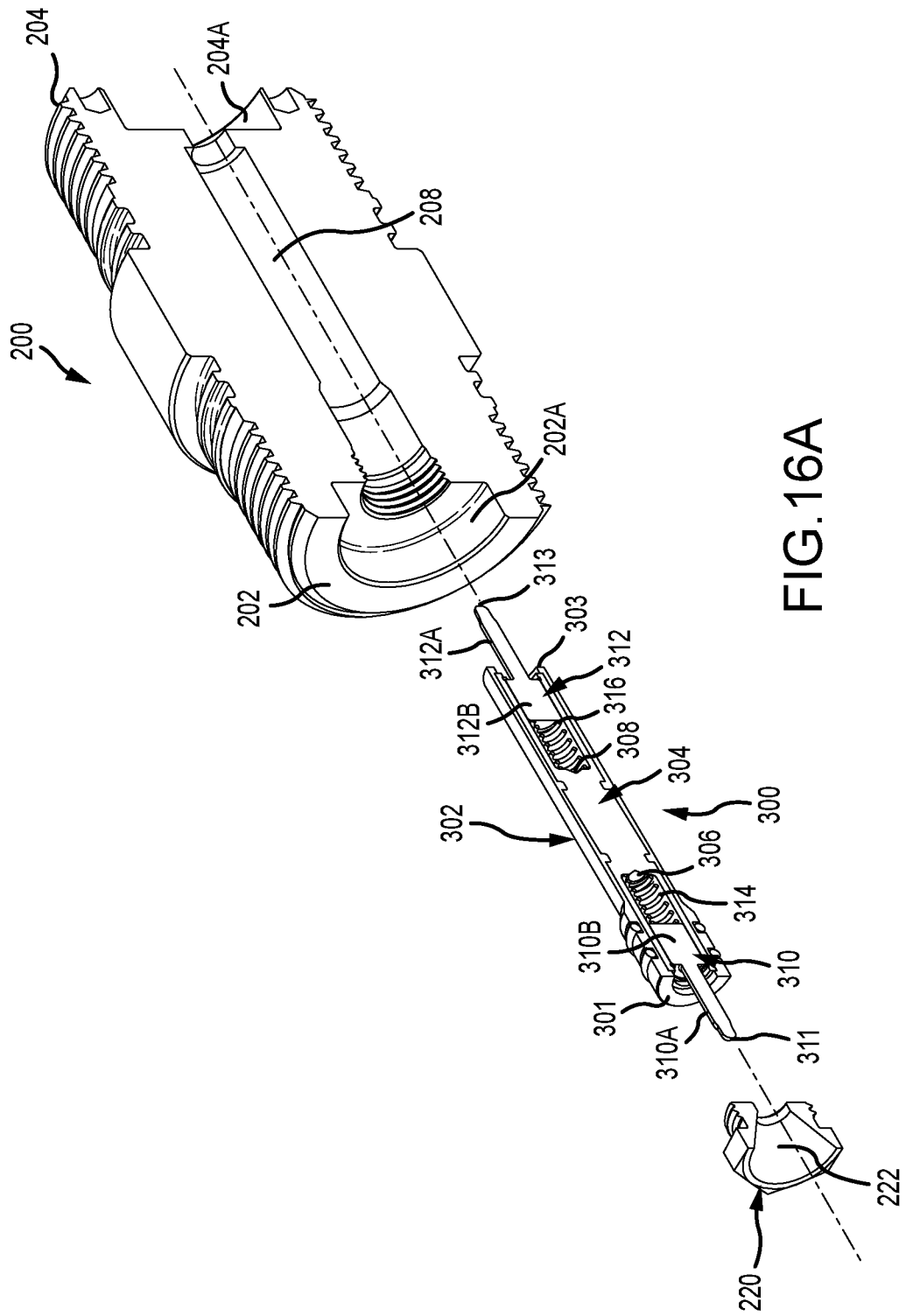
FIG. 16A is an exploded, cross-sectional view of the plunger and a sub-assembly of FIG. 16.

Alternately, a plunger 300', as shown in FIGS. 16-16A may be utilized. Plunger 300' is in all respects the same as plunger 300 except that outer casing 302' has a uniform outer diameter, so the portion of outer casing juxtaposed end 301' would have the same diameter as the portion juxtaposed end 303.

A metal retainer nut 220 may be screwed into bore 208 to retain plunger 300 or 300', as shown in FIGS. 16, 16A, which helps retain plunger 300 in central bore 208. Retainer nut 220 has a central opening 222 in which first stem 310A is positioned.

Dart Retainer

Each end 202, 204, or only one end 202 or 204, of a sub-assembly 200 may include a dart retainer 250 or 380. Further, a dart retainer 250 or 380 may be used with a double wire through with ground, which is described below. If a dart retainer is used, it would be in place of a metal retainer nut 220.

Figure 17A:
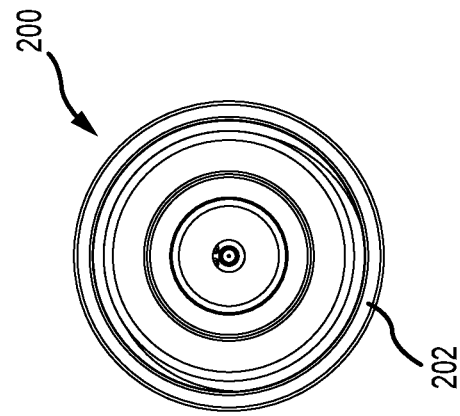
FIG. 17A is an end view of the sub-assembly of FIG. 17.
Figure 17:
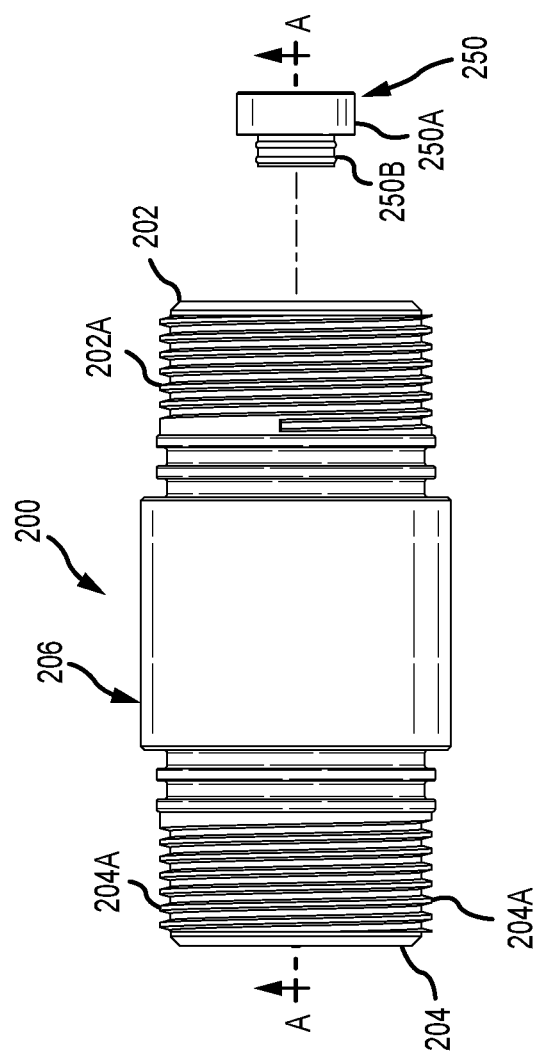
FIG. 17 is a side view of a sub-assembly with a plunger and small dart retainer.
Figures 17B, 17C:
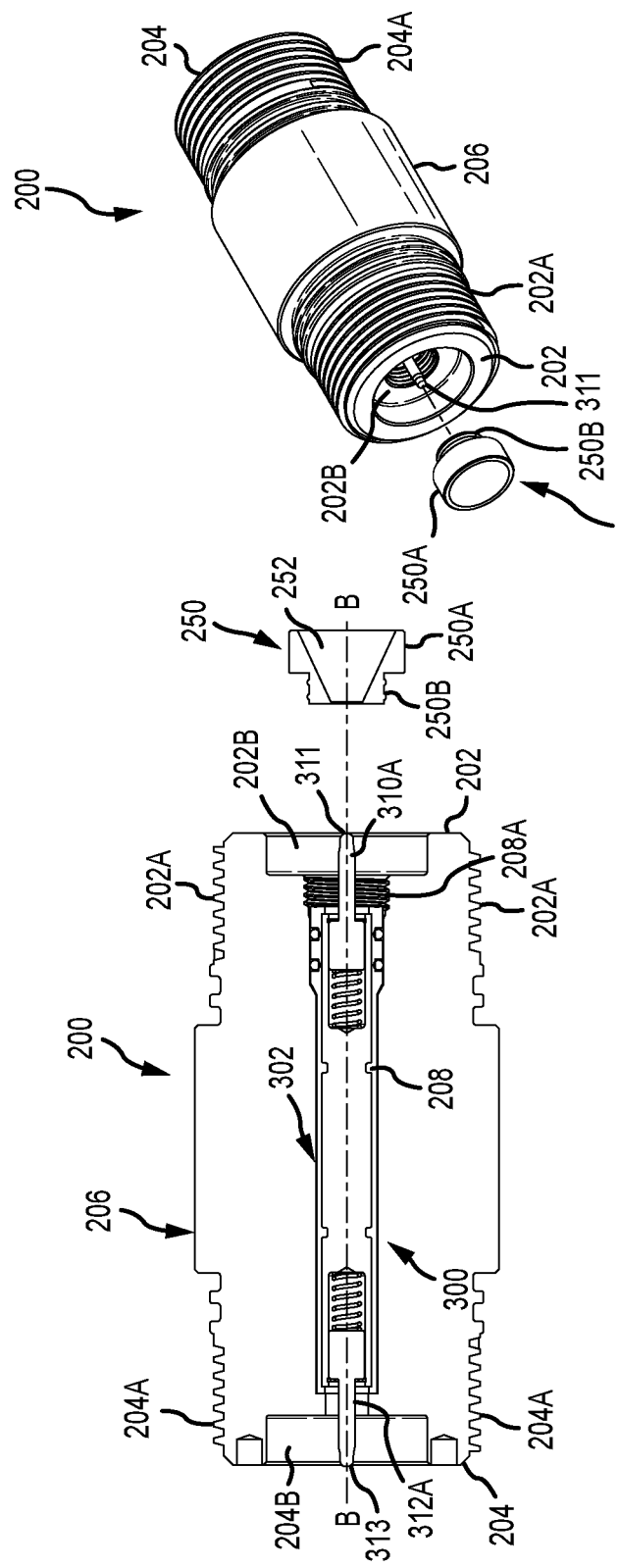
FIG. 17B is a side, perspective view of the sub-assembly of FIG. 17.
FIG. 17C is a side, cross-sectional view of the sub-assembly of FIG. 17.
Figure 17D:
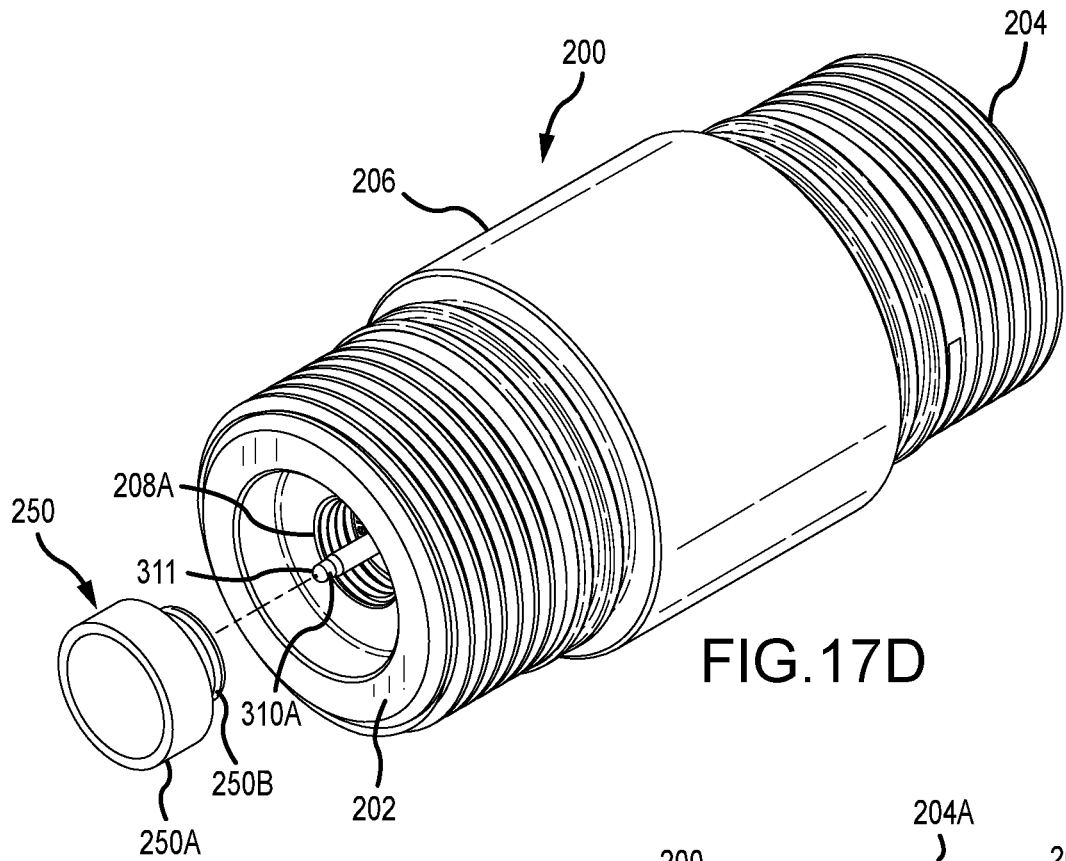
FIG. 17D is a side, perspective view of the sub-assembly of FIG. 17.
Figure 17E:
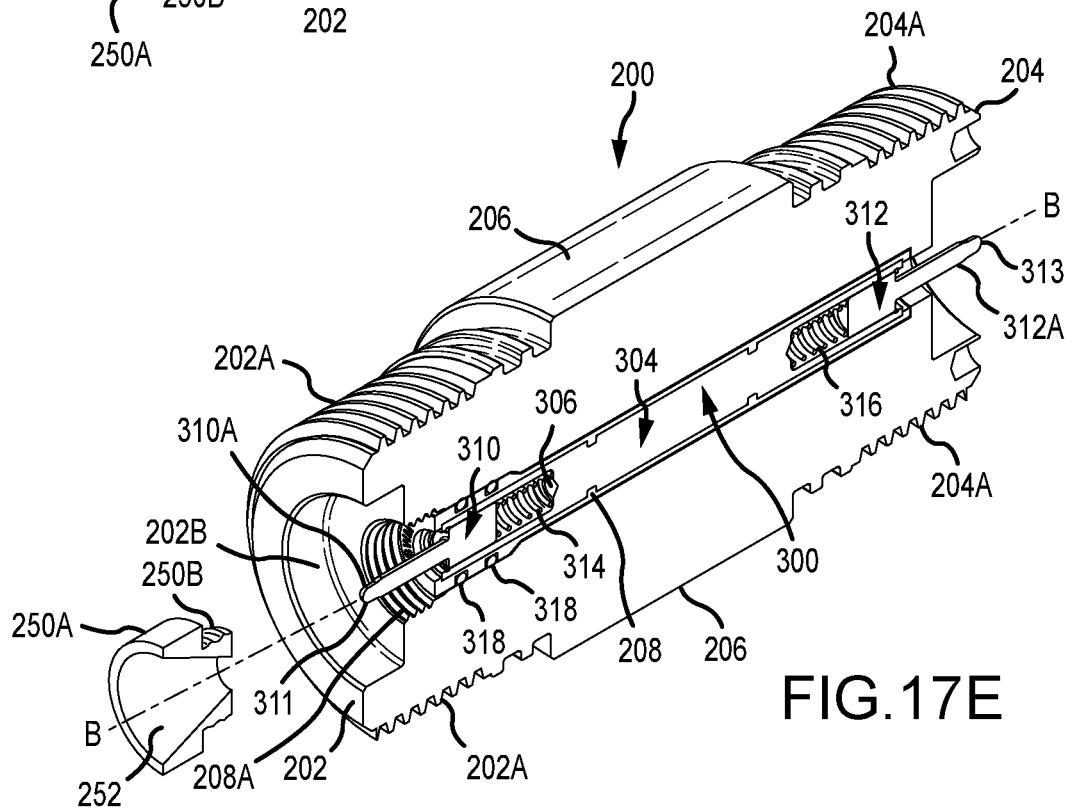
FIG. 17E is a side, perspective, cross-sectional view of the sub-assembly of FIG. 17.

As shown in FIGS. 17-17E, a small dart retainer 250 is an insulating sheath that is preferably comprised of rubber or elastomer, such as silicone rubber. It helps prevent short circuits by a loose wire touching sub-assembly 200. Only one dart retainer 250 shall be described because if a sub-assembly 200 utilizes two, the second dart retainer 250 would be utilized in the same manner, but be at second end 208B of sub-assembly 200 with stem 312A.

Dart retainer 250 has a first portion 250A with a first diameter, a second portion 250B with a second diameter, and an opening 252 therethrough. Retainer 250 is preferably configured so first portion 250A fits in first end 208A of central bore 208 and opening 252 at least partially surrounds first stem 310A of plunger 300.

Figure 18A:
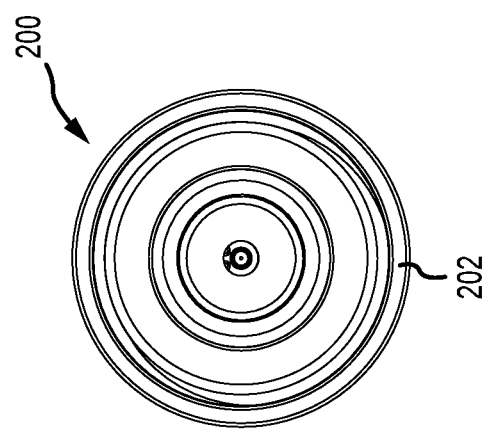
FIG. 18A is an end view of the sub-assembly of FIG. 18.
Figure 18:
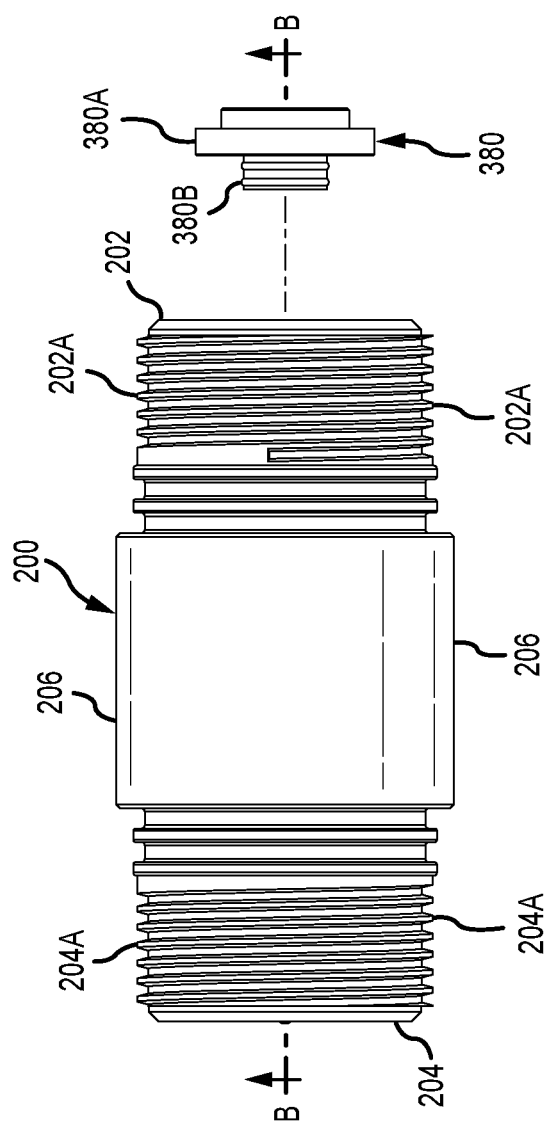
FIG. 18 is a side view of a sub-assembly with a plunger and large dart retainer.
Figure 18D:
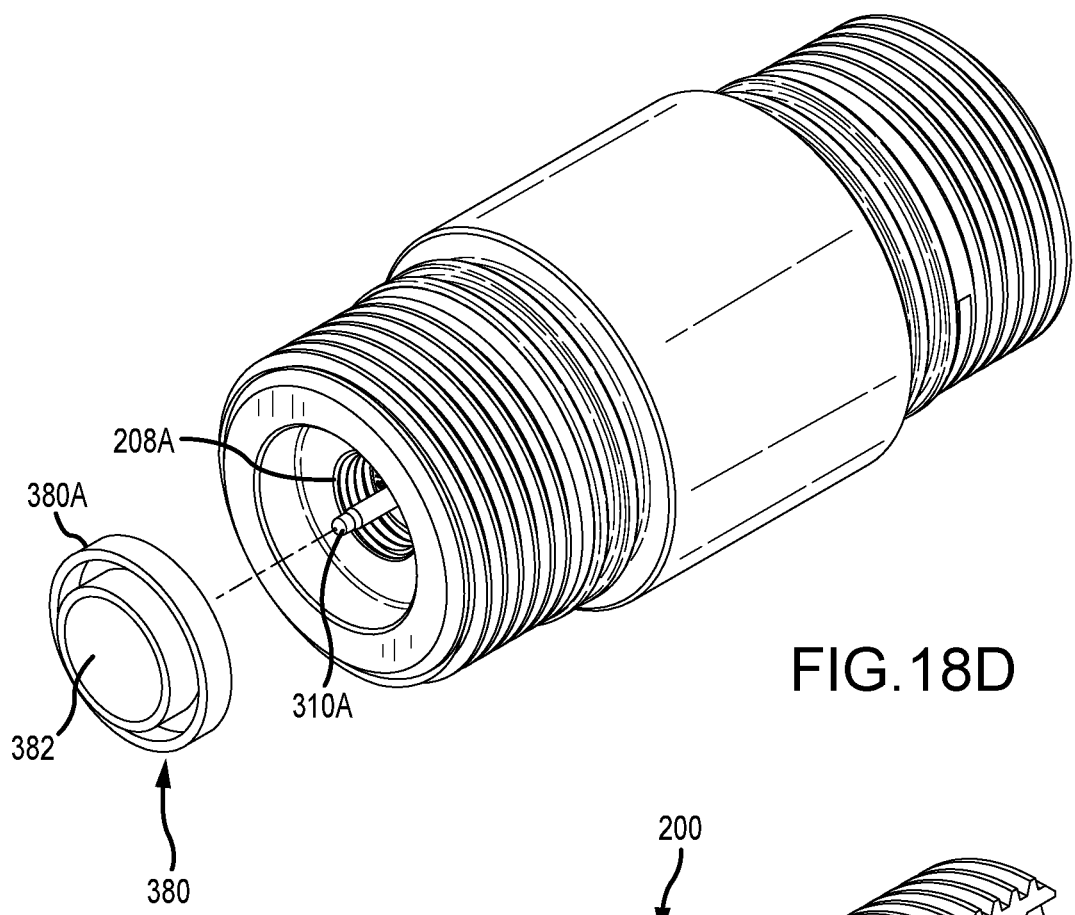
FIG. 18D is a perspective, side view of the sub-assembly of FIG. 18.
Figure 18E:
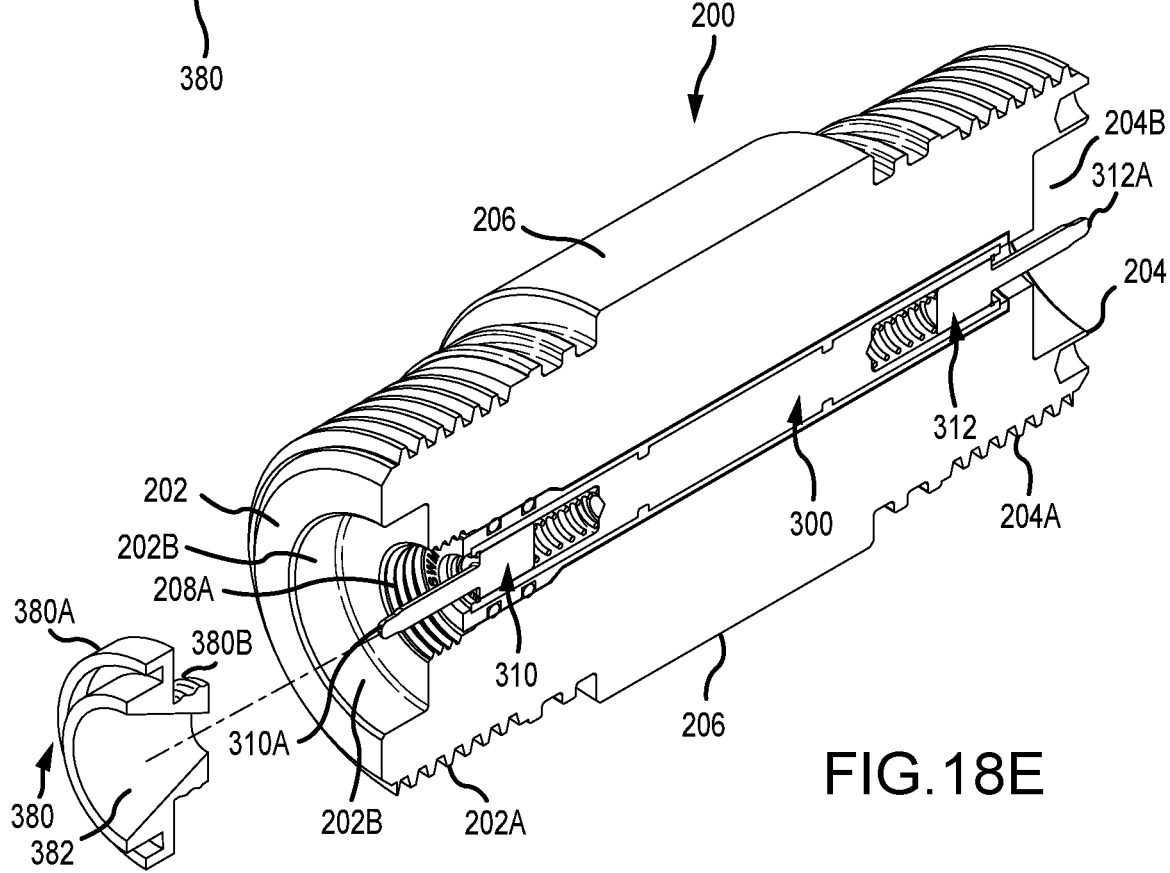
FIG. 18E is a perspective, side, cross-sectional view of the sub-assembly of FIG. 18.
Figure 22C:
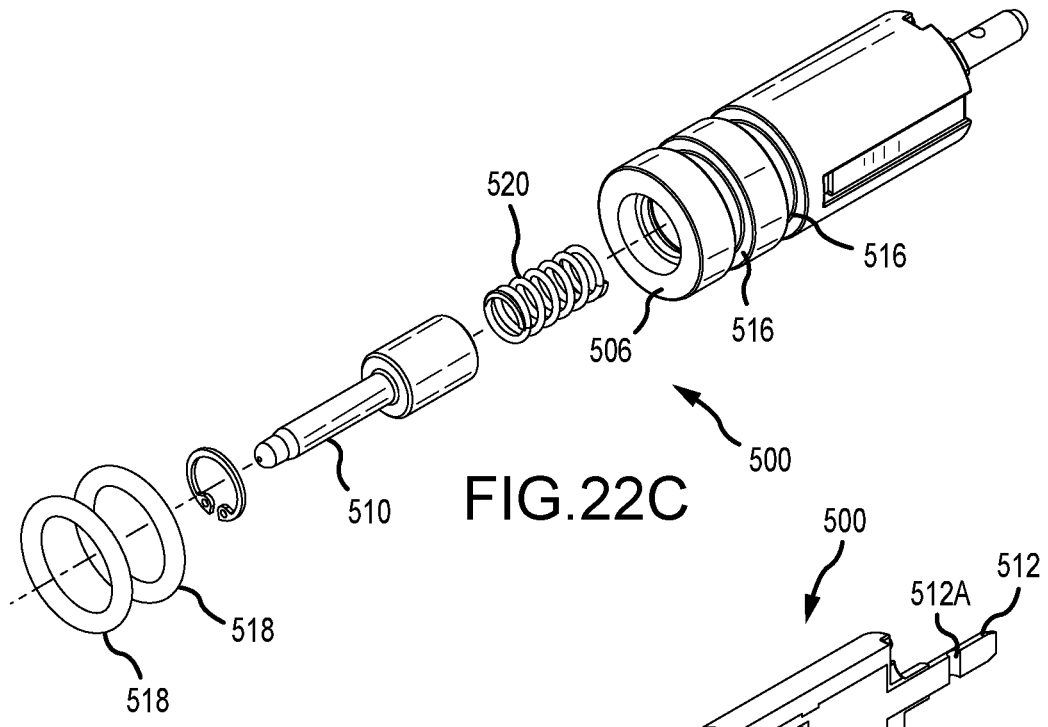
FIG. 22C is an exploded, perspective view of the double wire feed through with ground of FIG. 22.
Figure 22D:
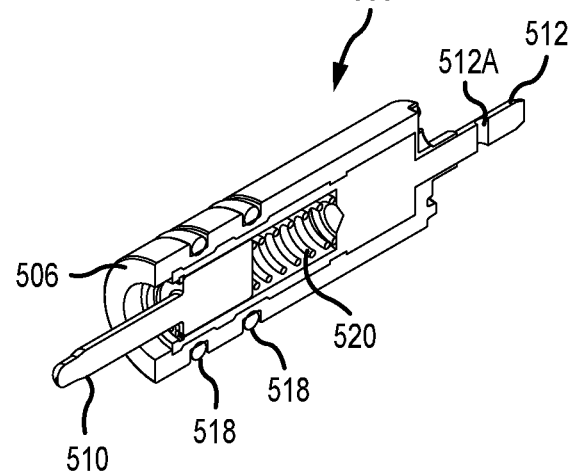
FIG. 22D is a perspective, cross-sectional side view of the double wire feed through with ground of FIG. 22.
Figure 22E:
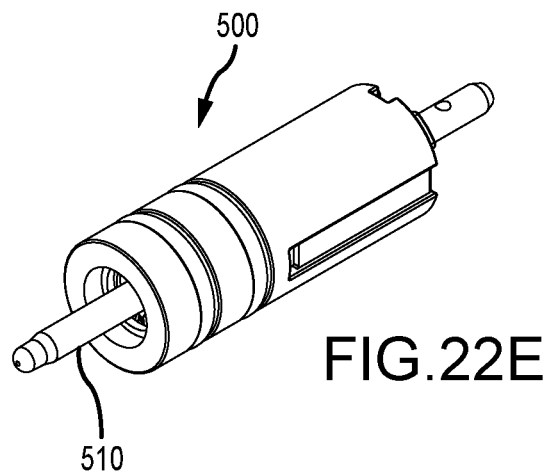
FIG. 22E is a side, perspective view of the double wire feed through with ground of FIG. 22.
Figure 22F:
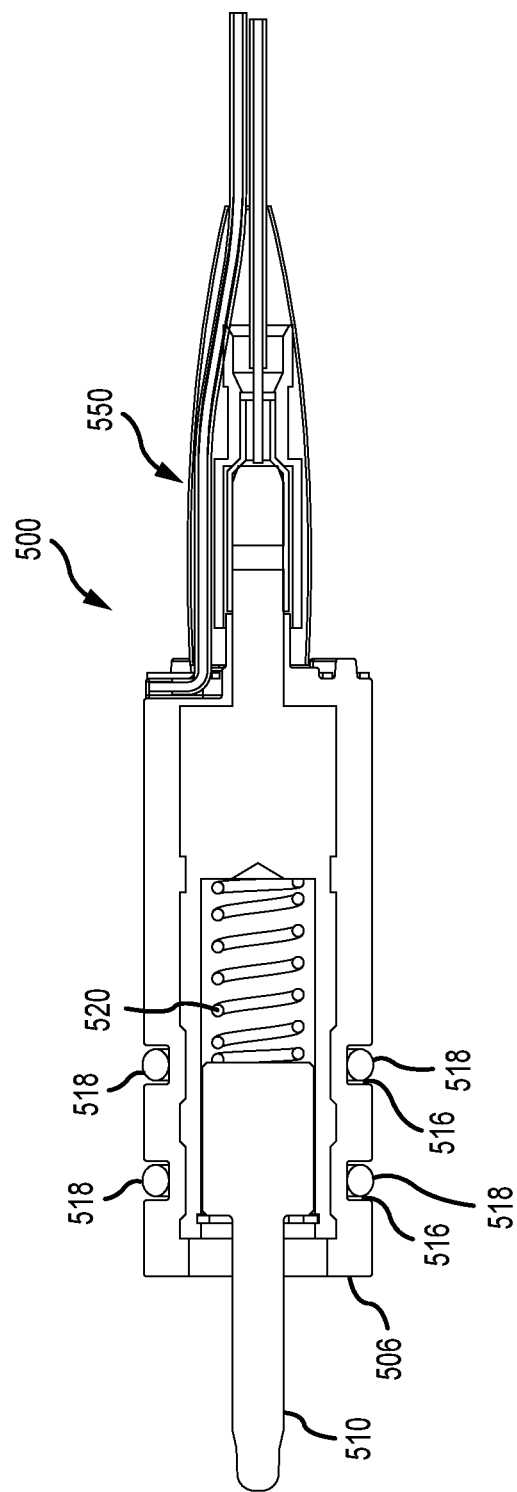
FIG. 22F is a close-up, partial cross-section view of the double wire feed through with ground of FIG. 22 with wires attached.
Figure 22G:
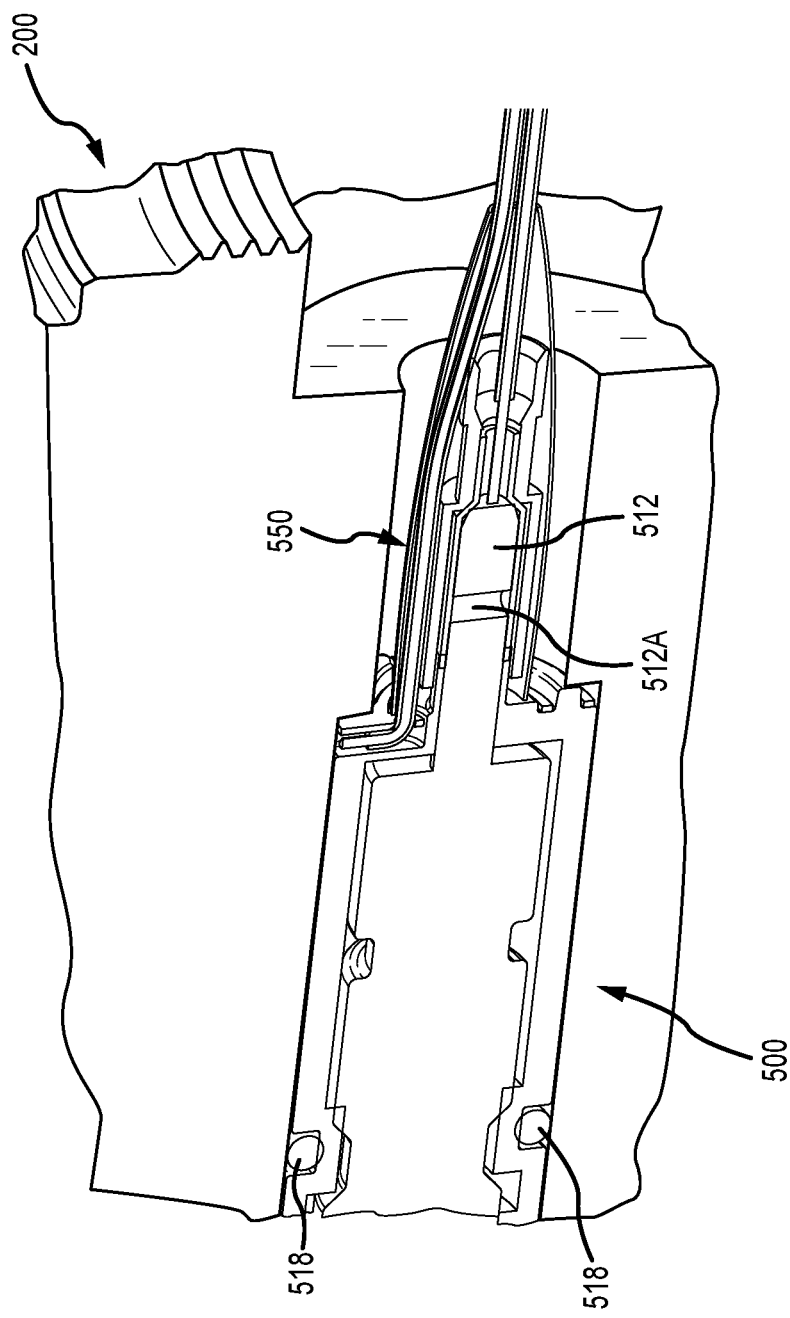
FIG. 22G is a partial, cross-sectional side view of the double fee through with ground of FIG. 22F positioned in a sub-assembly.
Figure 23:
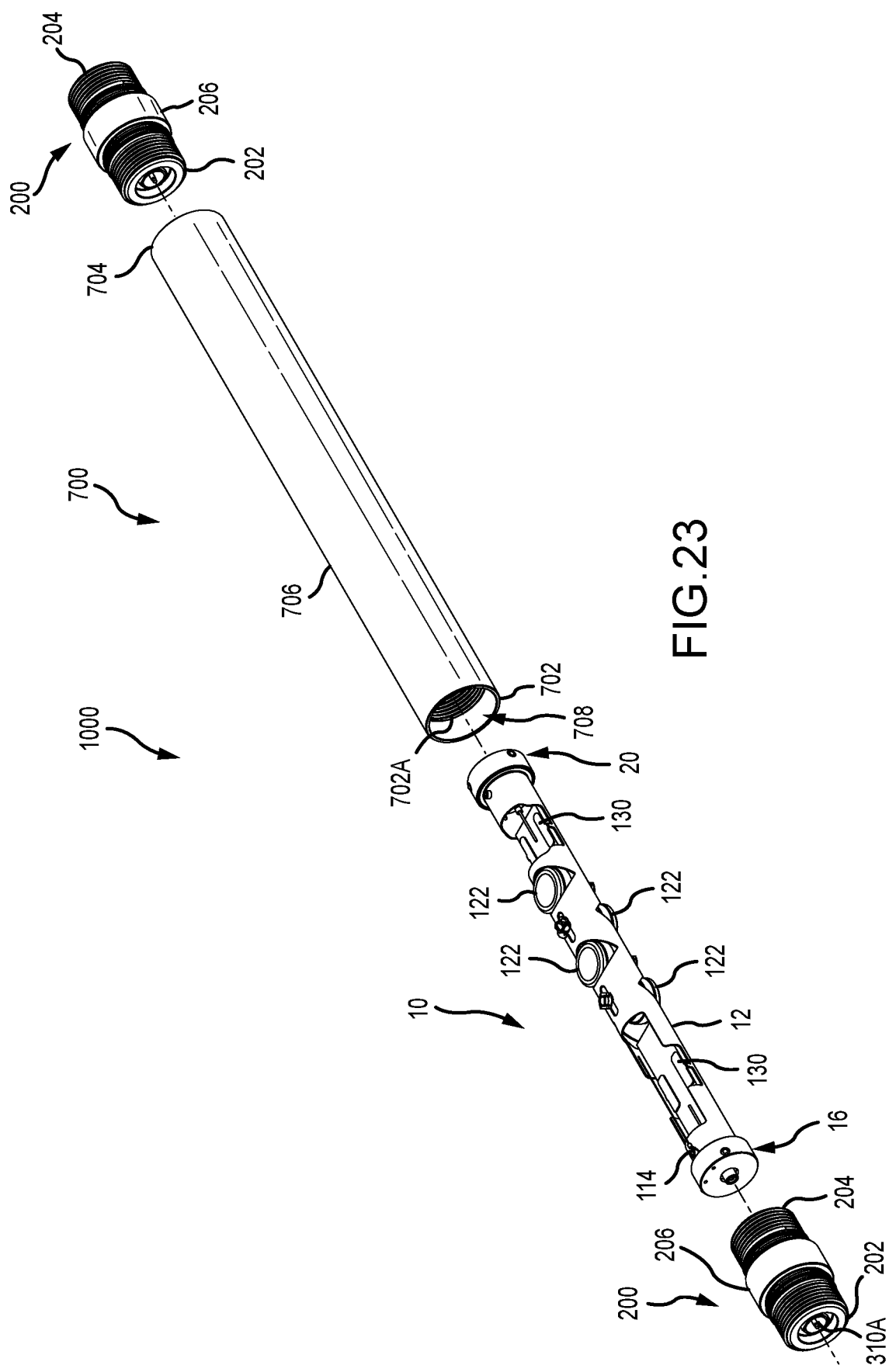
FIG. 23 is an exploded, side perspective view of a gun assembly including an outer casing and two sub-assemblies.
Figure 24:
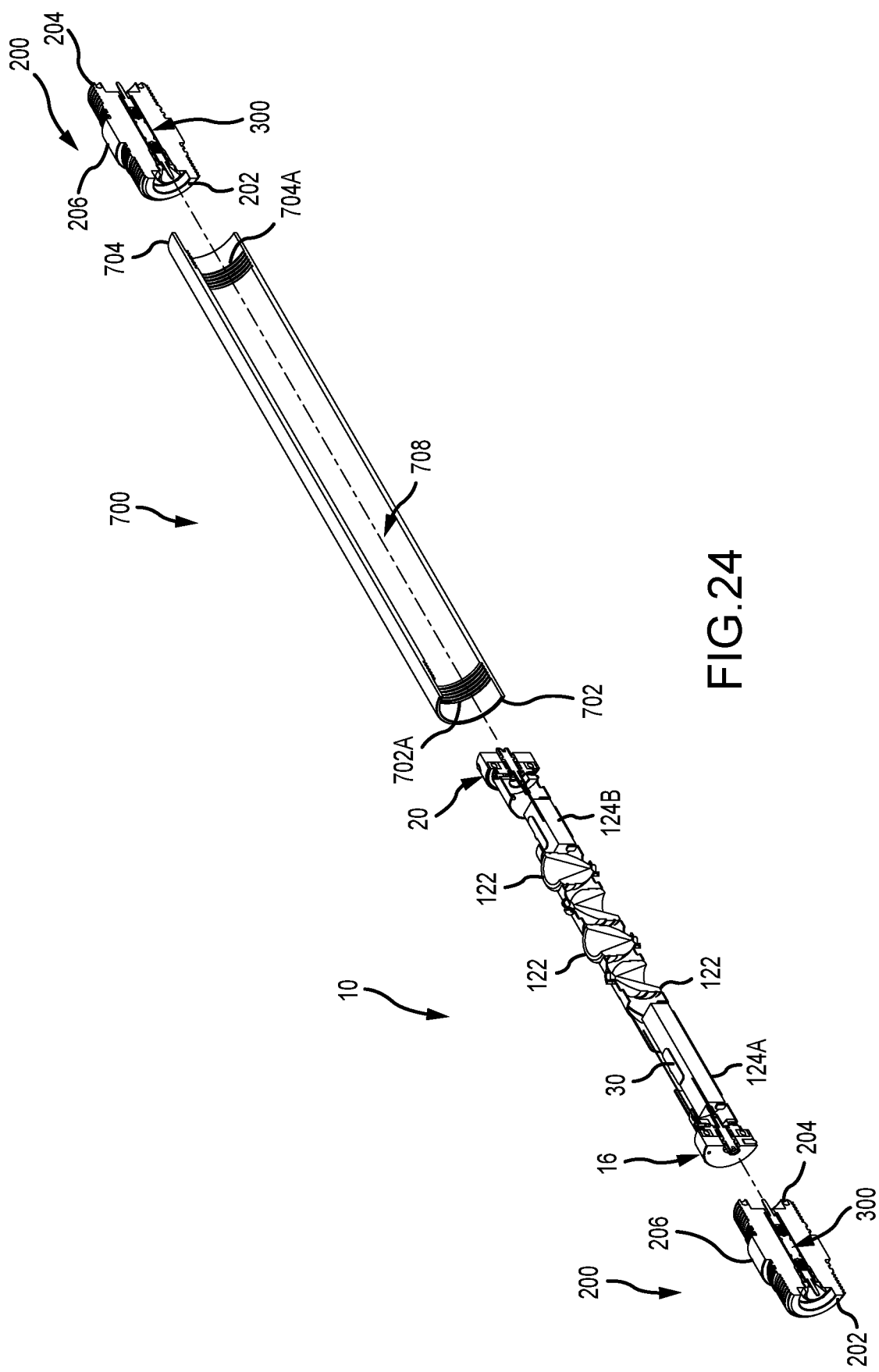
FIG. 24 is a cross-sectional, side, perspective view of the gun assembly of FIG. 12.
Figure 25:
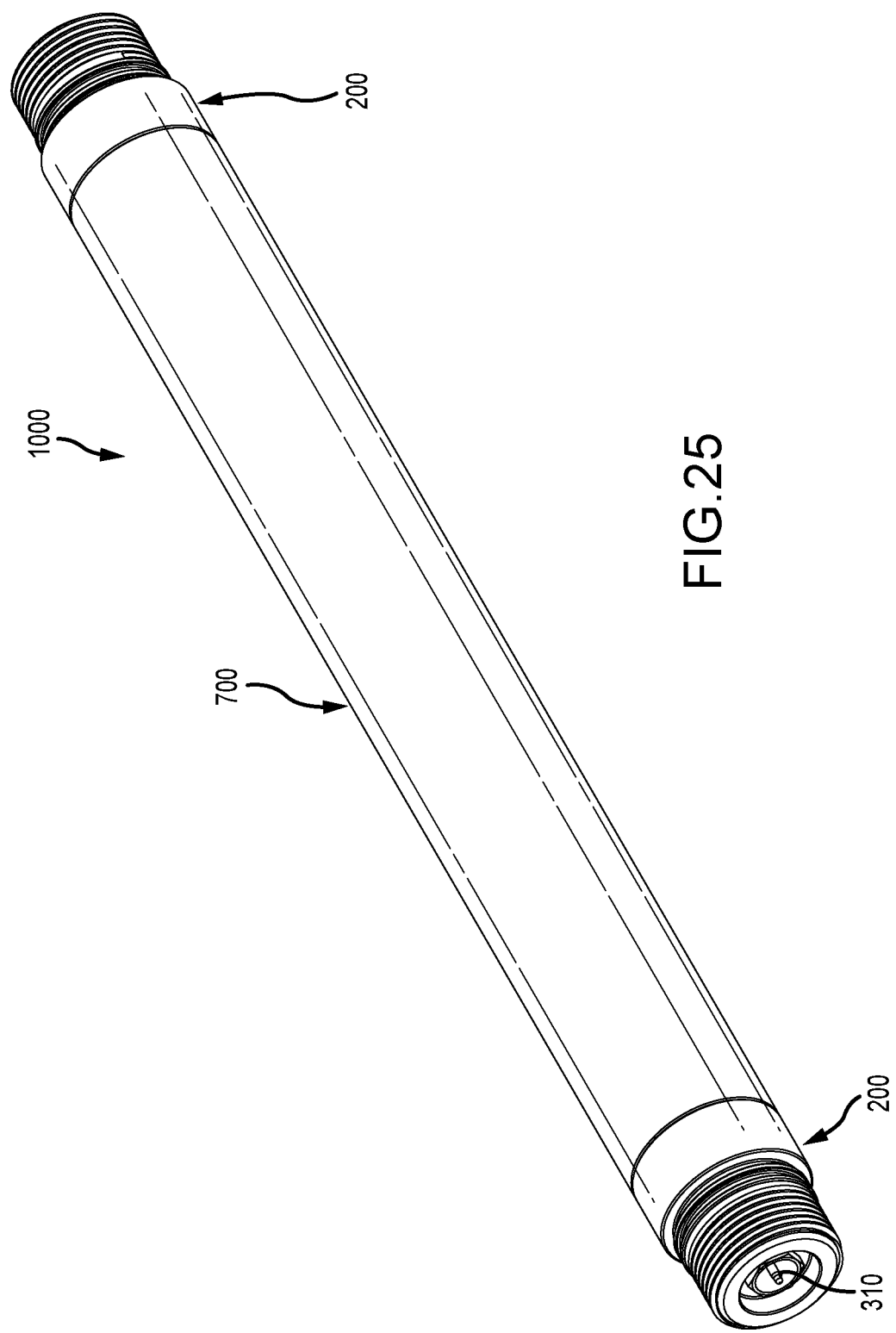
FIG. 25 is a side, perspective, assembled view of the gun assembly of FIG. 12.

Alternatively, as shown in FIGS. 18-18E, a large dart retainer 380 is an insulating sheath that is preferably comprised of rubber or elastomer, such as silicone rubber. It helps prevent short circuits by a loose wire touching sub-assembly 200, and also helps prevent shrapnel from damaging the surface of opening 202A. Only one dart retainer 380 shall be described because if a sub-assembly 200 utilizes two, the second dart retainer 380 would be utilized in the same manner, but be at second end 208B of sub-assembly 200 with stem 312A.

Dart retainer 380 has a first portion 380A with the same first diameter as portion 250A, a larger second portion 380B with a diameter greater than that of second portion 250B, and an opening 382. Portion 380A is configured to be positioned in end 208A of central bore 208 and opening 382 at least partially surrounds first stem 310A of plunger 300. Portion 380B is sized to fit against the wall of opening 202A in order to provide protection and help prevent shorts.

Double Wire Feed Through with Ground

FIGS. 18-22F show a double wire with ground ("DWG") 400. The DWG 400 could be used instead of a dual plunger in a sub-assembly 200 to transmit electricity to a gun tube 10.

If a DWG is used, end connectors 22 are not required in the end fittings 16, 20 of tube 10 because electricity is conducted through wires that are in contact with second stem 412 and with the shape charges 122. Alternatively, a DWG could be used with an end connector 22.

DWG 400 is configured to be received in central bore 208 of sub-assembly 200. DWG 400 has an outer housing 402 preferably made of insulating material, an electrically conductive core 404, a first end 406, a second end 408, a first conductive stem 410, a second conductive stem 412, and optionally a spring or other biasing structure 411 between first stem structure 410 and core 404.

DWG 400 also preferably has one or more exterior grounding arms 414 to securely ground to the inner bore 208 of the sub-assembly 200. An insulative protective sheath, which may be heat shrink tubing 450, can be manually placed or affixed over second stem 412 of the DWG 400 for secure attachment of wires 452, instead of having to connect wires to stem 412.

One or more annular groves 416 are preferably formed on the outer surface of body 402. Each groove preferably receives an o-ring (or gasket) of varying durometer 418 that pressure fits into central bore 208 of sub-assembly 200.

One or more electrical grounding arms 414 are positioned adjacent grooves 414A on body 402. When DWG 400 is pressed into central bore 208 of sub-assembly 200, one or more electrical grounding arms 414 press against the annular wall of central bore 208 to help ensure the grounding of DWG 400.

Intelligent Gun Tube

Figure 27:
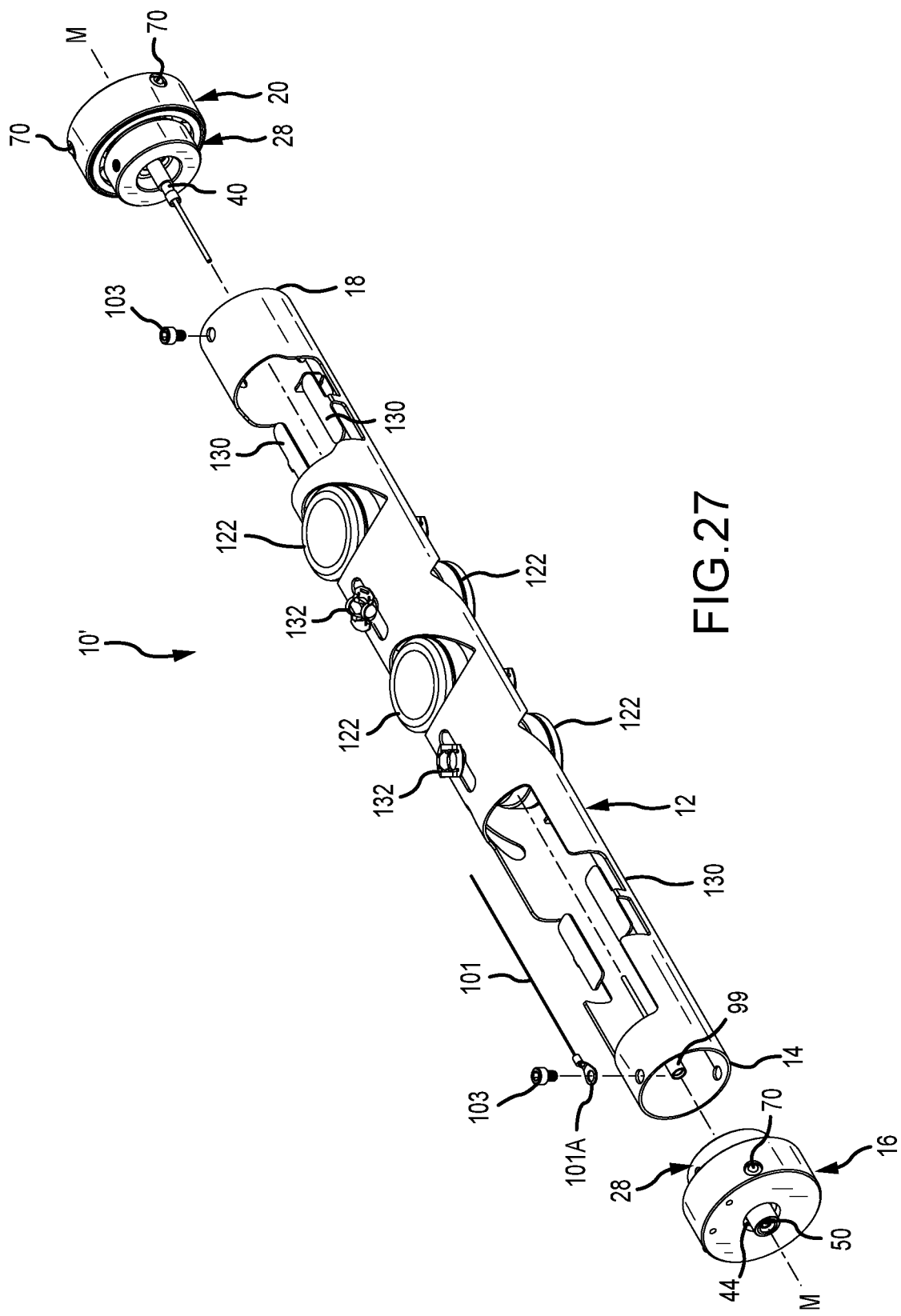
FIG. 27 is a perspective, side view of an alternate gun tube in accordance with aspects of the invention.
Figure 28:
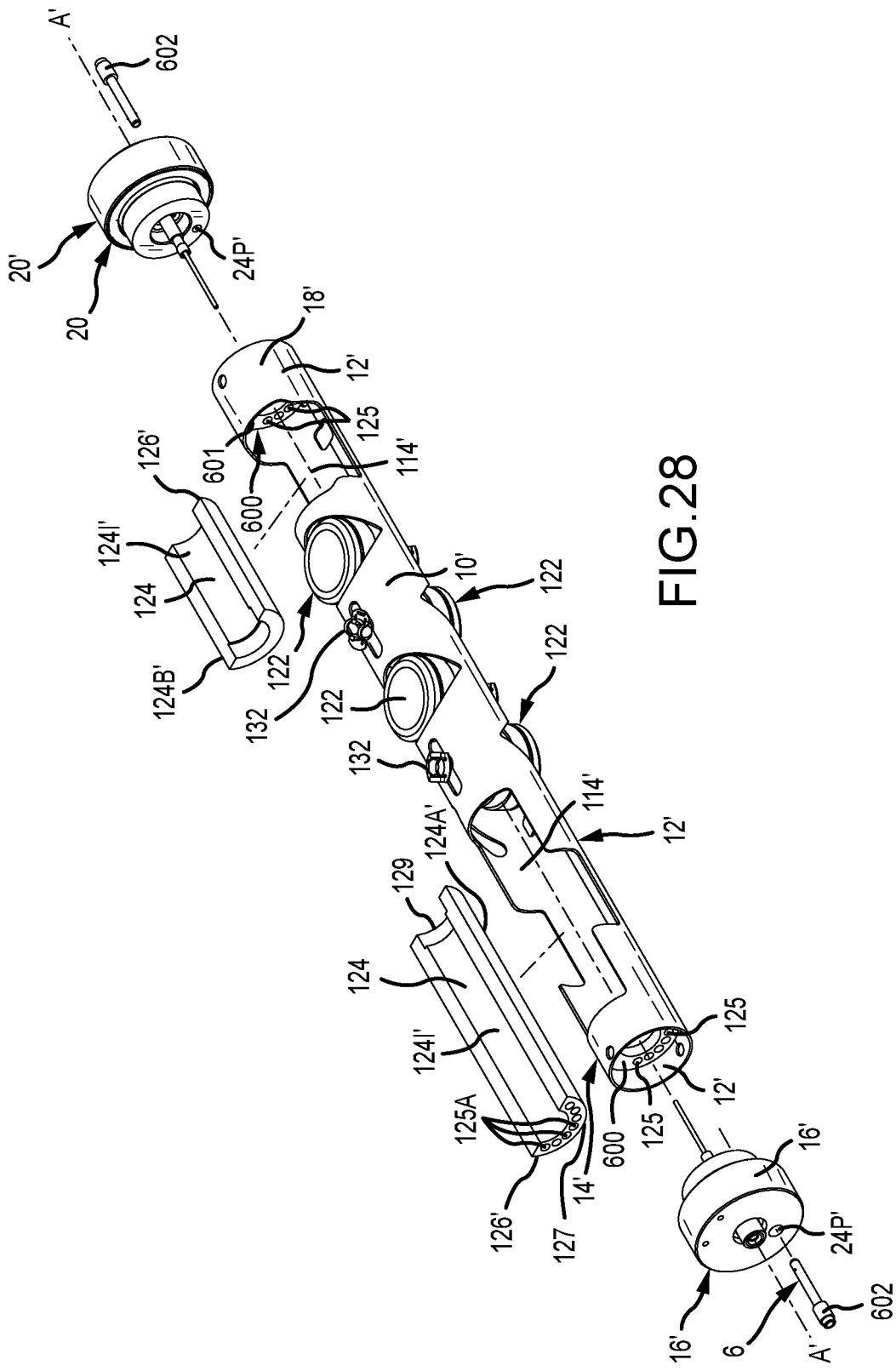
FIG. 28 is a perspective, partially-exploded side view of an alternate gun tube in accordance with aspects of the invention.
Figure 28A:
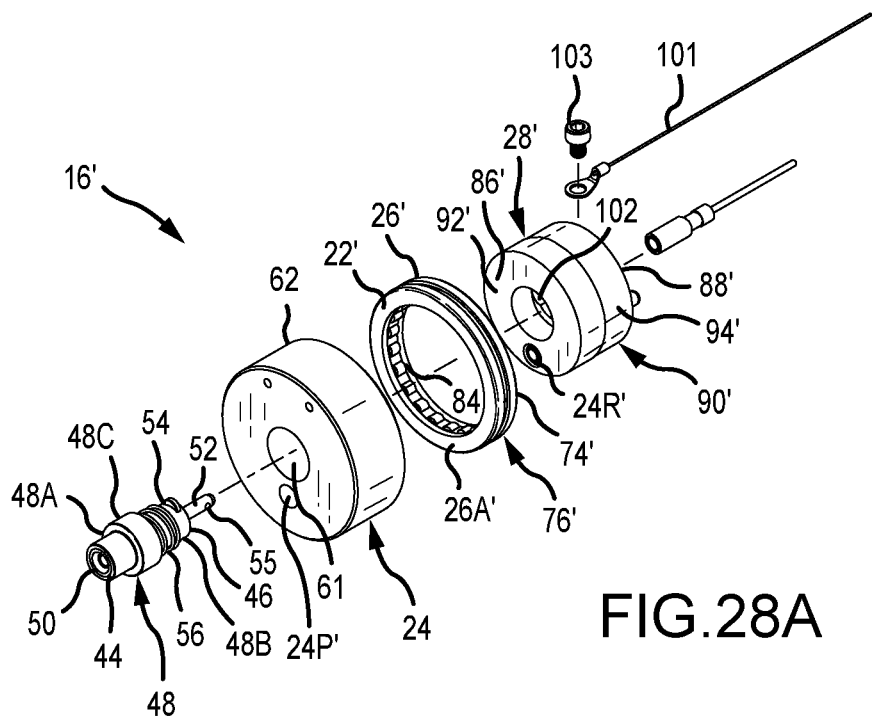
FIG. 28A is an exploded, perspective side view of a first end cap of the gun tube of FIG. 28.
Figure 28B:
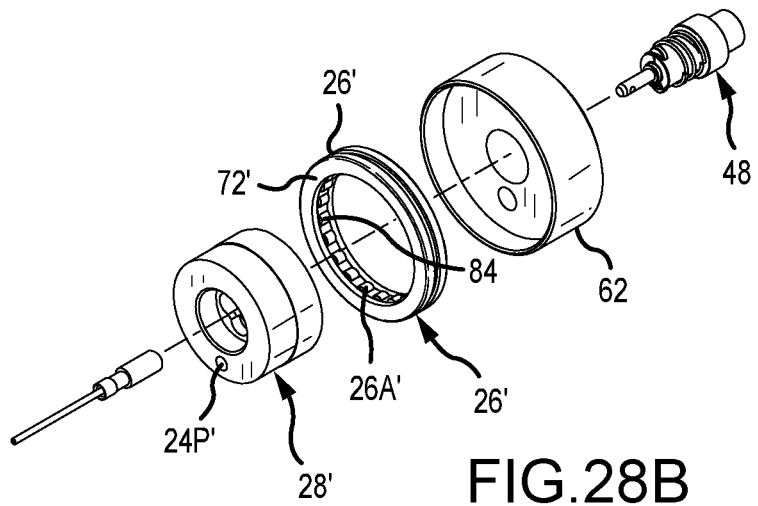
FIG. 28B is an exploded, perspective side view of a second end cap of the gun tube of FIG. 28.
Figure 33:
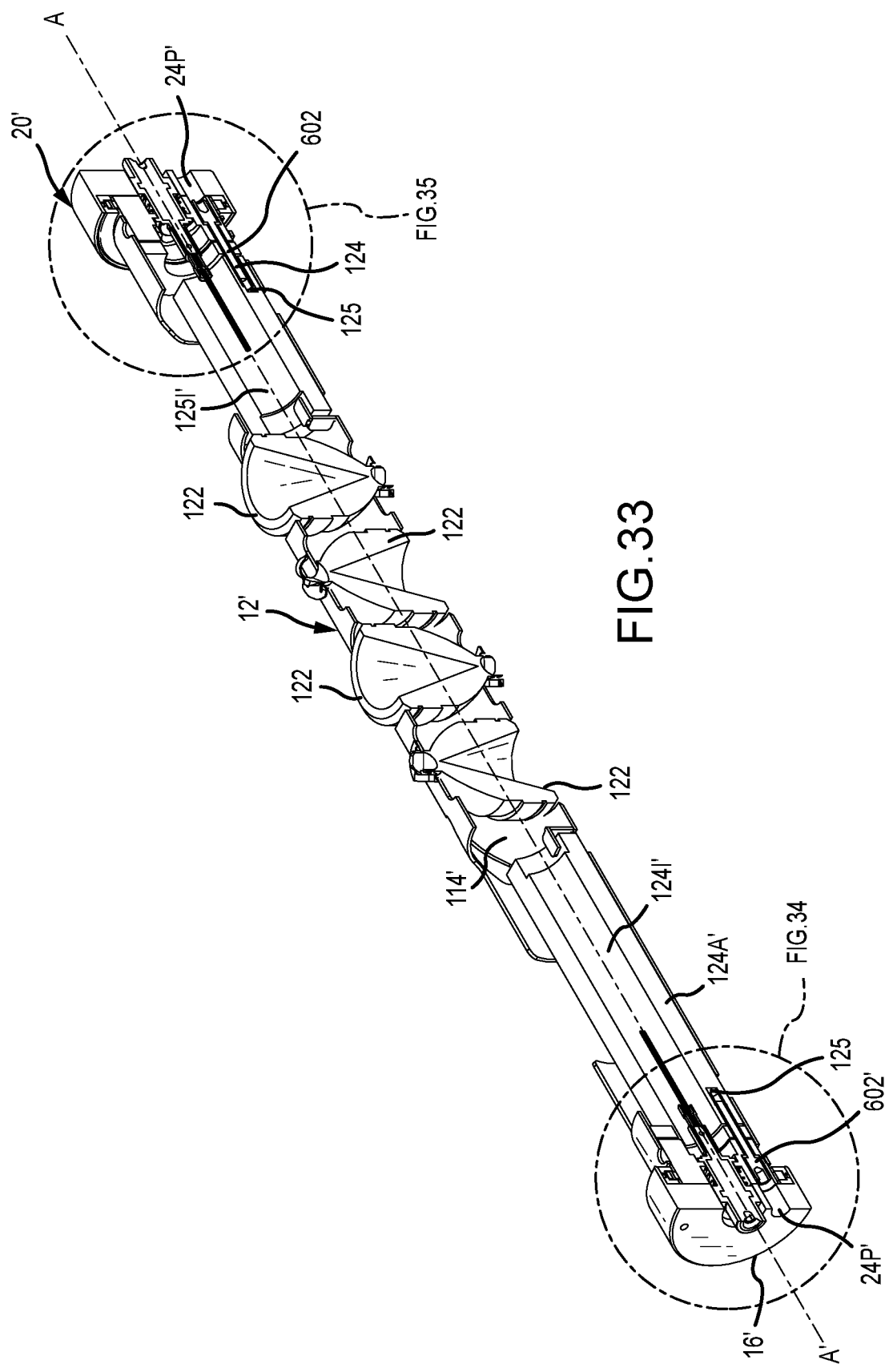
FIG. 33 is a break-away, side perspective view of the gun tube of FIG. 28.
Figure 34:
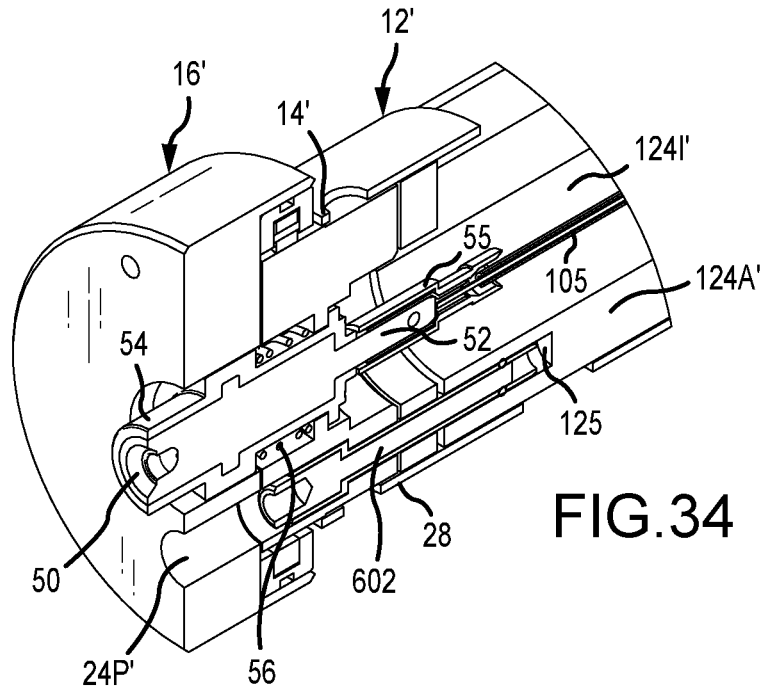
FIG. 34 is a close-up, side, perspective view showing detail D of FIG. 33.
Figure 35:
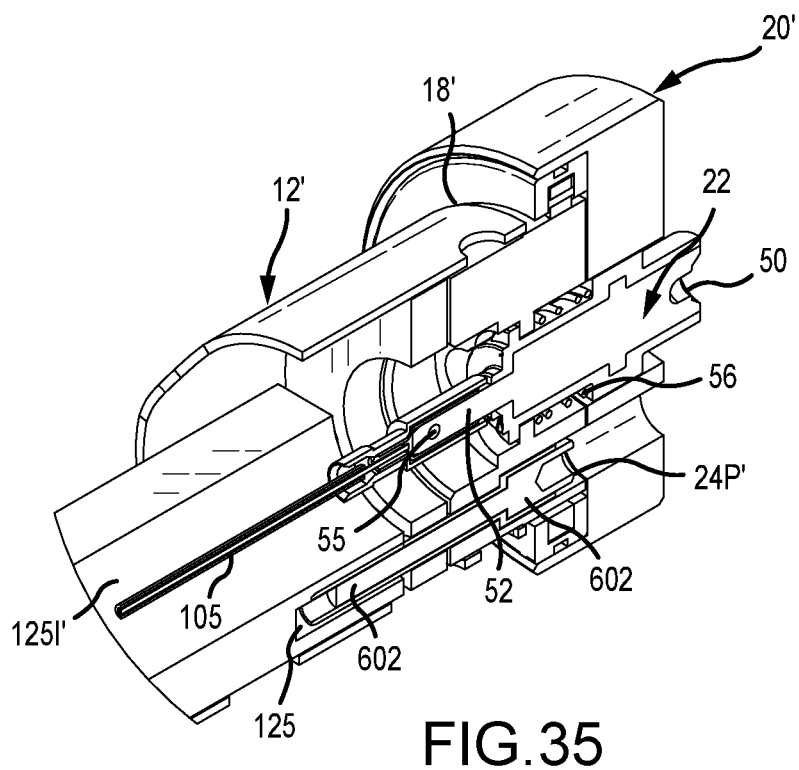
FIG. 35 is a close-up, side, perspective view showing detail E of FIG. 33.

As shown in FIG. 27, gun tube 10' is a smart assembly that is the same in all respects as tube 10 except it does not require one or more weights 124 (although it may still include them), and it includes a motor M on end 14 and/or on end 18. A motor M may be attached to end fitting 16 and/or 20. An accelerometer or other sensor (e.g., 3-axis (magnetometer), 6 axis (magnetometer plus accelerometer) or 9 (magnetometer plus accelerometer plus gyroscope), degree of freedom ("DOF") device may be used to detect the relative rotational position of gun assembly 10' in a wellbore. The sensor can thus assist an operator in determining the position of the shape charges 122 in the wellbore. The operator can then control the one or more motors to rotate gun tube 10' and position the shape charges 122 where the operator wants them before firing them. A signal could be sent wirelessly, or by a wired connection, from the sensor to the operator who can use a controller (such as a computer or cell phone) to directly or indirectly operate the one or more motors to orient the gun assembly 10'.

Perforating Gun Assembly

FIGS. 23-26 show a perforating gun assembly 1000. Gun assembly 1000 includes previously-described gun tube 10, a previously-described sub-assembly 200, each of which include a plunger 300. Alternatively, one or both sub-assemblies could include a previously-described DWG 400 at respective ends 204 of each sub-assembly 200. In that case, end contacts 22 need not be used. Wires could extend from stem 410 through cavity 114 of tube body 12 and be connected to wires 452 at second stem 412 of DWG 400 in the downstream sub-assembly 200.

In this embodiment, gun tube 10 is pressed into outer casing 700. Outer casing 700 has a first end 702 with threads 702A, a second end 704 with threads 704A, an outer surface 706 and an internal cavity 708 with an inner surface 708A. When tube 10 is pressed into cavity 708, grounding hardware items 70, which may be ball plungers, are compressed to their second compressed position, and they bias back to the first, extended position when they align with grooves (not shown) on inner surface 708A that have a slightly larger diameter than the rest of cavity 708. In that manner, gun tube 10 is affixed in position in outer casing 700.

Figure 26:
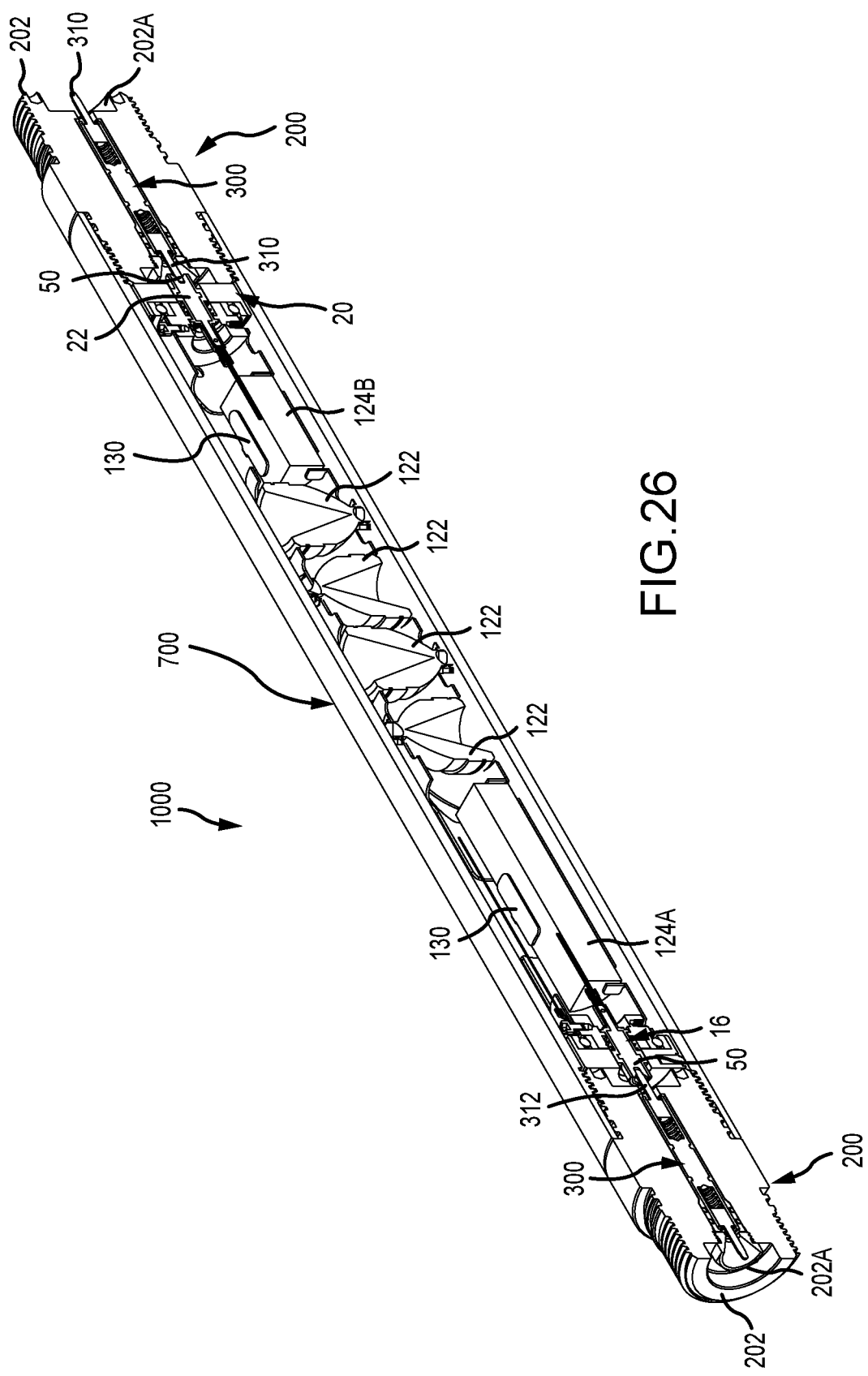
FIG. 26 is a cross-sectional, side, perspective view of the gun assembly of FIG. 14.

After tube 10 is positioned, sub-assemblies 200 are screwed onto each end 702, 704 of outer casing 700. As best seen in FIG. 26, when assembled, stem 312 of plunger 300 in forward sub-assembly 200 is in contact with electrical contact 50 of end fitting 16. Stem 310 of plunger 300 in rear sub-assembly 200 contacts electrical contact 50 of end fitting 20.

Some non-limiting examples of embodiments of this disclosure follow:

Example Set 1

Example 1

A plunger configured to fit in a central bore of a sub-assembly for a wellbore perforating gun assembly, the plunger comprising: an outer casing comprised of insulating material and having a first end; a first end portion comprised of electrically conductive material and including a first conductive stem, the first conductive stem having a first, extended position, and a second, contracted position.

Example 2

The plunger of example 1, wherein the outer casing further comprises a second end; and the plunger further comprises a second end portion comprised of electrically conductive material and including a second conductive stem, the second conductive stem having a first, extended position and a second, contracted position.

Example 3

The plunger of example 1 or 2, wherein the distance between the first, extended position of the first conductive stem and the second, contracted position of the first conductive stem is from 0.150" to 1.250".

Example 4

The plunger of example 2, wherein the difference between the first, extended position of the second conductive stem and the second, contracted position of the second conductive stem is from 0.150" to 1.250".

Example 5

The plunger of example 1 or 4, wherein the distance between the first, extended position of the first conductive stem and the second, contracted position of the first conductive stem is from 0.150" to 1.250".

Example 6

The plunger of any of examples 1-5, wherein the first end portion further includes a first cylinder connected to the first conductive stem and positioned inside of the outer housing, wherein the first cylinder has a diameter that is greater than a diameter of the first conductive stem.

Example 7

The plunger of any of examples 2 or 4-6, wherein the second end portion further includes a second cylinder connected to the second conductive stem and positioned inside of the outer housing, wherein the second cylinder has a diameter that is greater than a diameter of the second conductive stem.

Example 8

The plunger of any of examples 1-7, wherein the first conductive stem has a first distal tip that is positioned past the first end of the outer casing when the first conducive stem is in its first, extended position.

Example 9

The plunger of any of examples 2 or 4-6, wherein the second conductive stem has a second distal tip that is positioned past the second end of the outer casing when the second conductive stem is in its first, extended position.

Example 10

The plunger of any of examples 1-9 that further comprises a first spring that biases the first conductive stem to its first, extended position, wherein the spring is compressed when the first conductive stem is in its second, contracted position.

Example 11

The plunger of any of examples 2, 4-6, or 9 that further comprises a second spring that biases the second conductive stem to its second, extended position, wherein the spring is compressed when the second conductive stem is in its second, contracted position.

Example 12

The plunger of example 11 that further comprises a first spring that biases the first conductive stem to its first, extended position, wherein the spring is compressed when the first conductive stem is in its second, contracted position.

Example 13

The plunger of example 12, wherein the first spring and the second spring each has a compressive force from 5 lbs. to 15 lbs.

Example 14

The plunger of example 12, wherein the first spring and the second spring each has a compressive force from 2 lbs. to 20 lbs.

Example 15

The plunger of example 12, wherein the first spring and the second spring each has a compressive force from 5 lbs. to 30 lbs.

Example 16

The plunger of any of examples 1-15 that has an outer casing length of between 2" and 12".

Example 17

The plunger of any of examples 1-16 that has an outer casing length of between 2" and 5".

Example 18

The plunger of any of examples 1-17, wherein the insulating material is plastic.

Example 19

The plunger of any of examples 1-18, wherein the outer casing has an outer surface and at least one annular groove on the outer surface, and an o-ring in the at least one annular groove.

Example 20

The plunger of any of examples 1-19 that has two annular grooves on the outer surface, and an o-ring in each of the two annular grooves.

Example 21

The plunger of example 6, wherein the first cylinder is integrally formed with the first conductive stem.

Example 22

The plunger of example 10 that further comprises a conductive inner core and the first end portion further includes a first cylinder, the first cylinder being positioned inside of the outer housing, and the first spring being positioned between the conductive inner core and the first cylinder.

Example 23

The plunger of example 11 that further comprises a conductive inner core, and the second end portion further includes a second cylinder, the second cylinder being positioned inside of the outer housing, and the second spring being between the conductive inner core and the second cylinder.

Example 24

The plunger of example 7, wherein the second cylinder is integrally formed with the second conductive stem.

Example 25

The plunger of any of examples 1-24, wherein the first end is configured to be rotated by a tool.

Example 26

The plunger of example 25, wherein the first end has a shape selected from the group consisting of one of the following: hexagonal, Torx, quadrangle, Allen head, Star drive, and other driving configuration.

Example 27

A sub-assembly having a first end with a first opening, a second end with a second opening, and a central bore between the first opening and the second opening, and the plunger of example 2 positioned in the central bore and configured so the first, conductive stem is positioned at least partially in the first opening.

Example 28

The sub-assembly of example 27, wherein the first opening has a surface, and the central bore has a surface, and that further includes a dart retainer that surrounds at least part of the first conductive stem and contacts the surface of the central bore.

Example 29

The sub-assembly of example 28, wherein the dart retainer has a first section with a first diameter, a second section with a second diameter, and an opening therethrough, and the first conductive stem is positioned in the opening, and the first section contacts the surface of the central bore, and the second section contacts the surface of the first opening.

Example 30

The sub-assembly of example 29, wherein the dart retainer is comprised of silicone rubber.

Example 31

The sub-assembly of any of examples 27-30 that further comprises a second conductive stem having a second distal tip that is positioned outside of the central bore and positioned in the second opening.

Example 32

The sub-assembly of any of examples 27-31, wherein the first conductive stem has a first distal tip that is positioned outside of the central bore and positioned outside of the first opening.

Example 33

The sub-assembly of any of examples 27-32 that further comprises a second conductive stem having a distal tip that is positioned outside of the central bore and positioned outside of the second opening.

Example 34

The sub-assembly of example 28, wherein the second conductive stem is positioned at least partially in the second opening, and that further includes a dart retainer that surrounds at least part of the first second conductive steam and contacts the surface of the central bore.

Example 35

The sub-assembly of example 34, wherein the dart retainer has a first section with a first diameter, a second section with a second diameter, and an opening therethrough, and the second conductive stem is positioned in the opening, and the first section contacts the surface of the central bore, and the second section contacts the surface of the second opening.

Example Set 2

Example 1

A gun tube comprising:
a body having a first end, a second end, a cavity, and a longitudinal axis;
one or more weights in the cavity, the one or more weights configured to rotate the body around the longitudinal axis based on gravity acting on the one or more weights; and
a first end fitting attached to the first end of the body, the first end fitting rotationally connected to the body.

Example 2

The gun tube of example 1, wherein the first end fitting includes a first bearing housing.

Example 3

The gun tube of example 1 or 2 that further includes a second end fitting attached to the second end of the body, the second end fitting rotationally connected to the body.

Example 4

The gun tube of example 3, wherein the second end fitting includes a second bearing housing.

Example 5

The gun tube of any of examples 1-4, wherein the first end fitting further comprises a first end contact having a first, extended position and a second, contracted position.

Example 6

The gun tube of any of examples 3-4, wherein the second end fitting comprises a second end contact having a first, extended position and a second, contracted position.

Example 7

The gun tube of any of examples 1-6, wherein the one or more weights comprises two separate weights, a first weight and a second weight.

Example 8

The gun tube of example 7, wherein the first weight is juxtaposed the first end of the tube body and the second weight is juxtaposed the second end of the tube body.

Example 9

The gun tube of any of examples 1-8, wherein each of the one or more weights has a semi-cylindrical shape.

Example 10

The gun tube of example 7, wherein the first weight weighs $7/8$ lbs. at sea level and the second weight weighs $1\frac{3}{4}$ lbs. at sea level.

Example 11

The gun tube of example 7, wherein the second weight is at least twice as heavy as the first weight.

Example 12

The gun tube of any of examples 1-11, wherein the one or more weights collectively weigh from 2 lbs. to 8 lbs. at sea level.

Example 13

The gun tube of any of examples 1-12, wherein the one or more weights are comprised of steel.

Example 14

The gun tube of any of examples 1-13, wherein the one or more weights is collectively one of the following percentages of the weight of the gun tube without the weight: at least 15%, at least 20%, at least 30%, at least 40%, and at least 50%.

Example 15

The gun tube of example 7, wherein the first weight is 2"-3" in length and the second weight is 3"-8" in length.

Example 16

The gun tube of any of examples 1-15, wherein the at least first end fitting comprises:

an outer collar;
a bearing housing that includes ball bearings and a central opening; and
a support having a first portion with a first diameter and a second portion with a second diameter that is greater than the first diameter, wherein the bearing housing is positioned on the first portion and the central opening surrounds at least part of the first portion, and the outer collar is fastened to the support.

Example 17

The gun tube of any of examples 1-16 that further comprises one or more charge openings configured to receive an explosive charge.

Example 18

The gun tube of example 17 that further comprises one or more explosive charges in the one or more charge openings.

Example 19

The gun tube of example 17 that further comprises one or more clip openings configured to receive charge clips.

Example 20

The gun tube of example 19 that comprises one or more clips in the one or more clip openings.

Example 21

The gun tube of example 16, wherein the first end fitting further includes a first end contact having a first, extended position and a second, contracted position, and that also comprises a second end fitting having a second end contact including a first, extended position and a second, extended position.

Example 22

The gun tube of example 16, wherein the outer collar has one or more openings, wherein at least one of the one or more openings contains grounding hardware biased to a first, extended position, and that also has a second, contracted position.

Example 23

The gun tube of any of examples 1-22, wherein the first end fitting comprises an end contact having a first end that comprises a stem, the stem being positioned inside of the cavity, and the end contact having a second end, the second end comprising an electrical contact that is positioned outside of the body.

Example 24

The gun tube of example 23, wherein the end contact is configured to transmit electricity therethrough.

Example 25

The gun tube of any of examples 1-24, wherein the first end fitting comprises a first end contact that includes a housing and one or more frangible elements extending outwardly from the housing.

Example 26

The gun tube of example 25 that further comprises a second end fitting that includes a second end contact having a housing and one or more frangible elements extending outwardly from the housing.

Example 27

The gun tube of example 25 or 26, wherein the housing and frangible elements are comprised of plastic and the frangible elements are configured to break away from the housing upon the application of explosive, outward axial force caused by explosion of one or more explosive charges in the gun tube.

Example 28

The gun tube of example 5, wherein the first end contact is biased towards the first, extended position.

Example 29

The gun tube of example 6, wherein the second end contact is biased towards the first, extended position.

Example 30

The gun tube of example 28 that further includes a spring on a housing of the first end contact, the spring configured to bias the first end contact to the first, extended position, and the spring configured to compress when the first end contact moves to its second, contracted position.

Example 31

The gun tube of example 29 that further includes a spring on a housing of the second end contact, the spring configured to bias the first end contact to the first, extended position, and the spring configured to compress when the first end contact moves to its second, contracted position.

Example 32

The gun tube of example 5, wherein the end fitting includes an opening in which the first end contact is positioned.

Example 33

The gun tube of any of examples 25-27, wherein the first end fitting further includes a support that has an opening configured to receive the one or more frangible elements, and wherein the first end contact has a first rotated position in which the one or more frangible elements fit through the opening and a second rotated position in which the one or more frangible elements do not fit through the opening.

Example 34

The gun tube of example 27, wherein the one or more frangible elements are configured to break away from the housing when about 30 lbs. or more of explosive, outward longitudinal axial force is applied to them.

Example 35

The gun tube of example 5, wherein the first end contact comprises a stem that includes a through hole, the through hole configured to receive one or more wires.

Example 36

The gun tube of example 6, wherein the second end contact comprises a stem that includes a through hole, the through hole configured to receive one or more wires.

Example 37

The gun tube of any of examples 1-36, wherein the body further comprises a plurality of tabs for retaining the one or more weights.

Example 38

The gun tube of any of examples 1-37 that further includes tabs at different positions on the body to maintain the one or more weights at different, respective positions within the cavity.

Example 39

The gun tube of any of examples 1-38, wherein the body further comprises tabs that have a first, open position, and a second, closed position in which the tabs retain the one or more weights in the cavity.

Example 40

The gun tube of any of examples 1-39 that further includes an outer casing positioned over and around the body, the outer casing having a first end and a second end.

Example 41

The gun tube of example 39 that further comprises a sub-assembly connected to one end of the outer casing.

Example 42

The gun tube of example 39 that further comprises a first sub-assembly connected to the first end of the outer casing and a second sub-assembly connected to the second end of the outer casing.

Example 43

The gun tube of example 41, wherein the sub-assembly is threadingly connected to the outer casing.

Example 44

The gun tube of example 42, wherein the first sub-assembly is threadingly connected to the first end of the outer casing and the second sub-assembly is threadingly connected to the second end of the outer casing.

Example 45

The gun tube of example 41 that further comprises a plunger in the sub-assembly.

Example 46

The gun tube of example 45, wherein the plunger has a longitudinal axis and an electrical connection running through it.

Example 47

The gun tube of example 45 that further includes an electrically insulating outer casing around at least part of the plunger and the outer casing has a first end and a second end.

Example 48

The gun tube of example 47, wherein the electrically insulating casing is comprised of plastic.

Example 49

The gun tube of example 43, wherein the plunger has a body, a cavity, a first end, and a second end, a first conductive stem, and a second conductive stem, wherein the first contact stem extends past the first end of the outer casing, and the second contact stem extends past the second end of the outer casing.

Example 50

The gun tube of example 49, wherein the first conductive stem has a first, extended position and a second, contracted position.

Example 51

The gun tube of example 50, wherein the second conductive stem has a first, extended position and a second, contracted position.

Example 52

The gun tube of example 50, wherein the distance between the first, extended position and the second, contracted position of the first conductive stem is between 0.150" and 1.250".

Example 53

The gun tube of example 51, wherein the distance between the first, extended position and the second, contracted position of the second conductive stem is between 0.150" and 1.250".

Example 54

The gun tube of example 50, wherein the first conductive stem is part of a first conductive stem structure that includes a first cylinder that is positioned in a cavity of the outer casing.

Example 55

The gun tube of example 51, wherein the second conductive stem is part of a first conductive stem structure that includes a second cylinder that is positioned in a cavity of the outer casing.

Example 56

The gun tube of example 54, wherein the cavity includes a conductive core and a spring is positioned between the first conductive stem structure base and the conductive core.

Example 57

The gun tube of example 56, wherein the cavity includes a conductive core and a spring is positioned between the second conductive stem structure base and the conductive core.

Example 58

The gun tube of example 45, wherein the plunger has an outer casing and a compressible metal clip positioned on the outside surface, the metal clip configured to provide an electrical ground for the plunger.

Example 59

The gun tube of example 45, wherein there is a through hole in the first conductive stem.

Example 60

The gun tube of example 45, wherein there is a through hole in the second conductive stem.

Example 61

The gun assembly of example 45 or 51 that further includes an insulating barrel connector mounted to the second stem.

Example 62

The gun tube of example 45, wherein the plunger further comprises an outer casing and a driver head on a first end or a second end of the outer casing.

Example 63

The gun tube of example 16, wherein the collar includes one or more apertures and each aperture includes a grounding mechanism to ground the gun tube when positioned inside of an outer casing.

Example 64

The gun tube of example 63, wherein each of the grounding mechanisms is a ball and plunger unit.

Example 65

The gun tube of example 63, wherein each grounding mechanism has a first, outwardly-biased position and a second, contracted position.

Example 66

The gun tube of example 65, wherein the distance between the first, outwardly-biased position and the second, contracted position from 0.010" to 0.080".

Example 67

The gun tube of example 1 that includes at least one rotatable end plate that is rotatable to a plurality of indexed positions, wherein the end plate is attached to one of the one or more weights.

Example 68

The gun tube of example 67 that includes one end plate at the first end of the gun tube.

Example 69

The gun tube of example 68 that includes a second rotatable end plate that is rotatable to a plurality of indexed positions, wherein the second end plate is attached to the one or more weights.

Example 70

The gun tube of example 69, wherein the first rotatable plate includes a plurality of indexed positions, and the second rotatable plate includes the same plurality of indexed positions.

Example Set 3

Example 1

A double-wire feed through with ground (DWG) comprising:
an outer casing comprised of insulating material, the outer casing having a first end and a second end;
a first conductive stem extending outward from the first end of the outer casing, the first conductive stem having a first, extended position and a second, contracted position.

Example 2

The DWG of example 1 that further comprises one or more grounding legs attached to and extending outward from the outer casing.

Example 3

The DWG of example 2 that includes two grounding legs, a first grounding leg and a second grounding leg.

Example 4

The DWG of example 3, wherein the first grounding leg is on one side of the outer casing and the second grounding leg is on the opposite side of the outer casing.

Example 5

The DWG of example 1 or 2, wherein the outer casing further comprises one or more recesses, and each of the one or more recesses is configured to receive a grounding leg when the grounding leg is compressed.

Example 6

The DWG of any of examples 1-5 that further includes a second conductive stem opposite the first conductive stem and an insulating sheath that connects one or more wires to the second conductive stem.

Example 7

The DWG of any of examples 1-6 that further includes a conductive core and a spring between the conductive core and the first conductive stem, wherein the spring is configured to bias the first conductive stem to its first, extended position.

Example 8

The DWG of example 7 that further includes a second conductive stem opposite the first conductive stem and an insulating sheath that connects one or more wires to the second conductive stem.

Example 9

The DWG of any of examples 1-8, wherein the distance between the first, extended position and the second, contracted position is from 0.150" to 1.250".

Example 10

The DWG of example 7, wherein the spring has a compressive force from 5 lbs. to 15 lbs.

Example 11

The DWG of example 7, wherein the spring has a compressive force from 2 lbs. to 20 lbs.

Example 12

The DWG of example 7, wherein the spring has a compressive force from 5 lbs. to 30 lbs.

Example 13

A double-wire feed through with ground (DWG) comprising:
an outer casing comprised of insulating material, the outer casing having a first end and a second end;
a first conductive stem extending outward from the first end of the body, and a second conductive stem opposite the first conductive stem; and
one or more grounding legs attached to and extending outward from the outer casing.

Example 14

The DWG of example 13 that includes two grounding legs.

Example 15

The DWG of example 13 that further includes an insulating sheath that connects one or more wires to the second conductive stem.

Example 16

The DWG of example 1, wherein the insulating material comprises plastic.

Example 17

The DWG of example 13, wherein the insulating material comprises plastic.

Example 18

The DWG of example 2, wherein each of the one or more grounding legs extends outward from the outer casing by 0.050" to 0.250".

Example 18

The DWG of example 13, wherein each of the one or more grounding legs extends outward from the outer casing by 0.050" to 0.250".

Example 20

A sub-assembly having a first end with a first opening, a second end with a second opening, and a central bore between the first opening and the second opening, and the DWG of example 1 positioned in the central bore and configured so the first, conductive stem is positioned at least partially in the first opening.

Example 21

The sub-assembly of example 20, wherein the first opening has a surface, and the central bore has a surface, and that further includes a dart retainer that surrounds at least part of the first conductive stem and that contacts the surface of the central bore.

Example 22

The sub-assembly of example 21, wherein the dart retainer has a first section with a first diameter, a second section with a second diameter, and a retainer opening therethrough, and the first stem is positioned in the retainer opening, and the first section contacts the surface of the central bore, and the second section contacts the surface of the first opening.

Example 23

The sub-assembly of example 21 or 22, wherein the dart retainer is comprised of silicone rubber.

Example 24

A sub-assembly having a first end with a first opening, a second end with a second opening, and a central bore between the first opening and the second opening, and the DWG of example 13 positioned in the central bore and configured so the first, conductive stem is positioned at least partially in the first opening.

Example 25

The sub-assembly of example 24, wherein the first opening has a surface, and the central bore has a surface, and that further includes a dart retainer that surrounds at least part of the first conductive stem and contacts the surface of the central bore.

Example 26

The sub-assembly of example 25 or 26, wherein the dart retainer has a first section with a first diameter, a second section with a second diameter, and a retainer opening therethrough, and the first stem is positioned in the retainer opening, and the first section contacts the surface of the central bore, and the second section contacts the surface of the first opening.

Example 27

The sub-assembly of example 25, wherein the dart retainer is comprised of silicone rubber.

Example Set 4

Example 1

An end fitting comprising:
a first end and a second end;
a bearing housing that includes ball bearings, the bearing housing having a bearing opening;
a support having a first portion with a first diameter and a second portion with a second diameter that is greater than the first diameter, wherein the bearing housing is positioned on the first portion with the bearing opening surrounding at least part of the first portion; and
an end contact comprising a housing, a first end having a conductive stem, and a second end that comprises an electrical contact, the second end having a first, extended position and a second, contracted position.

Example 2

The end fitting of example 1, wherein the end contact is biased to the first, extended position.

Example 3

The end fitting of example 1 or 2, wherein electricity can be conducted through the end contact.

Example 4

The end fitting of any of examples 1-3, wherein the end contact further comprises a housing and one or more frangible elements extending outwardly from the housing.

Example 5

The end fitting of example 4, wherein the housing and the one or more frangible elements are comprised of plastic.

Example 6

The end fitting of example 4 or 5, wherein the one or more frangible elements are a plurality of tabs.

Example 7

The end fitting of example 6, wherein the one or more frangible elements are two tabs.

Example 8

The end fitting of example 6, wherein each of the plurality of tabs extend outward from the body by 0.070" to 0.125".

Example 9

The end fitting of example 6, wherein each of the plurality of tabs is from 0.010" to 0.080" thick.

Example 10

The end fitting of example 8, wherein each of the plurality of tabs is from 0.010" to 0.080" thick.

Example 11

The end fitting of example 2 that further includes a spring on the end contact.

Example 12

The end fitting of example 11, wherein the spring is on a first portion of the end contact.

Example 13

The end fitting of example 12, wherein the support further includes one or more frangible elements and the spring is retained between a central portion of the end contact and the one or more frangible elements.

Example 14

The end fitting of example 6, wherein the support has an opening that receives an end of the end contact housing that includes the plurality of tabs, and wherein the end contact has a first position in which the tabs fit through the opening and a second position in which they do not fit through the opening.

Example 15

The end fitting of example 4, wherein the one or more frangible elements break when 30 lbs. or more of explosive, outward, longitudinal, axial force is applied to them.

Example 16

The end fitting of example 4, wherein the one or more frangible elements break when 50 lbs. or more of explosive, outward, axial force is applied to them.

Example 17

The end fitting of any of examples 1-16, wherein the conductive stem includes a through hole, wherein the through hole is configured to receive one or more wires.

Example 18

The end fitting of any of examples 1-17 that further includes a wire harness assembly attached to the conductive stem, the wire harness assembly comprising an insulated wire and an insulated circular connector.

Example 19

The end fitting of example 18, wherein the insulated circular connector is a barrel crimp connector.

Example 20

An end fitting for a gun tube that comprises an end contact with a first end that includes an electrical contact having a first extended position and a second, contracted position.

Example 21

The end fitting of example 20, wherein the end contact further includes one or more frangible elements configured to break when 30 lbs. or more of explosive, outward longitudinal, axial, force is applied.

Example 22

The end fitting of example 21, wherein the one or more frangible elements are a plurality of tabs.

Example 23

The end fitting of example 22, wherein the one or more frangible elements are two tabs.

Example 24

The end fitting of any of examples 1-23 that further comprises an outer collar having an opening therethrough.

Example 25

The end fitting of example 24, wherein the electrical contact is positioned from $\frac{1}{16}$" to $\frac{5}{16}$" outside of the opening when the second end of the end contact is in its first, extended position.

Example 26

The end fitting of example 4, wherein the housing and one or more frangible elements are integrally formed.

Example Set 5

Example 1

A gun tube comprising:
a body having a cavity, a longitudinal axis, a first end, and a second end;
a motor connected to the first end, the motor configured to rotate the body around the longitudinal axis.

Example 2

The gun tube of example 1 that further comprises a first end fitting attached to the first end of the body.

Example 3

The gun tube of example 2 that further comprises a second end fitting attached to the second end of the body.

Example 4

The gun tube of example 1 that further comprises a sensor configured to detect the location of the explosive charges.

Example 5

The gun tube of example 3, wherein the sensor comprises an accelerometer.

Example 6

The gun tube of example 3, wherein the sensor comprises one or more of an accelerometer, a magnetometer, and gyroscope.

Example 7

A system comprising the gun tube of example 6 and a motor control remote to the gun tube, the motor control configured to operate the motor.

Example 8

The system of example 7, wherein the motor control is one of a computer and a cell phone.

Example 9

The system of example 7 that further includes a receiver for receiving transmissions sent by the sensor.

Example 10

The system of a claim 7, wherein the motor control is configured to be operated by a human operator.

Example 11

The system of a claim 7, wherein the motor control is configured to be operated by a machine operator.

Example 12

The gun tube of example 1, wherein the at least first end fitting comprises:
an outer collar;
a bearing housing that includes ball bearings and a central opening; and
a support having a first portion with a first diameter and a second portion with a second diameter that is greater than the first diameter, wherein the bearing housing is positioned on the first portion and the central opening surrounds at least part of the first portion, and the outer collar is fastened to the support.

Example 13

The gun tube of any of examples 1-12 that further comprises one or more charge openings configured to receive an explosive charge.

Example 14

The gun tube of example 13 that further comprises one or more explosive charges in the one or more charge openings.

Example 15

The gun tube of any of examples 1-14 that further comprises one or more clip openings configured to receive charge clips.

Example 16

The gun tube of example 15 that comprises one or more clips in the one or more clip openings.

Example 17

The gun tube of example 2, wherein the first end fitting includes a first end contact having a first, extended position and a second, contracted position, and that also comprises a second end fitting having a second end contact including a first, extended position and a second, extended position.

Example 18

The gun tube of example 12, wherein the outer collar has one or more openings, wherein at least one of the one or more openings contains grounding hardware biased to a first, extended position, and that also has a second, contracted position.

Example 19

The gun tube of example 2 or 17, wherein the first end fitting comprises an end contact having a first end that comprises a stem, the stem being positioned inside of the cavity, and the end contact having a second end, the second end comprising an electrical contact that is positioned outside of the body.

Example 20

The gun tube of example 19, wherein the end contact is configured to transmit electricity therethrough.

Example 21

The gun tube of example 2, wherein the first end fitting comprises a first end contact that includes a housing and one or more frangible elements extending outwardly from the housing.

Example 22

The gun tube of example 21 that further comprises a second end fitting that includes a second end contact having a housing and one or more frangible elements extending outwardly from the housing.

Example 23

The gun tube of example 21, wherein the housing and frangible elements are comprised of plastic and the frangible elements are configured to break away from the housing upon the application of explosive, outward axial force caused by explosion of one or more explosive charges in the gun tube.

Example 24

The gun tube of example 17, wherein the first end contact is biased towards the first, extended position.

Example 25

The gun tube of example 24, wherein the second end contact is biased towards the first, extended position.

Example 26

The gun tube of example 24 that further includes a spring on a housing of the first end contact, the spring configured to bias the first end contact to the first, extended position, and the spring configured to compress when the first end contact moves to its second, contracted position.

Example 27

The gun tube of example 26 that further includes a spring on a housing of the second end contact, the spring configured to bias the first end contact to the first, extended position, and the spring configured to compress when the first end contact moves to its second, contracted position.

Example 28

The gun tube of example 17, wherein the distance between the first, extended position and the second, contracted position of the first end contact is between 0.150" and 1.250".

Example 29

The gun tube of example 28, wherein the distance between the first, extended position and the second, contracted position of the second end contact is between 0.150" and 1.250".

Having thus described different embodiments, other variations and embodiments that do not depart from the spirit of this disclosure will become apparent to those skilled in the art. The scope of the claims is thus not limited to any particular embodiment, but is instead set forth in the claims and the legal equivalents thereof. Unless expressly stated in the written description or claims, the steps of any method recited in the claims may be performed in any order capable of yielding the desired product. No language in the specification should be construed as indicating that any non-claimed limitation is included in a claim. The terms "a" and "an" in the context of the following claims are to be construed to cover both the singular and the plural, unless otherwise indicated.

What is claimed is:

1. A gun tube comprising:
   a body having a cavity, a longitudinal axis, a first end, and a second end;
   a first end fitting attached to the first end of the body, wherein the first end fitting comprises:
      a bearing housing that includes ball bearings and a central opening; and
      a support having a first portion with a first diameter and a second portion with a second diameter that is greater than the first diameter, wherein the bearing housing is positioned on the first portion and the central opening surrounds at least part of the first portion; and
   a motor connected to the first end of the body, the motor configured to rotate the body around the longitudinal axis.

2. The gun tube of claim 1 that further comprises a second end fitting attached to the second end of the body.

3. The gun tube of claim 1 that further comprises a sensor configured to detect the location of one or more explosive charges that are coupled to the body.

4. The gun tube of claim 3, wherein the sensor comprises an accelerometer.

5. The gun tube of claim 3, wherein the sensor comprises one or more of an accelerometer, a magnetometer, and gyroscope.

6. A system comprising the gun tube of claim 5 and a motor control remote to the gun tube, the motor control configured to operate the motor.

7. The system of claim 6, wherein the motor control is one of a computer and a cell phone.

8. The system of claim 6 that further includes a receiver for receiving transmissions sent by the sensor.

9. The system of a claim 6, wherein the motor control is configured to be operated by a human operator.

10. The system of a claim 6, wherein the motor control is configured to be operated by a machine operator.

11. The gun tube of claim 1 that further comprises one or more charge openings configured to receive an explosive charge.

12. The gun tube of claim 11 that further comprises one or more explosive charges in the one or more charge openings.

13. The gun tube of claim 11 that further comprises one or more clip openings configured to receive charge clips.

14. The gun tube of claim 13 that comprises one or more clips in the one or more clip openings.

15. The gun tube of claim 1, wherein the first end fitting includes a first end contact having a first, extended position and a second, contracted position, and the gun tube also comprises a second end fitting having a second end contact including a first, extended position and a second, contracted position.

16. The gun tube of claim 15, wherein the first end contact is biased towards the first, extended position.

17. The gun tube of claim 16, wherein the second end contact is biased towards the first, extended position.

18. The gun tube of claim 16 that further includes a spring on a housing of the first end contact, the spring configured to bias the first end contact to the first, extended position, and the spring configured to compress when the first end contact moves to the second, contracted position thereof.

19. The gun tube of claim 18 that further includes a spring on a housing of the second end contact, the spring configured to bias the first end contact to the first, extended position, and the spring configured to compress when the first end contact moves to the second, contracted position thereof.

20. The gun tube of claim 15, wherein the distance between the first, extended position and the second, contracted position of the first end contact is between 0.150" and 1.250".

21. The gun tube of claim 20, wherein the distance between the first, extended position and the second, contracted position of the second end contact is between 0.150" and 1.250".

22. The gun tube of claim 1, wherein the outer collar has one or more openings, wherein at least one of the one or more openings contains grounding hardware biased to a first, extended position, and wherein the grounding hardware also has a second, contracted position.

23. The gun tube of claim 1, wherein the first end fitting comprises an end contact having a first end that comprises a stem, the stem being positioned inside of the cavity, and the end contact having a second end, the second end comprising an electrical contact that is positioned outside of the body.

24. The gun tube of claim 23, wherein the end contact is configured to transmit electricity therethrough.

25. The gun tube of claim 1, wherein the first end fitting comprises a first end contact that includes a housing and one or more frangible elements extending outwardly from the housing.

26. The gun tube of claim 25 that further comprises a second end fitting that includes a second end contact having a housing and one or more frangible elements extending outwardly from the housing.

27. The gun tube of claim 25, wherein the housing of the first end contact and the one or more frangible elements of the first end contact are comprised of plastic and the one or more frangible elements are configured to break away from the housing of the first end contact upon the application of explosive, outward axial force caused by explosion of one or more explosive charges in the gun tube.

28. A gun tube, comprising:
a body having a cavity, a longitudinal axis, a first end, and a second end;
a first end fitting attached to the first end of the body, wherein the first end fitting includes a first end contact having a first, extended position and a second, contracted position;
a second end fitting attached to the second end of the body, wherein the second end fitting includes a second end contact having a first, extended position and a second, contracted position; and
a motor connected to at least one of the first end and the second end of the body, wherein the motor is configured to rotate the body around the longitudinal axis.

29. A gun tube, comprising:
a body having a cavity, a longitudinal axis, a first end, and a second end;
a first end fitting attached to the first end of the body, wherein the first end fitting comprises an end contact having a first end that comprises a stem, the stem being positioned inside of the cavity, and the end contact having a second end, the second end comprising an electrical contact that is positioned outside of the body; and
a motor connected to the first end of the body, wherein the motor is configured to rotate the body around the longitudinal axis.

30. A gun tube, comprising:
a body having a cavity, a longitudinal axis, a first end, and a second end;
a first end fitting attached to the first end of the body, wherein the first end fitting comprises a first end contact that includes a housing and one or more frangible elements extending outwardly from the housing; and
a motor connected to the first end of the body, wherein the motor is configured to rotate the body around the longitudinal axis.

* * * * *